(12) United States Patent
Senthil

(10) Patent No.: US 12,536,443 B2
(45) Date of Patent: Jan. 27, 2026

(54) SMART SENSOR

(71) Applicant: Unicorn Labs LLC, Granite Bay, CA (US)

(72) Inventor: Kumar Veluswamy Senthil, Granite Bay, CA (US)

(73) Assignee: Unicorn Labs LLC, Granite Bay, CA (US)

( * ) Notice: Subject to any disclaimer, the term of this patent is extended or adjusted under 35 U.S.C. 154(b) by 0 days.

(21) Appl. No.: 17/990,608

(22) Filed: Nov. 18, 2022

(65) Prior Publication Data

US 2023/0116538 A1 Apr. 13, 2023

Related U.S. Application Data

(63) Continuation of application No. 17/359,286, filed on Jun. 25, 2021, now Pat. No. 11,551,099.

(60) Provisional application No. 63/158,887, filed on Mar. 10, 2021, provisional application No. 63/133,119, filed on Dec. 31, 2020, provisional application No. 62/705,442, filed on Jun. 27, 2020.

(51) Int. Cl.
*G06N 3/088* (2023.01)
*G06F 18/21* (2023.01)
*G06N 5/04* (2023.01)
*G06V 10/74* (2022.01)
*G06V 10/82* (2022.01)
*H04L 67/12* (2022.01)

(52) U.S. Cl.
CPC ............... *G06N 3/088* (2013.01); *G06N 5/04* (2013.01); *G06V 10/761* (2022.01); *G06V 10/82* (2022.01); *H04L 67/12* (2013.01); *G06F 18/21* (2023.01); *G06T 2207/20081* (2013.01)

(58) Field of Classification Search
CPC ........ H04N 3/155; H04N 13/25; H04L 67/12; G06N 3/088; G06N 5/04
See application file for complete search history.

(56) References Cited

U.S. PATENT DOCUMENTS

| | | | |
|---|---|---|---|
| 5,909,676 A | 6/1999 | Kano | |
| 9,856,990 B2 * | 1/2018 | Peret | ........................ G06T 7/62 |
| 11,284,062 B2 * | 3/2022 | Dubey | .................. H04N 7/183 |
| 11,287,847 B2 | 3/2022 | Ritchey et al. | |
| 2014/0214354 A1 | 7/2014 | Dreifus et al. | |
| 2015/0032680 A1 | 1/2015 | Cichosz et al. | |

(Continued)

OTHER PUBLICATIONS

International Patent Application No. PCT/US2021/039229; Int'l Preliminary Report on Patentability; dated May 5, 2022; 10 pages.

(Continued)

*Primary Examiner* — Nam T Tran
(74) *Attorney, Agent, or Firm* — BakerHostetler

(57) ABSTRACT

Smart sensor methods and systems are described that improve on prior systems. An example device includes a sensor, a memory, a network connection, and two processing units, wherein a first processing unit compares current data provided by the first sensor to the reference data previously provided by the first sensor. Based on the result of the comparison, a second processing unit may be enabled to process the current data, or may be disabled to prevent the second processing unit from processing the current data.

21 Claims, 52 Drawing Sheets

(56) References Cited

U.S. PATENT DOCUMENTS

| | | | |
|---|---|---|---|
| 2016/0094814 A1* | 3/2016 | Gousev | H04N 23/651 |
| | | | 348/143 |
| 2016/0239726 A1 | 8/2016 | Yu | |
| 2018/0137643 A1 | 5/2018 | Wang | |
| 2018/0144100 A1 | 5/2018 | Chalas et al. | |
| 2018/0197218 A1 | 7/2018 | Mallesan et al. | |
| 2019/0050732 A1 | 2/2019 | Anderson | |
| 2019/0052808 A1* | 2/2019 | Wan | H04N 23/673 |
| 2019/0158724 A1* | 5/2019 | Parrish | H04N 23/661 |
| 2020/0086862 A1 | 3/2020 | Cui et al. | |
| 2020/0193609 A1 | 6/2020 | Dharur et al. | |
| 2020/0272899 A1 | 8/2020 | Dunne et al. | |
| 2020/0387539 A1* | 12/2020 | Ananthanarayanan | |
| | | | H04L 67/12 |
| 2020/0401853 A1 | 12/2020 | Xiong et al. | |
| 2021/0027200 A1* | 1/2021 | Zuo | H04N 23/64 |
| 2021/0183039 A1 | 6/2021 | Lindsey et al. | |
| 2021/0209461 A1 | 7/2021 | Guo | |
| 2021/0318663 A1 | 10/2021 | Maier et al. | |
| 2021/0374513 A1 | 12/2021 | Sur et al. | |
| 2021/0407051 A1 | 12/2021 | Pardeshi et al. | |
| 2022/0172429 A1* | 6/2022 | Tong | G06T 7/55 |

OTHER PUBLICATIONS

International Patent Application No. PCT/US2021/039229; Int'l Search Report and the Written Opinion; dated Oct. 1, 2021; 20 pages.

Eki et al.; "9.6—A ½.3inch 12.3Mpixel with On-Chip 4.97TOPS/W CNN Processor Back-Illuminated Stacked CMOS Image Sensor"; IEEE Int'l Solid-State Circuits Conf. 2021; 3 pages.

\* cited by examiner

100

200

300

400

<u>450</u>

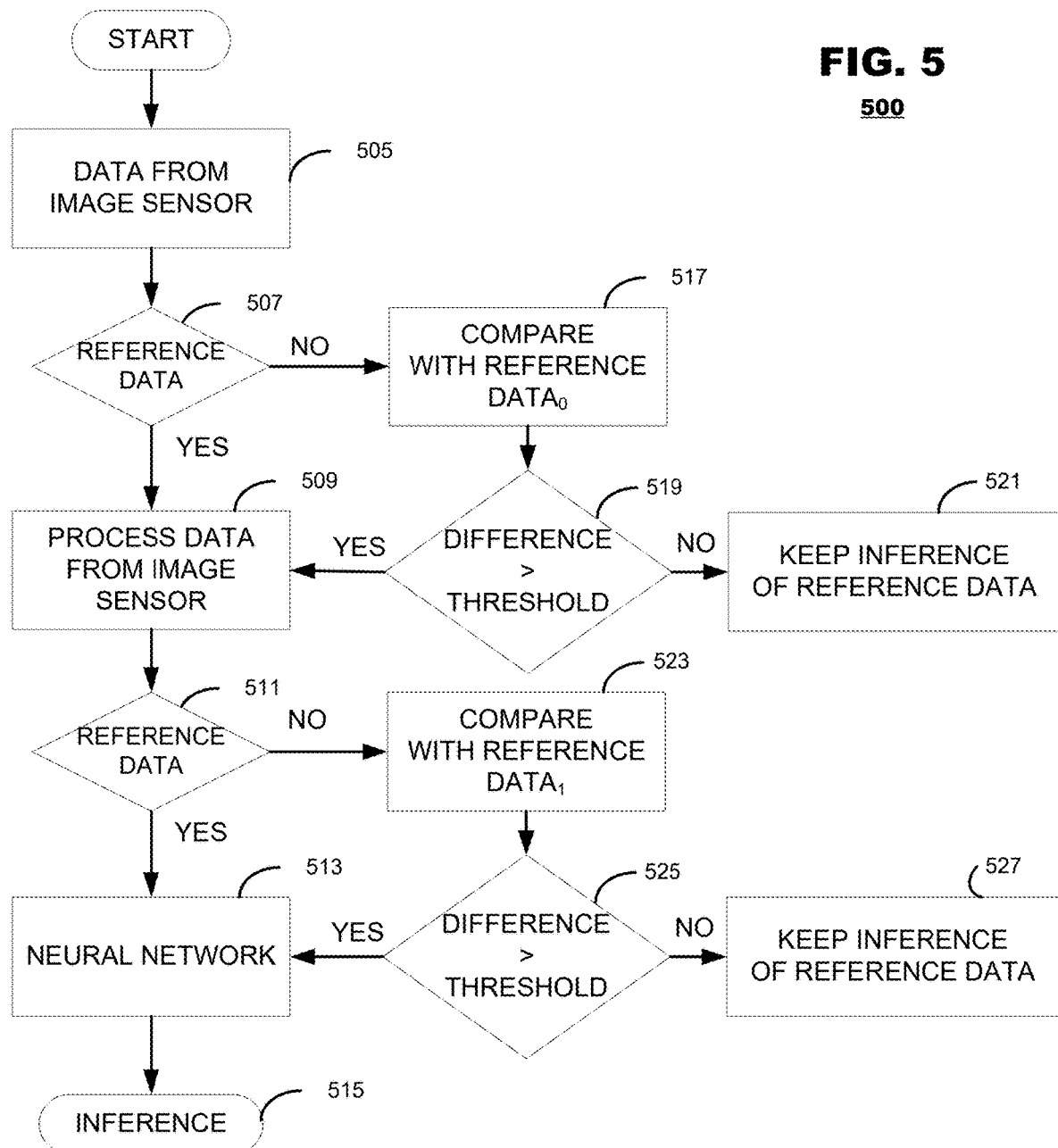

600

650

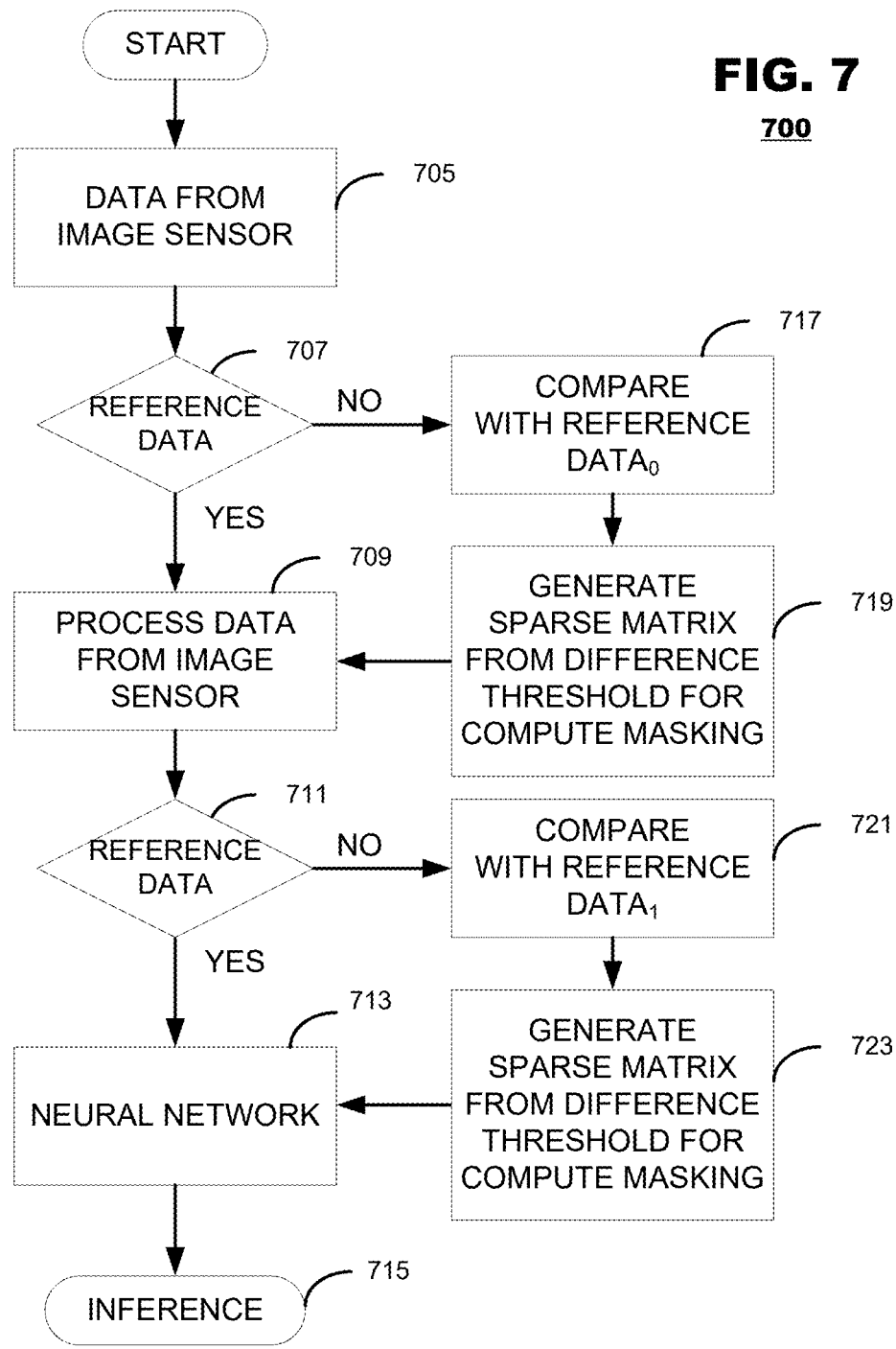

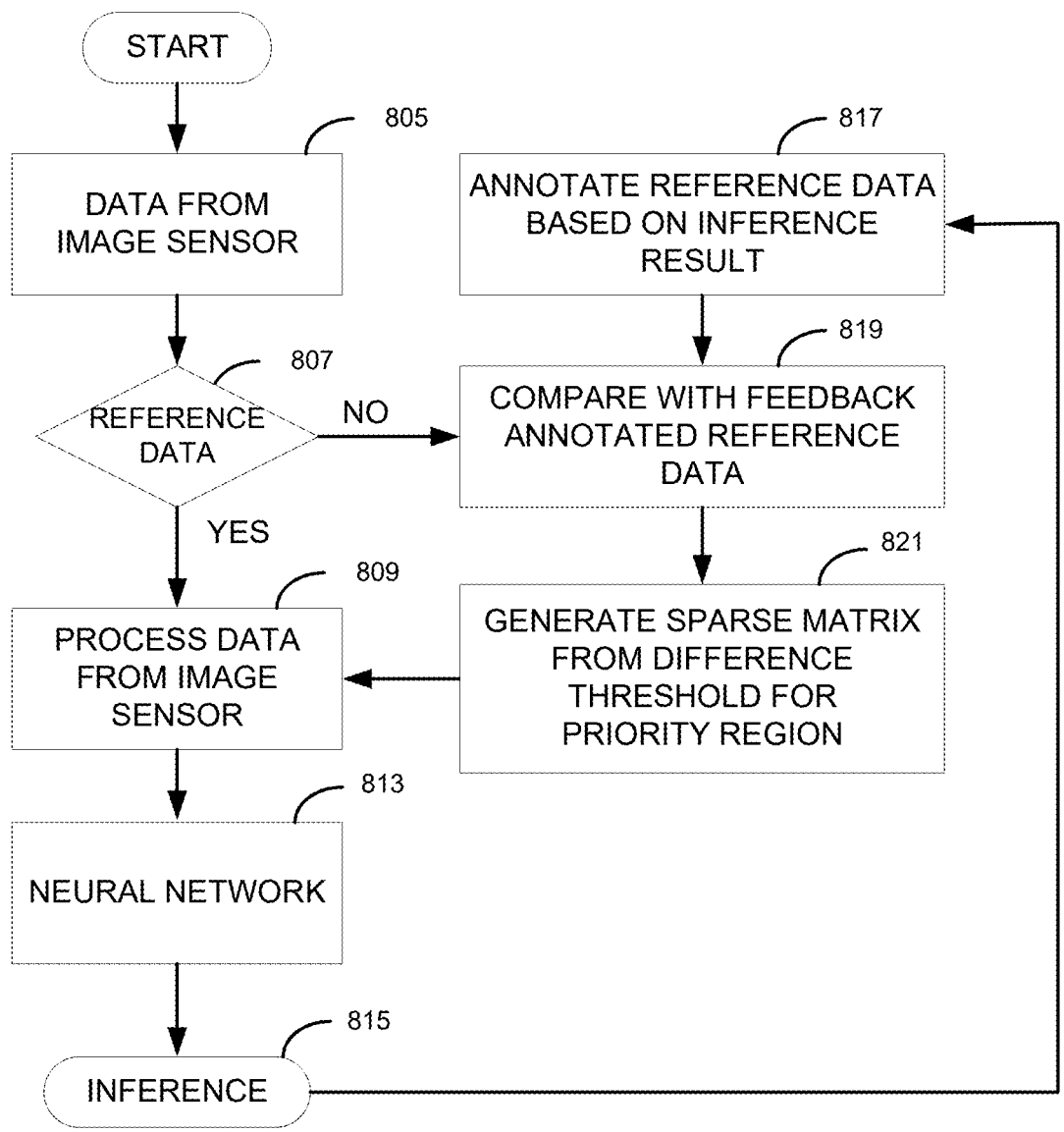

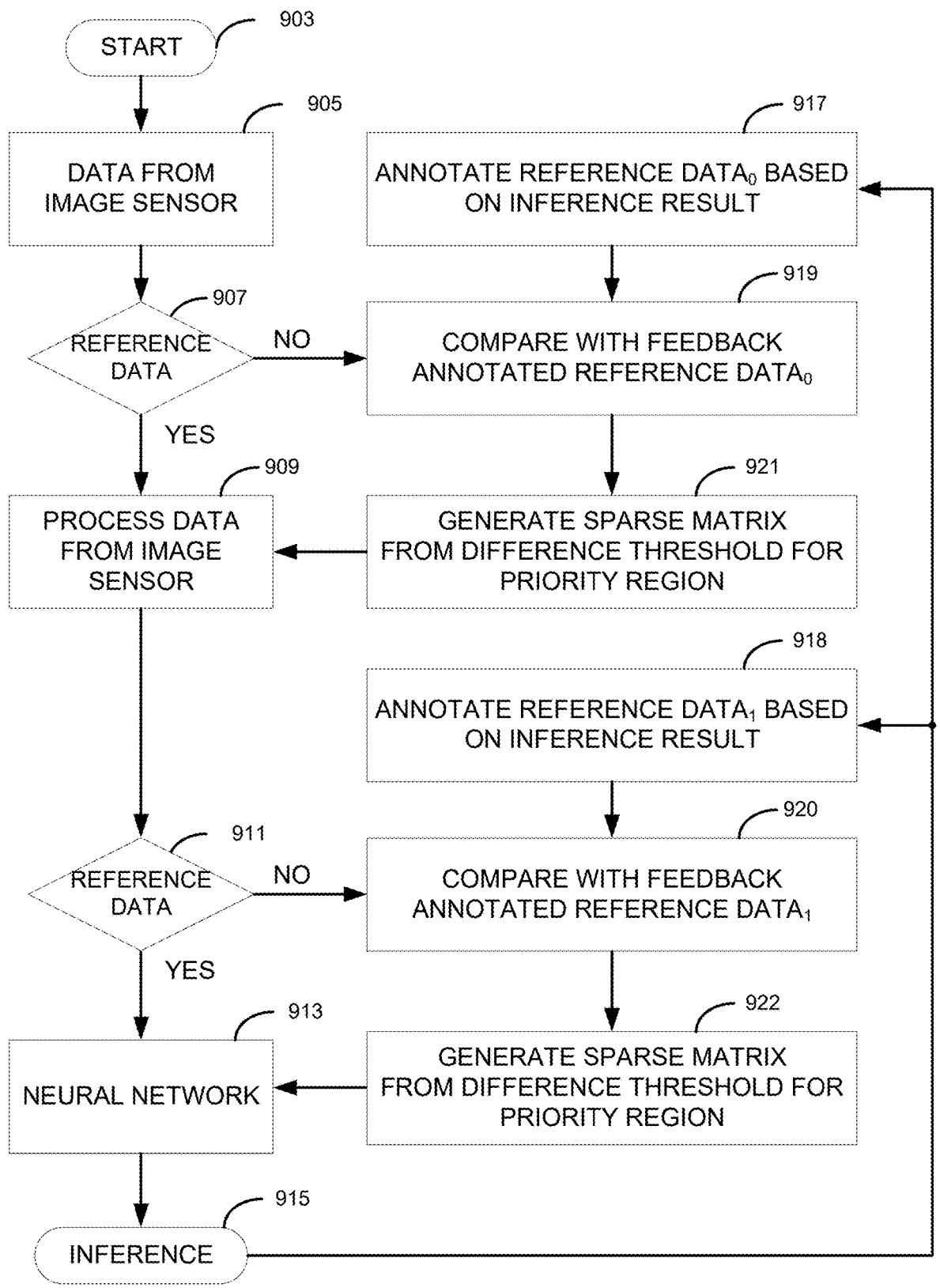

FIG. 37
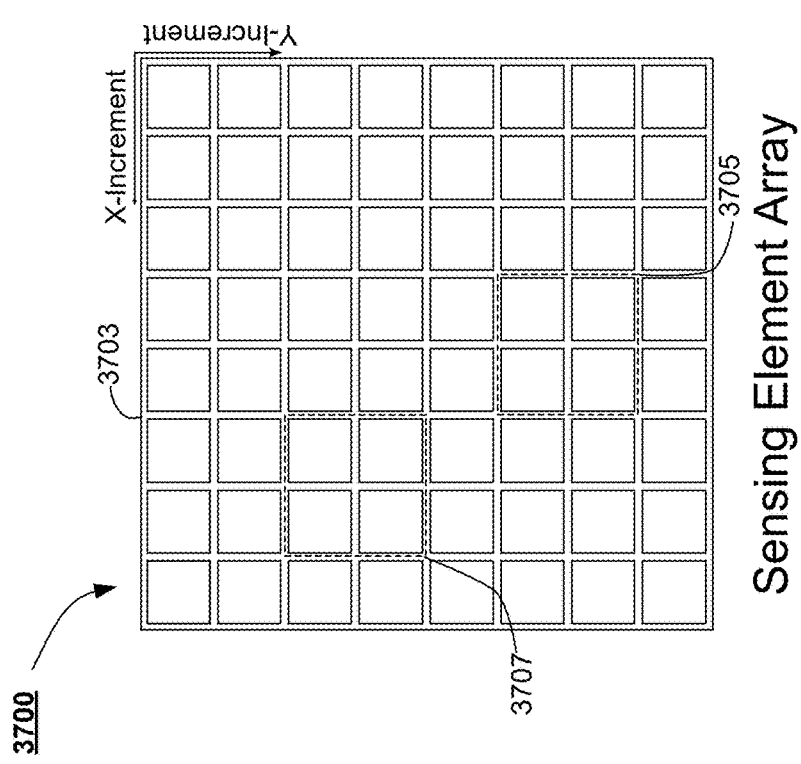
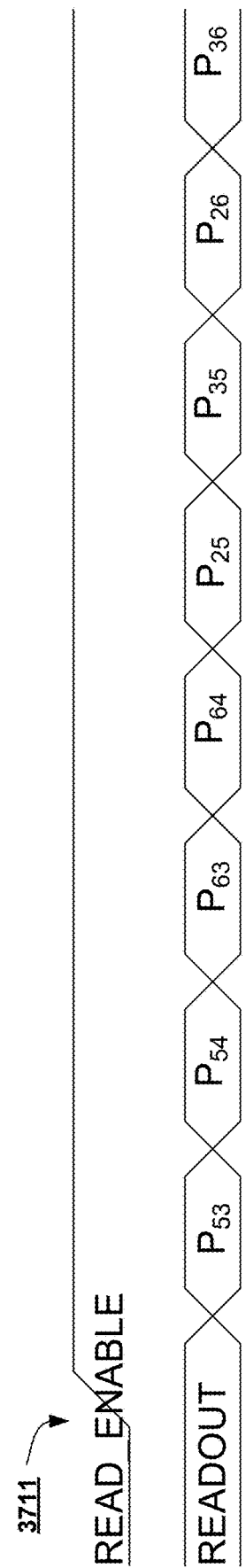

3800

3900

4000

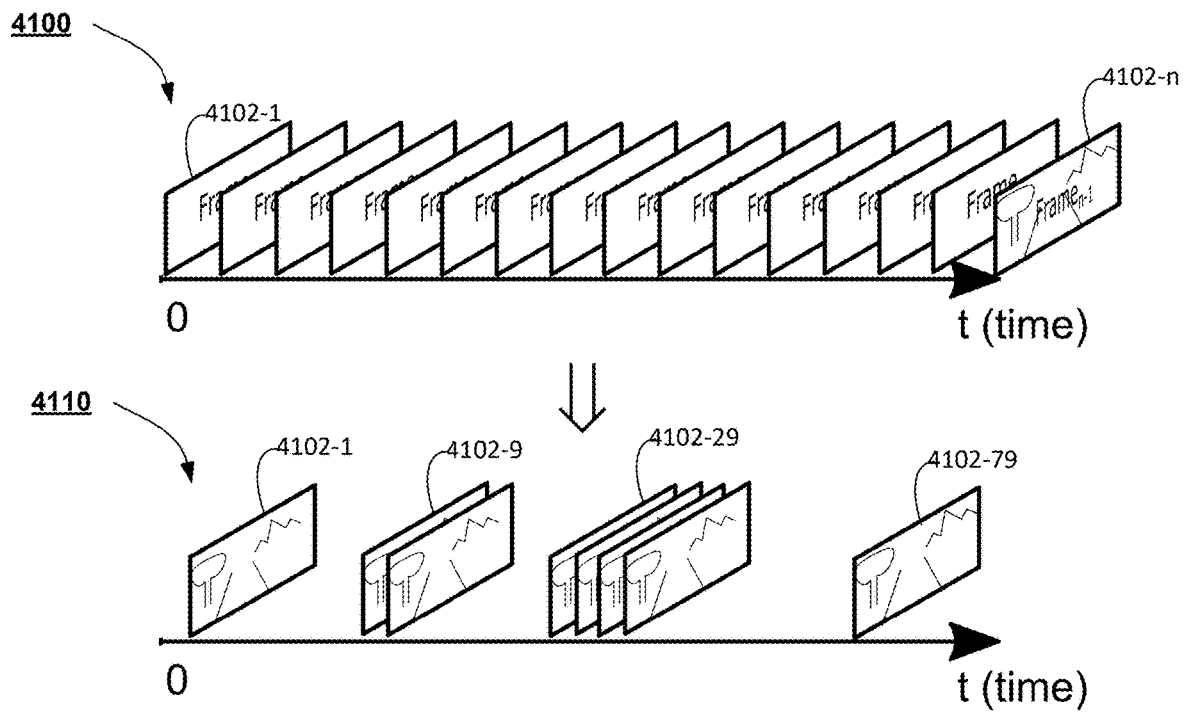
FIG.41
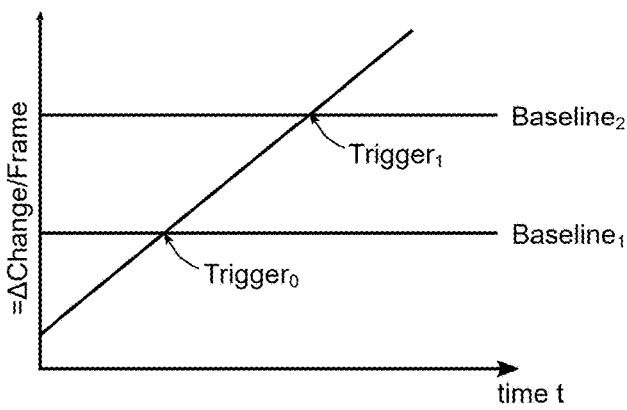

NCF Module and Die Integration options

Stacked CIS Die

4330

SIP: System In a Package

Sensor SIP/Chiplet

4320

Double Sided Sensor module

4340

Smart Sensor

4310

4400

4450

4500

4600

4650

4700

SMART SENSOR

CROSS REFERENCE TO RELATED APPLICATIONS

This application is a continuation of U.S. patent application Ser. No. 17/359,286, filed Jun. 25, 2021; which claims benefit under 35 U.S.C. § 119(e) of Provisional U.S. Patent Application No. 63/158,887, filed Mar. 10, 2021; Provisional U.S. Patent Application No. 63/133,119, filed Dec. 31, 2020; and Provisional U.S. Patent Application No. 62/705,442, filed Jun. 27, 2020; the contents of each of which are incorporated herein by reference in their entirety.

BACKGROUND

This disclosure relates generally to connected sensor devices.

With the advent of the internet of things and the continued pervasiveness of the digital age, the use of sensors continues to increase. Raw data from many types of sensors is generated and amassed, including from sensors such as image sensing, temperature sensing, and gravity sensing apparatuses, or any apparatus which senses physical energy. Often sensors are coupled to systems configured with processors that process and interpret raw data from the sensor in a manner that is useful in all manner of practical applications.

As the number of sensors coupled to a system continues to grow, the amount of data gathered increases leading to increased processing needs to interpret the gathered data, increased electrical power needs to support the increased processing, increased latency, and increased network bandwidth to communicate results to a consumer of the sensor data. A sensor may be equipped with memory that temporarily stores the raw sensor data, and the sensor may be coupled to a consumer of the raw sensor data which may subsequently retrieve the raw data from the memory at a time the consumer is ready to consume the sensor data, such as when processing power is available. The total processing power of a sensor system may define a maximum throughput for processing and interpretation of sensor data.

BRIEF DESCRIPTION OF THE DRAWINGS

Embodiments of the present disclosure will be described more fully hereinafter with reference to the accompanying drawings. Commonly numbered elements in the drawings are the same as described herein. The drawings include the following figures:

FIG. 5 is an example smart sensor method including processing control based on raw and preprocessed reference data.

FIG. 7 is an example smart sensor method including processing control using a sparse matrix from raw and preprocessed data.

FIG. 8A is an example smart sensor method including processing control using annotated raw reference data.

FIG. 9 is an example smart sensor method including processing control using annotated raw and preprocessed reference data.

FIG. 37 illustrates a timing diagram showing some aspects of processing data in a smart sensor in accordance with some embodiments.

FIG. 41 illustrates some aspects of threshold-based processing of data in a smart sensor in accordance with some embodiments.

It should be noted that the structures and timing diagrams depicted in the various figures are not necessarily drawn to scale, but rather are drawn in a manner to more clearly illustrate the teachings depicted therein.

DETAILED DESCRIPTION

Smart sensor methods and systems are described herein that improve prior systems by, for example, reducing the power, processing, or bandwidth requirements for remote connected sensors, or by reducing the latency required for control and decision systems. An example device includes a sensor, a memory, a network connection, and two processing units, wherein a first processing unit compares current data provided by the first sensor to the reference data previously provided by the first sensor. Based on the result of the comparison, a second processing unit may be enabled to process the current data, or may be disabled to prevent the second processing unit from processing the current data. In an aspect, the output of the second processing unit may be sent to a sensor data consumer via the network connection. Such a consumer of sensor data may be remote, for example where the network is an Ethernet network, or less remote, for example where the network is a local computer bus network.

Figure 1:
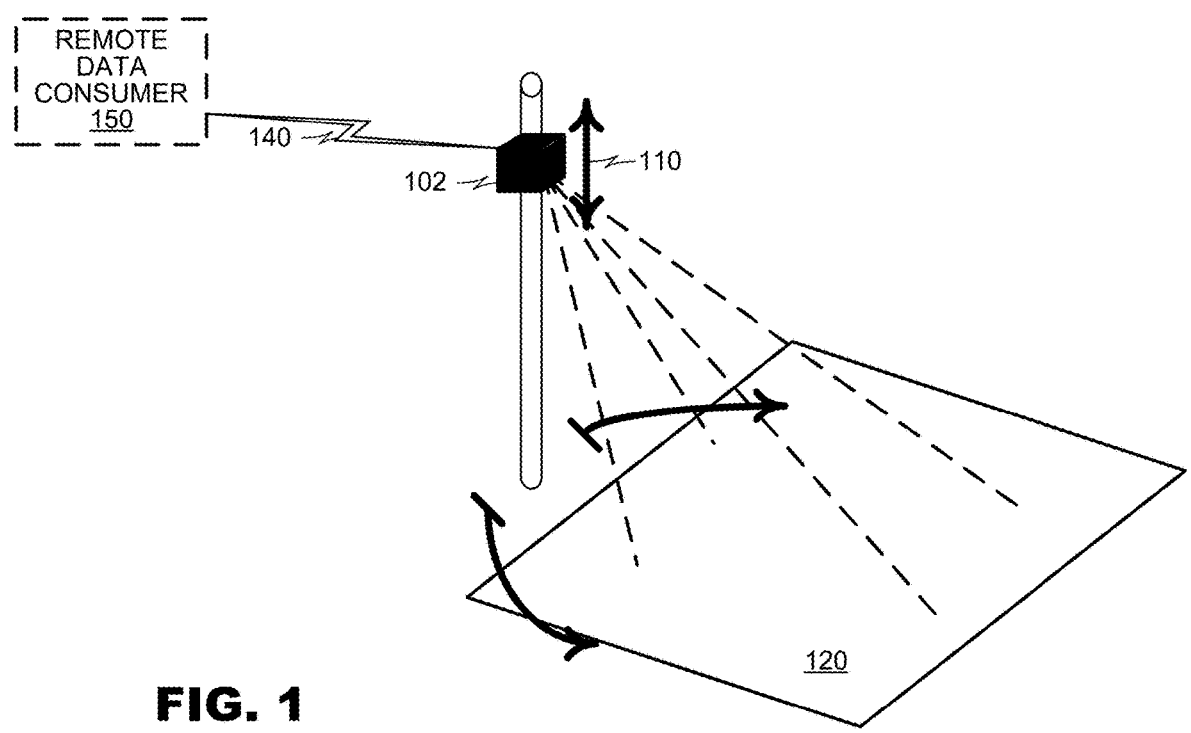
FIG. 1 depicts an example sensor system.

FIG. 1 depicts an example sensor system 100. In sensor system 100, a sensor device 102 may sense an area 120, process the sensed data, and optionally send the processed data to an optional remote data consumer 150 of sensor data via a network 140. The sensor device 102 may include a camera for capturing images of a scene such as area 120. In an aspect, the local processing within sensor device 102 may generate a control signals for controlling the sensor 102. For example, the control signals may disable some processing or transmission of the sensor data, which may lead to reduced requirements for processing capability, power, and/or bandwidth.

In an aspect, the locally generated control signals may control the height 110 or rotation 112 of the sensed area 120, or may physically move the sensor device 102. In another aspect, some control signals for the smart sensor may be generated by the optional remote data consumer 150.

Example embodiments of system 100 might include a security system for monitoring security of area 120, or a quality control system for monitoring quality of manufactured goods flowing through area 120, or an object recognition system for recognizing objects in area 120. In the example of a security system, the processed sensor data provided to remote data consumer 150 may include identification of a moving object and image data of the moving object, where the identification of the moving object is an inference resulting from analysis of image sensor data. A control signal may disable the additional local processing when little movement is detected in the area being secured, and this may reduce processing capacity, power, and heat dissipation demands for the sensor device 102. If the sensor device 102 is powered by a battery, the power saving from such processing control may be particularly beneficial. Furthermore, bandwidth requirements of a network connection to the remote data consumer 150, such as a central security server, may be reduced by only transmitting data to the remote data consumer 150 when the control signal indicates a threshold degree of movement is detected.

In the example of a quality control system, the processed sensor data provided to the remote data consumer 150 may include identification of a defective or misaligned manufactured part and image data of the defective or misaligned part. A control signal for disabling additional local processing may reduce processing capacity, power, and bandwidth requirements, as in the security example above.

Figure 2:
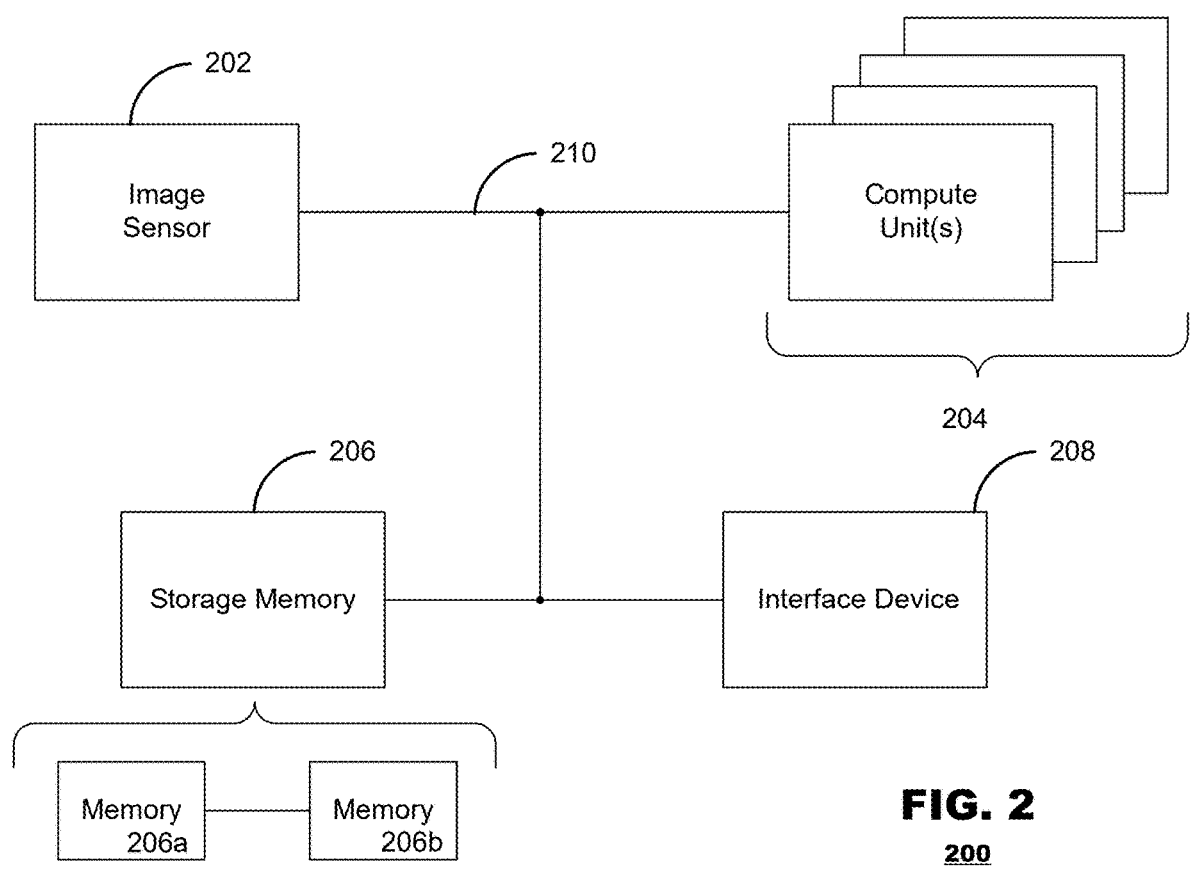
FIG. 2 depicts an example smart sensor system.

FIG. 2 depicts an example smart sensor system 200, which may be an example embodiment of the sensor device 102 of FIG. 1. The smart sensor system 200 includes an image sensor 202, storage memory 206, one or more compute units 204 and an interface device 208. All elements 202-208 may be in communication with each other such as via data bus 210. Storage memory 206 may comprise separate memories 206a, 206b that may be physical memories, or may be logically separate portions of memory 206. Compute unit(s) 204 may each perform discrete processing operations. Alternately, a single compute unit may perform multiple processing operations described herein. Individual compute units 204 may be implemented as hardware logic computations or may be implemented as a computer with a processor and instructions.

Examples of discrete compute unit(s) 204 include: a control unit to generate control signals that control the sensor and the various other compute units; a preprocessor for preprocessing of raw sensor data prior to processing by a subsequent compute unit; and a neural network processor for drawing inferences from either the raw sensor data or preprocessed sensor data. Example neural network models incorporated in a compute unit 204 may include a convolutional neural network (CNN), a deep learning neural network (DNN), a recurrent neural network (RNN), and a graph neural network (GNN).

In an example operation of the smart sensor system 200, image sensor 202 may capture a current image and store the raw captured data in memory 206*a*. A first compute unit 204 may operate as a control unit, and a second compute unit 204 may be an image analysis unit. The first compute unit may compare current image data in memory 206*a* to reference image data previous captured by the sensor stored in memory 206*b* to generate a control signal for controlling other compute units. For example, if the current data is within a threshold difference of the reference data, a second compute unit may be disabled and may not processes the current data. Alternately, if the comparison is above the threshold, the second compute unit may be enabled and may processes the current data to generate current sensor output data. In an aspect, the second compute unit may be a neural network for processing image data to produce an inference output. The current sensor output data, such as the inference, may then be sent to a remote consuming device (such as remote consumer 150) via interface device 208. When the comparison of current and reference data is within the threshold, prior processed data derived from the reference data may be retained as current output data without ever processing the current sensor data. By disabling the processing of the second control unit, processing capacity requirements may be reduced along with power requirements. Furthermore, bandwidth requirement may also be reduced by reducing the amount of processed data output from the second compute unit.

In some embodiments, a third compute unit 204 may operate as a preprocessor. The third compute unit may preprocess the raw sensor data in order to prepare it for consumption by the analysis unit. For example, the preprocessor may convert the raw sensor data from a raw image format to a different format that is appropriate for consumption by the analysis unit. Non-limiting examples of preprocessing for raw image sensor data might include changing the bit depth of image pixel values, converting the color space of the raw image sensor data, and/or analyzing data to determine heuristics. In a first aspect, the comparison of current and reference data may be of preprocessed data. In a second aspect, the comparison of current and reference data may be of raw data prior to preprocessing. In the second aspect, a control signal for the analysis unit may also control the preprocessing unit and may disable preprocessing of the raw data when the analysis unit is also disabled. By disabling the preprocessing unit in this second aspect, processing capacity and power requirements may be further reduced. In a third aspect, a comparison between current and reference data may be done on both raw and preprocessed data, and either comparison may result in enabling or disabling subsequent processing by the neural network.

The comparisons between current data and reference data with a threshold may operate in a variety of ways. For example, for an image sensor, a single difference metric between current and reference images may be determined by calculating an average absolute value of differences between corresponding pixels in a current image and a reference image. The threshold in this example may be a scalar number that is compared to the difference metric. In an alternate example, a separate difference metric may be calculated for different spatial regions of the images. In this alternate example, subsequent processing may be disabled or enabled on a per-spatial-region basis according to the corresponding difference metrics of each spatial region. An example control signal for per-region processing control may be a matrix of enable or disable decisions, where each decision corresponds to a spatial region. A sparse matrix of mixed enable or disable decisions may then be used to control subsequent processing.

In an aspect a different metric may be calculated based on a mathematical different between sensor data values, for example a difference metric may be an average or summation of the difference in brightness values of corresponding pixels in the current and reference data. In another aspect, the different metric may describe any change identified between current and reference sensor data.

In an aspect, sensor data may be annotated with the results of the processing of sensor data. For example, processing of image sensor data may produce an inference from the captured images about the scene observed by the sensor. Such an inference may include as identification of a region in an image that contains a moving object, or the inference may identify of the type of object that is moving. Annotation of current data with results from previous inference allows highlighting of areas of interest or high priority regions or for marking exclusion regions or low priority regions in current data. An annotation combines sensor data with an inference. For example, for image sensor data, an image captured by the sensor may be annotated with an inference by modifying pixel data. The modified pixel data may be a highlight or brightened pixels in regions that are higher priority, while deprioritized regions may be dimmed, and excluded regions may be black (have brightness set to a minimum level). For example, in the use case of a smart image sensor in an autonomous vehicle, inference results can be used to annotate a region in the field of view of the sensor to exclude it from, or deprioritize the region for, subsequent processing of sensor data. Annotation of inference results allows highlighting of critical (higher priority) features in the sensor data. An annotated sensor image data may be referred to herein as a context map, which may be a map of regions of interest, and may allowed for enhancing the feature-map generation efficacy and inference or classification speed of artificial intelligence (AI) and neural network processing. When a context map indicates a region is excluded from subsequent processing, processing capacity and power requirements are reduced. Alternately, when a context map indicates a region is deprioritized, the order of future processing for the regions may be altered, resulting in a lower latency to complete the processing of higher priority regions.

In the autonomous vehicle use case, on a highway, inference data can mark a road boundary to ignore changes beyond the boundary, or map a region in the reference data for priority computation instead of an ordinary sequential computation of regions to more quickly deduce any changes of interest to vehicular trajectory in that priority region. Non-limiting examples where reference results can be applied as a masking layer on current data include focus or prioritization of regions of interest by different parameters, such as safety of vehicular occupants, stability of the vehicle, and so on.

In agricultural use cases like monitoring plant parameters, regions captured by a sensor outside of the plant boundary may not need to be computed, and be safely discarded. For example, in the case of visual monitoring of plant health in a green house, data captured by a sensor outside the immediate vicinity of a plant (say, the area between two rows of plants) is non-useful and can be discarded thereby saving computation power. Data in specific areas of monitoring interest can be enhanced allowing AI software to more efficiently generate feature maps or provide inference or classification results. Generation of these areas to emphasize or deemphasize can be self generated by the smart sensor system based on heuristic methods (among other techniques) as outlined further in this specification With the advent of the internet of things, sensors are increasingly utilized in various environments. While the smart sensor system 200 includes an image sensor, other types of smart sensors are possible. Examples of alternate types of sensors include thermal sensors, proximity sensors, infrared (IR) sensors (including LIDAR), inertial sensors, ultrasonic sensors, humidity sensors, gas sensors, accelerometers, time of flight, etc. As used herein, a sensor refers to an apparatus which senses physical energy and provides an output signal, such that the output signal is based on and correlates to the sensed physical energy. In another example, the sensor converts the sensed physical energy into an electrical analog signal. Examples of physical energy include thermal energy, radiant energy, chemical energy, nuclear energy, electrical energy, motion energy, sound energy, elastic energy, gravitational energy, electromagnetic energy, and the like.

Various embodiments described herein, such as the smart sensor system 200 of FIG. 2, include an image sensor. The use of image sensors in the examples is not meant to be limiting, but rather illustrative of the features of the disclosed invention.

The areas in which image sensors are utilized is vast (e.g., communication, transportation, medicine, manufacturing, social media, etc.). Image sensors may be used to enhance, record, observe, and sometimes replace visual processing by a human. For example, an image sensor may be used in backup cameras in a vehicle, in a flying vehicle to aid a pilot during flight or to provide visual data to a system configured to fly the vehicle (e.g., autopilot, drones, etc.).

Image sensors can also be used in the medical fields. For example, image sensors can be placed on surgical tools, such as endoscopes and the like, to help a surgeon see an environment in which she is operating. Image sensors can also be placed within robots configured to perform surgery with minimal to no human help. Image sensor are also utilized in manufacturing. For example, an image sensor may be integrated within a machine configured to perform a specific operation in an assembly line.

In other examples, image sensors are used in surveillance cameras, on smartphones, tablets, web cameras, and desktop computers. The small sampling of examples of areas in which image sensors are utilized is illustrative and not meant to a limiting set of examples.

In some systems, sensors (e.g., including image and other types of sensors) utilize methods that buffer or store data of interest in quick access memory and transfer the data of interest to a processor (e.g., a central processing unit that is not implemented within the image sensor) for analysis and interpretation. In such methods, the image sensors do not analyze the data but transfer the stored data to the processor for further analysis. Such methods have a latency cost, a processing cost, and memory costs inherent in storing data and transferring data between a peripheral device and a processor located elsewhere within a system.

Method and systems described herein, capture a smart sensor configured to manipulate data in a manner that assists the data analysis and interpretation processes of the sensor system. Some embodiments described herein are directed to methods and systems that offload data analysis and interpretation tasks from a processor of the sensor system to individual smart sensors within the sensor system itself. A sensor system that uses smart sensors may benefit from reduced latency costs, reduced memory costs (e.g., reduced amount of memory needed to store raw data), and reduced processing costs associated with performing data analysis and interpretation entirely on a processor coupled to the smart sensor or integrated into the sensor.

As described herein, a smart sensor may be configured to analyze data physically proximal to the sensing element and prior to transferring data via a network for further processing to a sensor data consumer. In one example embodiment, the smart sensor includes a pixel array having rows and columns of pixels, where each pixel is configured to sense physical energy. The smart sensor converts the physical energy to an analog signal. The smart sensor can additionally include an analog processing unit coupled to the pixel array, which converts the analog signal to a digital signal.

Furthermore, the smart sensor may include a digital processing unit. The digital processing unit may be configured to analyze the digital signal. In one example, the digital processing unit performs an operation on the digital signal and compares the digital signal to reference data, wherein the reference data is received from a processor coupled to the smart sensor.

The digital processing unit is separate from the processor, wherein the digital processing unit is implemented within the smart sensor, whereas the processor is not implemented or including in the smart sensor. The processor may be implemented in a separate system coupled to the smart sensor. An example sensor system includes a sensor data consumer that may include a processor and a memory, wherein the smart sensor is coupled to the central system by way of the network.

Furthermore, the processor may include control circuitry, whereas the digital processing unit does not include the same control circuitry, and the digital processing unit receives instructions from the processor on how to analyze particular data from the sensor. In some embodiments, the digital processing unit may transmit an indicator signal to the processor upon determining that the analyzed data is above a threshold value.

A typical image sensor has twice as many green elements as red or blue to mimic the physiology of the human eye. The luminance perception of the human retina uses M and L cone cells combined, during daylight vision, which are most sensitive to green light. Often the sensors are coupled to systems configured with processors that process and interpret the raw data in a manner that is meaningful to the human. Accordingly, an image sensor pixel pattern that is suitable for efficient computation is needed.

Furthermore, there may or may not be a change in the post processed data of output data of a sensor without a corresponding change in the output data of a sensor. If there is a change in the post processed output data of a sensor without a corresponding change in the output data of a sensor it may be considered noise or an artifact of post processing output data of the sensor. This may be used to implement an optimized processing of output data of a sensor. For example, the output data of a CMOS image sensor with a Bayer pattern for color imaging that may be processed to detect a change in the output of the CMOS image sensor without post processing.

Figure 3:
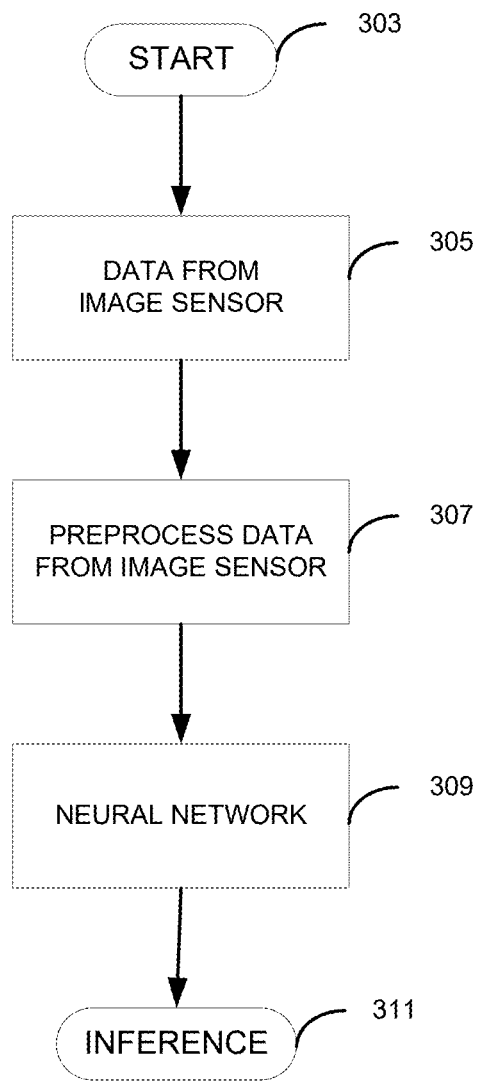
FIG. 3 is an example smart sensor method.

FIG. 3 is an example smart sensor method 300. Method 300 may be performed by a smart sensor system such as the smart sensor system 200 of FIG. 2. Raw data may be generated by a sensor (305), which is then preprocessed (307) for subsequent processing by a neural network (309). The output from the neural network processing may include an inference (311). For example, raw sensor data may be generated as digital measurements of physical energy in the physical proximity of the sensor. For example, an image sensor may comprise physical color light sensors in a Bayer filter BGRG arrangement that produces an array of raw color values corresponding to the individual color sensor measurements of a lighted physical scene exposed to the sensor. The preprocessing may change the bit-depth of the raw measurements and/or may include a color format conversion, such as converting an array of color measurements in a BGRG arrangement into another standard color pixel format such as RGB or YUV. The neural network may be a convolutional neural network and may be configured to produce an inference such as identification of moving objects in the captured scene or recognition of a certain type of object.

Figure 4A:
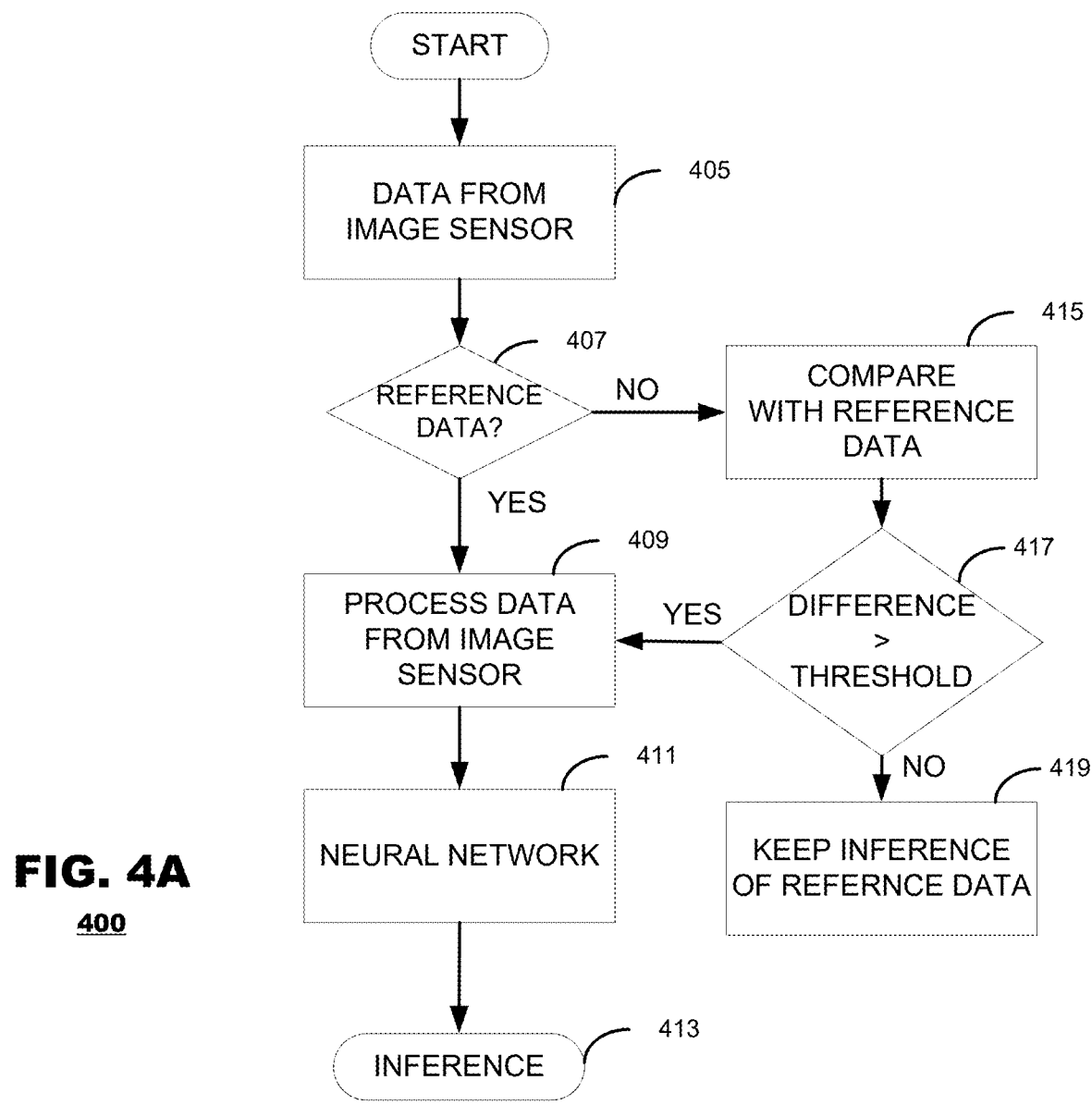
FIG. 4A is an example smart sensor method including processing control based on raw reference data.

FIG. 4A is an example smart sensor method 400 including processing control based on raw reference data. In method 400, current raw data is generated by a sensor (405). If the raw data is reference data (407), for example because no reference data has already been saved, then the processing may continue with the processing control of boxes 415/417/419 as further described herein. Otherwise, raw sensor data may be preprocessed (409) and analyzed by a neural network (411) to generate an inference (413). If the raw data is intended to be reference data, it may be saved as raw reference data along with the inference generated from that data. Alternately, if reference data already exists, the raw sensor data is not reference data and may be compared to prior saved raw reference data (415) to generate a difference metric. When the difference metric is above a threshold (417) processing of the current raw data may continue (409, 411), otherwise subsequent processing of the current data may be disabled and a prior inference may be retained as a current inference (419).

In an aspect, the processing of data immediately prior to analysis by a neural network, as in boxes 409, 411 may include preprocessing for the purpose of consumption by the neural network. Such preprocessing may include converting a data format, adjusting the amount of data by reducing a resolution or subsampling techniques, performing statistical analysis, or heuristic analysis of the raw data. In aspects, preprocessing may be done separately on separate portions of sensor data, for example certain regions of sensor image data may have a resolution reduced, or statistics or heuristics may be developed per spatial region. In another aspect, raw sensor data may be analog signals, and preprocessing of analog sensor data may include converting the analog signals into digital signals. In yet another aspect, preprocessing may include masking data, such as masking low-order bits in data values (to produce reduced precision values) or masking off all high-order bits (which may leave the low-order noise filled bits for noise analysis in later processing).

In an aspect, reference data may be generated from a different sensor and not generated by the sensor that generated the current data. For example, if two sensors are monitoring the same area, reference data may come from a different sensor, and then the comparison between reference data and current data may be between one sensor's data and another sensor's data.

Figure 4B:
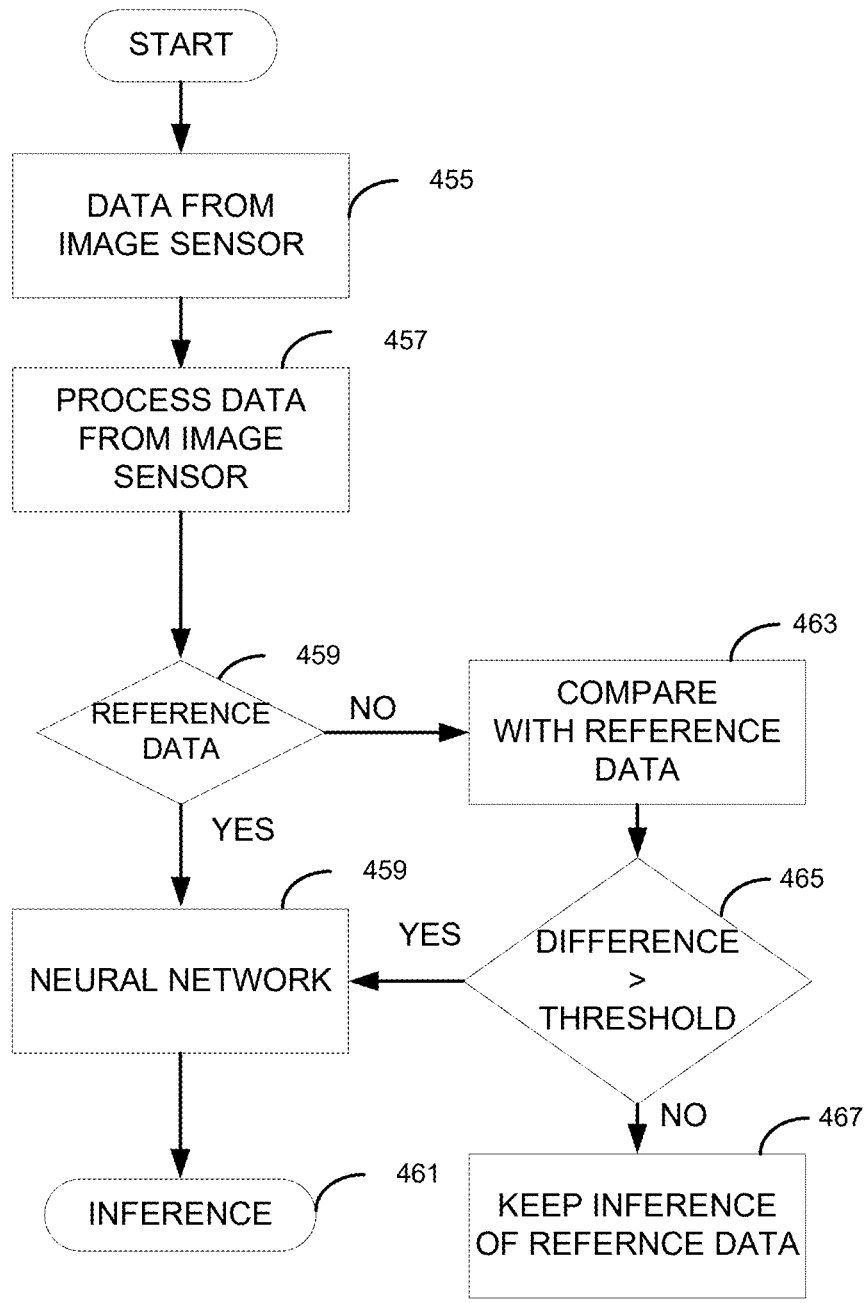
FIG. 4B is an example smart sensor method including processing control based on preprocessed reference data.

FIG. 4B is an example smart sensor method 450 including processing control based on preprocessed reference data. In method 450, neural network processing of current data is enabled or disabled based on a comparison of preprocessed reference data to preprocessed sensor data. In method 450, current raw data is generated by a sensor (455) and then preprocessed (457). If the preprocessed data is reference data (459), for example because no reference data has already been saved, then the processing may continue with the processing control of boxes 463/465/467 as further described herein. Otherwise, the preprocessed data may be directly analyzed by a neural network (459) to generate an inference (461). If the preprocessed data is intended to be reference data, it may be saved as preprocessed reference data along with the inference generated from that data. Alternately, if reference data already exists, the preprocessed data is not reference data and may be compared to prior saved preprocessed data (463) to generate a difference metric. When the difference metric meets a threshold test (465) (for example when the difference is above a threshold), processing of the current raw data may continue (459), otherwise subsequent processing of the current data may be disabled and a prior inference may be retained as a current inference (467).

FIG. 5 is an example smart sensor method 500 including processing control based on both raw and preprocessed reference data. In method 500, neural network processing of current data is enabled or disabled based on comparisons between senor data and reference data for both raw and preprocessed data. In method 500, current raw data is generated by a sensor (505). If the raw sensor data is reference data $Data_0$ (507), then the processing may continue with the processing control of boxes 517/519/521. Otherwise, the raw sensor data is processed (509) and checked again to determine if it is processed reference data $Data_1$ (511), and if not, it is process per the processing control of boxes 523/525/527. If the processed data is reference data, it may be analyzed by a neural network (513) to generate an inference (515). If reference data already exists, the raw sensor data is not reference data and may be compared to prior saved raw sensor data (517) to generate a difference metric. When the difference metric is above a threshold (519) processing of the current raw data may continue (509), otherwise subsequent processing of the current data may be disabled and a prior inference may be retained as a current inference (521). If the processed data already exists, the processed data is not reference data and may be compared to prior saved processed data (523) to generate a difference metric. When the difference metric is above a threshold (525) processing of the current processed data may continue (513), otherwise subsequent processing of the current processed data may be disabled and a prior inference may be retained as a current inference (527).

Figure 6A:
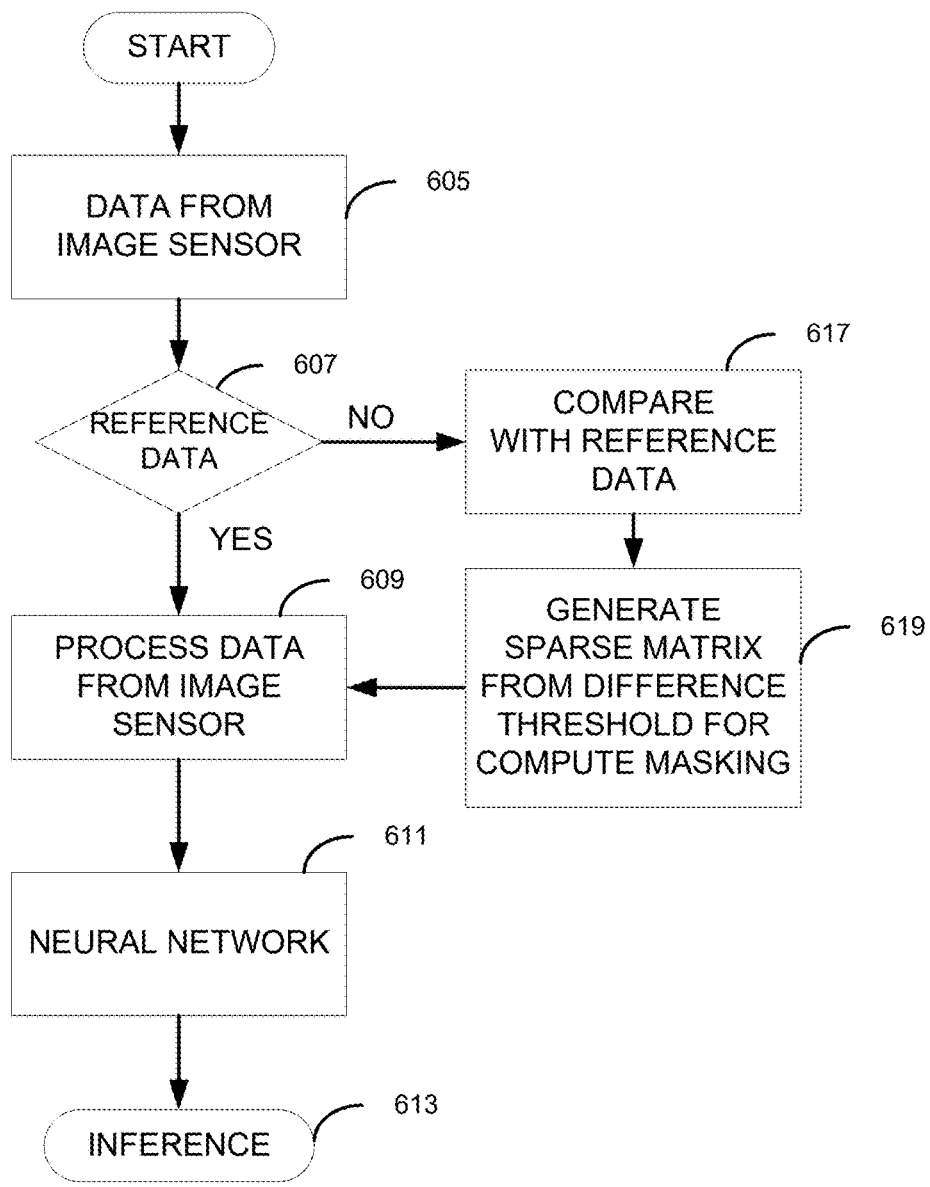
FIG. 6A is an example smart sensor method including processing control using a sparse matrix from raw data.

FIG. 6A is an example smart sensor method 600 including processing control using a sparse matrix from raw data. In method 600, current raw data is generated by a sensor (605) and checked to determine if it is reference data (607). A collection of the raw sensor data (such as a captured image) may be split into discrete portions (such as spatial regions of the image) and a comparison of the sensor data to the reference data (617) may be performed separately for each portion of the sensor data to generate an enable/disable control signal for each portion (box 619). The collection of control signals for the raw sample data may be represented as a sparse matrix and used to control subsequent processing of the image data (including boxes 609/611/613).

In aspects, the control signals for controlling processing of image data (such as by box 609 of FIG. 6A) may include priorities for discrete portions of data instead of a simple enable/disable control per portion. The priorities may then be used to control subsequent processing.

In a first example, priorities may control the order of subsequent processing. Priorities for the portions can then be used for controlling the order in which the portions are processed, leading higher priority portions to be processed before lower priority portions. In systems with a time constraint on the processing, this may lead to lower priority portions never being processed. For example, if there is only sufficient processing capability to process half of the sensor data collected in one sensor sample period, then the lowest priority half of the portions of sensor data will not have been processed when the time constraint of a single sensor sample period is met. Priority-ordered processing of senor data can lead to earlier (lower-latency) inferences or control decisions for the higher priority portions first. See FIGS. 24A, 24B and 25 for further discussion of reduced latency inferences and decision control.

In a second example, per-portion priorities may control other aspects of the processing. Preprocessing to change image resolution may be controlled by the priorities, such that higher priority portions of sensor data are kept at a higher resolution, while lower priority portions are reduced to a lower resolution. This may allow subsequent processing, such as by a neural network, to operate on different amounts of data corresponding to the data's priority, and hence required computing capacity for each portion may be related to the portion's corresponding priority. In some applications, the relation between priority and resolution may be reversed, such that lower resolution is used for higher priority and higher resolution is used for lower priority.

Figure 6B:
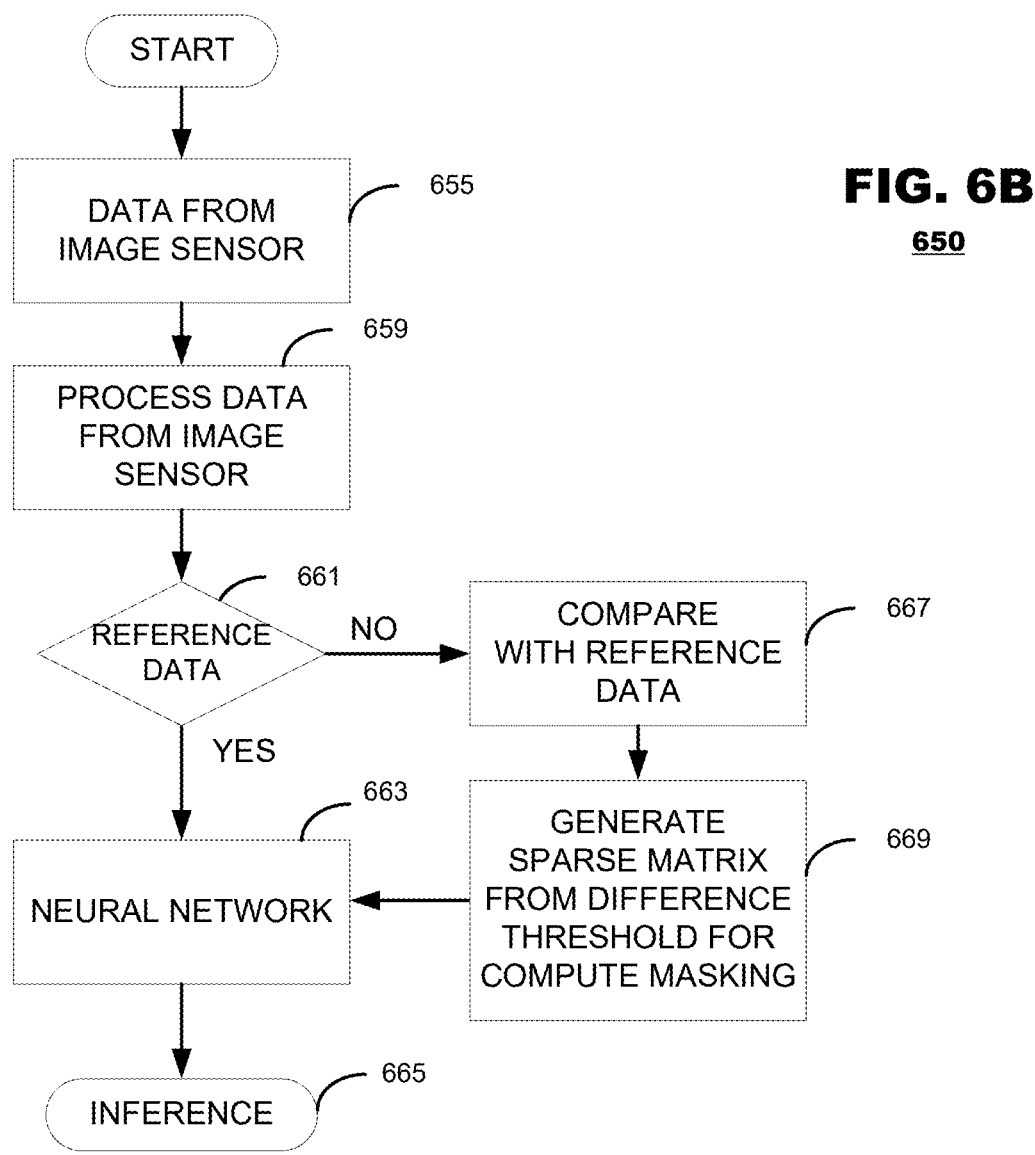
FIG. 6B is an example smart sensor method including processing control using a sparse matrix from preprocessed data.

FIG. 6B is an example smart sensor method 650 including processing control using a sparse matrix from preprocessed data. In method 650, raw data is generated by a sensor (655), preprocessed (659) and checked to determine if it is reference data (661). A collection of the preprocessed data (such as a captured image) may be split into discrete portions (such as spatial regions of the image) and a comparison of the preprocessed data to the reference data (box 667) may be performed separately for each portion of the preprocessed data to generate an enable/disable control signal for each portion (669). The collection of control signals for the preprocessed data may be represented as a sparse matrix and used to control subsequent processing of the image data (including boxes 663/665).

In other aspects, the sparse matrix control of box 669 may include priorities instead of or in addition to enable/disable controls, as described above regarding FIG. 6A. In application to FIG. 6B, per-portion priority control signals based on comparison with reference data may control the neural network processing of the corresponding portions. For example, the order of processing or other parameters of processing may be based on the priorities.

FIG. 7 is an example smart sensor method 700 including processing control using a sparse matrix from raw and preprocessed data. In method 700, current raw data is generated by a sensor (705). If the raw sensor data is reference data $Data_0$ (707), then the processing may continue in box 709. A collection of the raw sensor data (such as a captured image) may be split into discrete portions (such as spatial regions of the image) for processing (709). If the data from sensor is current data and not reference data, then a comparison of the raw current sensor data to the reference data $Data_0$ (box 717) may be performed separately for each portion of the raw sensor data to generate an enable/disable control signal for each portion of the collection of raw sensor data (719). After processing the raw sensor data (709), the processed raw sensor data is and checked again to determine if it is processed reference data $Data_1$ (711), and if not, a collection of the processed data may be split into discrete portions (such as spatial regions of the image) and a comparison of the processed data to the reference data (box 721) may be performed separately for each portion of the processed data to generate an enable/disable control signal for each portion (box 723). If the processed data is reference data $Data_1$ (711), it may be analyzed by a neural network (713) without comparison to sensor data to generate an inference (715).

FIG. 8A is an example smart sensor method 800 including processing control using annotated raw reference data. In method 800, current raw data is generated by a sensor (805) and checked to determine if it is reference data (807). A collection of the raw sensor data may be split into discrete portions and a comparison of the sensor data to the reference data (box 819) may be performed separately for each portion of the sensor data to generate an enable/disable control signal for each portion (821). The collection of control signals for the raw sample data may be represented as a sparse matrix and used to control subsequent processing of the image data (including boxes 809/813/815). After the inference is generated, it may be used to annotate the raw reference data (817)

Figure 8B:
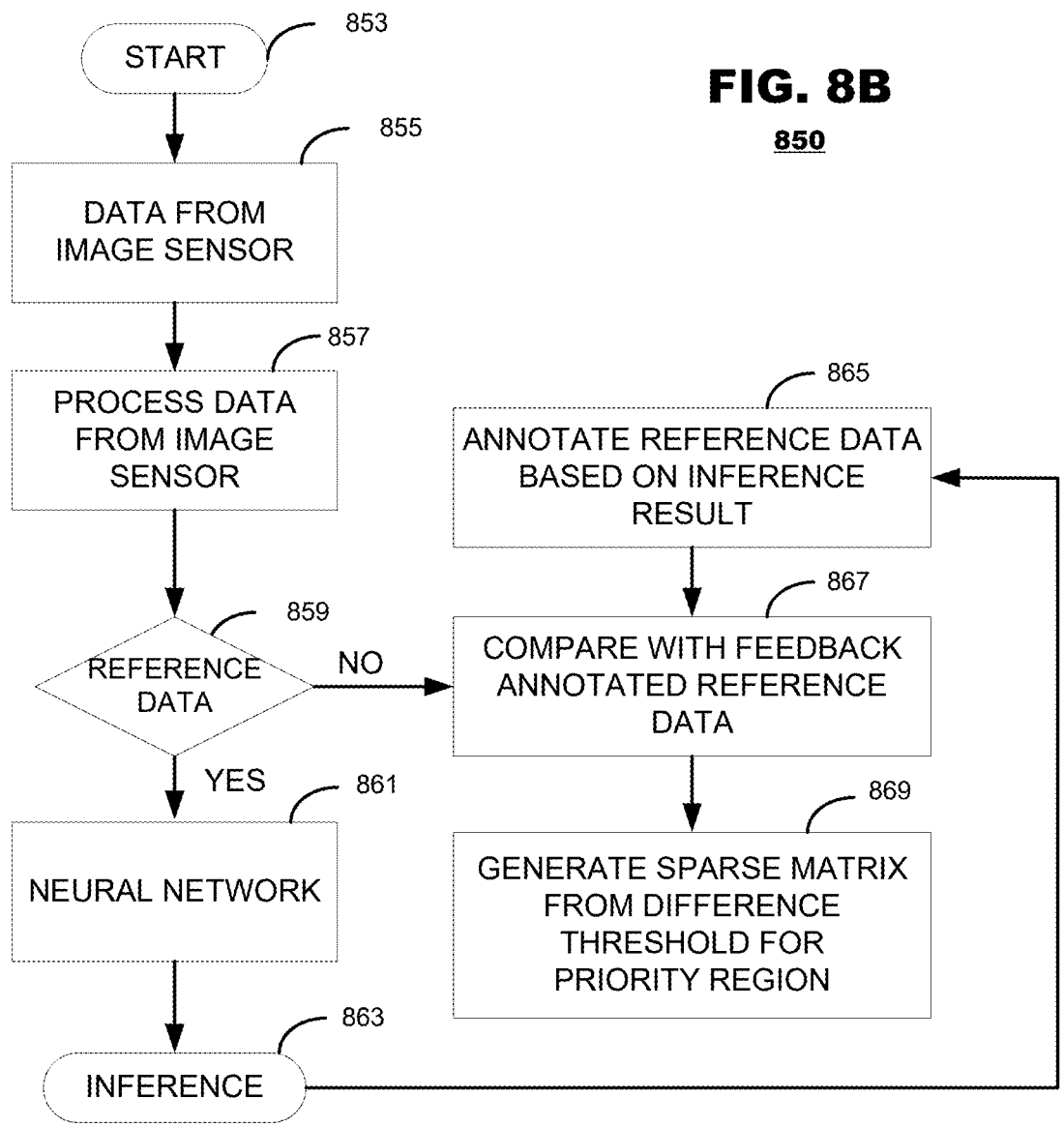
FIG. 8B is an example smart sensor method including processing control using annotated preprocessed reference data.

FIG. 8B is an example smart sensor method 850 including processing control using annotated preprocessed reference data. The method 850 is otherwise essentially the same as in method 800 where raw data is generated by a sensor (855) and processed (857) and then checked to determine if it is reference data (859). A collection of the processed data may be split into discrete portions and a comparison of the processed data to the reference data (box 867) may be performed separately for each portion of the processed data to generate an enable/disable control signal for each portion (869). The collection of control signals for the processed data may be represented as a sparse matrix and used to control subsequent processing of the image data (including boxes 859/861/863). After the inference is generated, it may be used to annotate the raw reference data (865)

FIG. 9 is an example smart sensor method 900 including processing control using annotated raw and preprocessed reference data. In method 900, current raw data is generated by a sensor (905). If the raw sensor data is reference data (907), then the processing may continue. A collection of the raw sensor data may be split into discrete portions and a comparison of the raw sensor data to the reference data (box 919) may be performed separately for each portion of the raw sensor data to generate an enable/disable control signal for each portion (921). Otherwise, the raw sensor data is processed (909) and checked again to determine if it is reference data (911), and if not, a collection of the processed data may be split into discrete portions and a comparison of the processed data to the reference data (box 920) may be performed separately for each portion of the processed data to generate an enable/disable control signal for each portion (box 922). If the processed data is reference data, it may be analyzed by a neural network (913) to generate an inference (915), which may then be fed back to the sensor control processed 917-922 by first annotating the raw reference data $Data_0$ (917) and processed reference data $Data_1$ (918), followed by comparison processes (919 and 920) and generating sparse control matrices (921 and 922).

Figure 10:
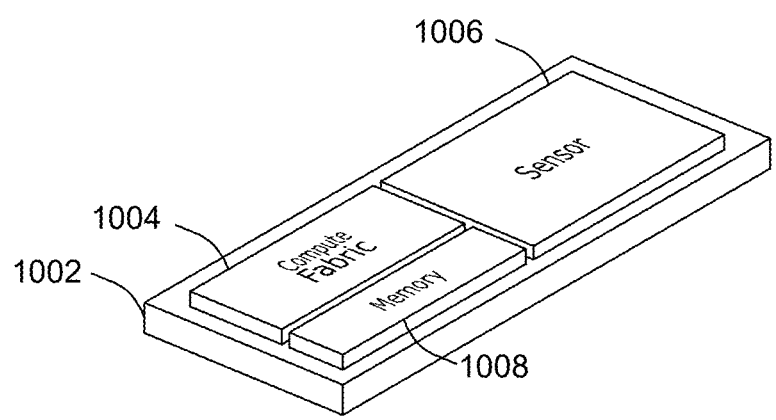
FIG. 10 illustrates a representation of some aspects of a chiplet in accordance with some embodiments.

FIG. 10 illustrates a representation of some aspects of a chiplet 1000 based smart sensor system on a common substrate 1002, including a compute fabric 1004, memory 1008 and sensor 1006, in accordance with some embodiments.

A compute fabric as used herein may include the collection of all compute processing elements involved in acquiring and consuming sensor data. For example, a smart sensor system may include a compute fabric consisting of connected heterogenous computing elements for performing, for example, the preprocessing, neural network processing, and processing control of sensor data described herein, such as in FIGS. 3-9 and 44A-47.

Figure 11:
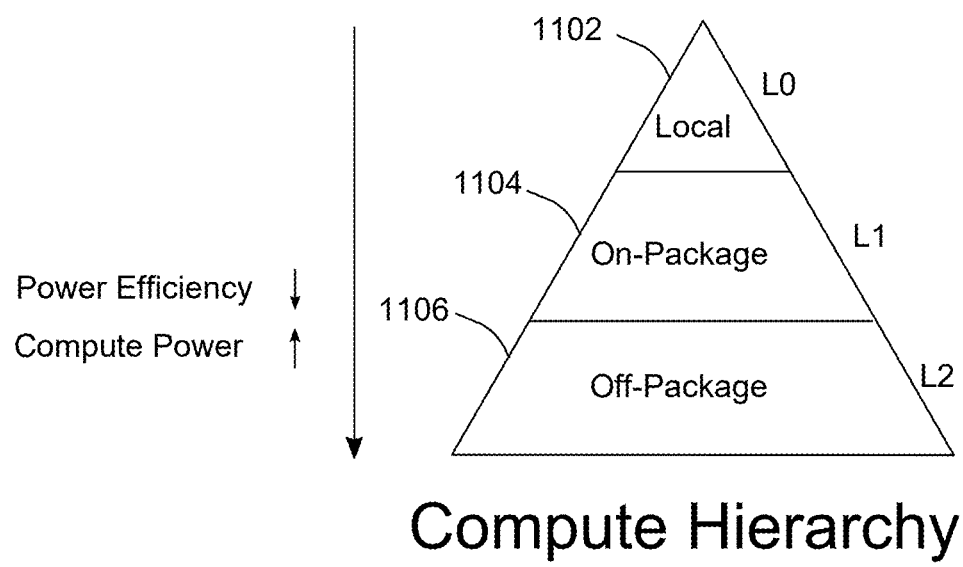
FIG. 11 illustrates compute hierarchy in a smart sensor system with a compute fabric in accordance with some embodiments.

FIG. 11 illustrates compute hierarchy 1100 in a smart sensor system with a compute fabric, in accordance with some embodiments. Compute processing of associated sensor data at a local level L0 (1102) is more powerful and power efficient than compute processing at an on-package level L1 (1104) than compute processing at an off-package level L2 (1106). For example, local level L0 processing may include processing done within a single silicon chip, while on-package level L1 processing my include processing done in separate silicon chips bound together in a single integrated circuit package. Off package level L2 processing may include processing done on separate packages on a single circuit board, or may include processing done across separate computers linked only by a network such as the Internet. More generally, levels L0, L1, L2 represent degrees of physical proximity and/or logical proximity and different types of connections between the computing elements.

Figure 12:
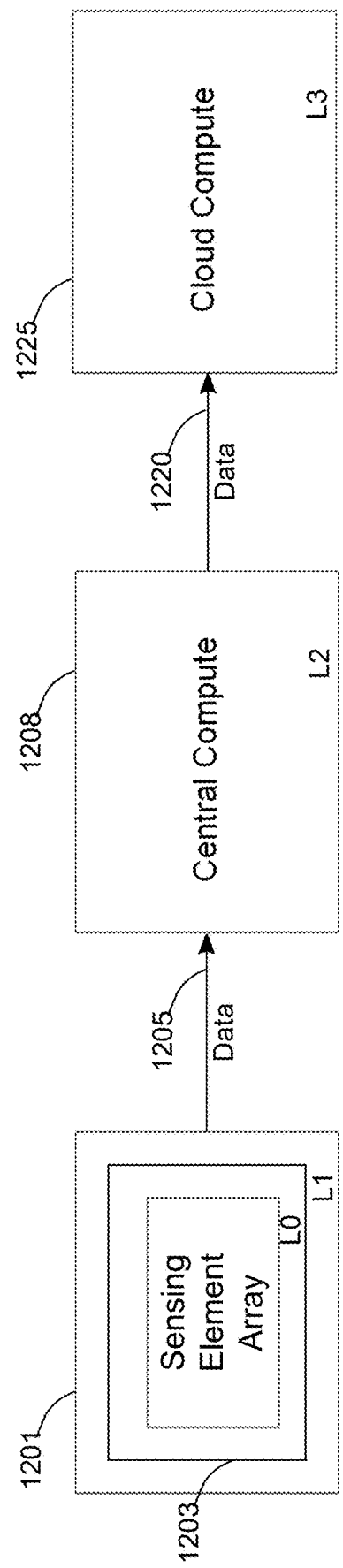
FIG. 12 illustrates a compute hierarchy in a smart sensor system with compute fabric and a data flow in accordance with some embodiments.

FIG. 12 illustrates compute hierarchy 1200 in a smart sensor system with compute fabric and a data flow, in accordance with some embodiments. A sensing element array 1203 at local level L0, which is on-package 1201 at level L1, sends data 1205 to an off-package 1208 level L2, which may in turn send data 1220 to cloud computer 1225 at a higher off-system level L3.

Figure 13:
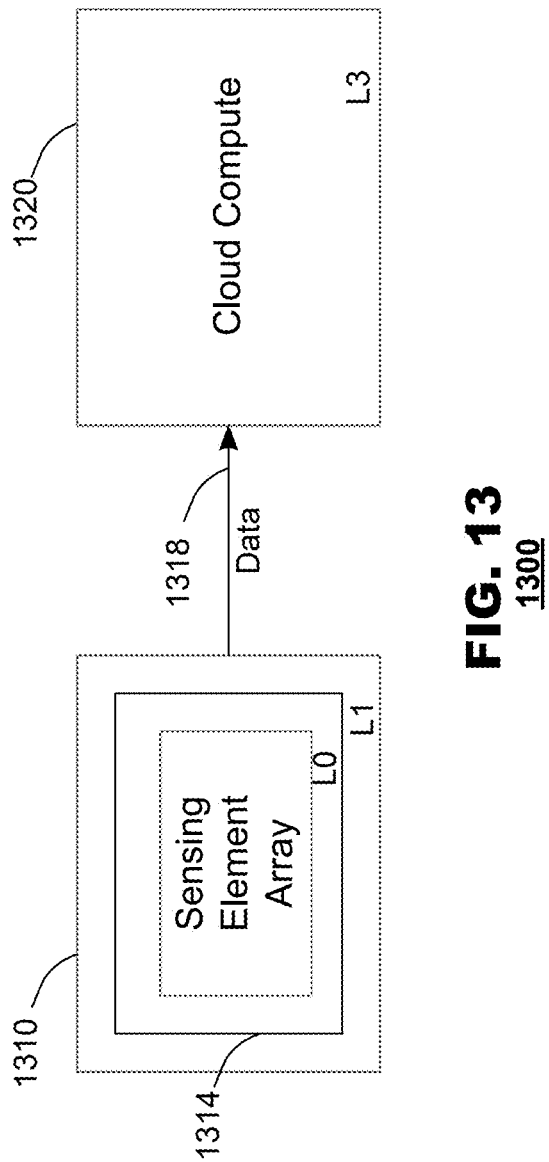
FIG. 13 illustrates compute hierarchy in a smart sensor system with compute fabric and a data flow in accordance with some embodiments.

FIG. 13 illustrates compute hierarchy 1300 in a smart sensor system with compute fabric and a data flow, in accordance with some embodiments. A sensing element array 1314 at local level L0, which is on-package 1310 at level L1, sends data 1318 directly to an off-system level L3, bypassing the off-package level L2. Examples include remotely stationed internet of things (IoT) Edge and Fog devices stationed for monitoring.

Figure 14:
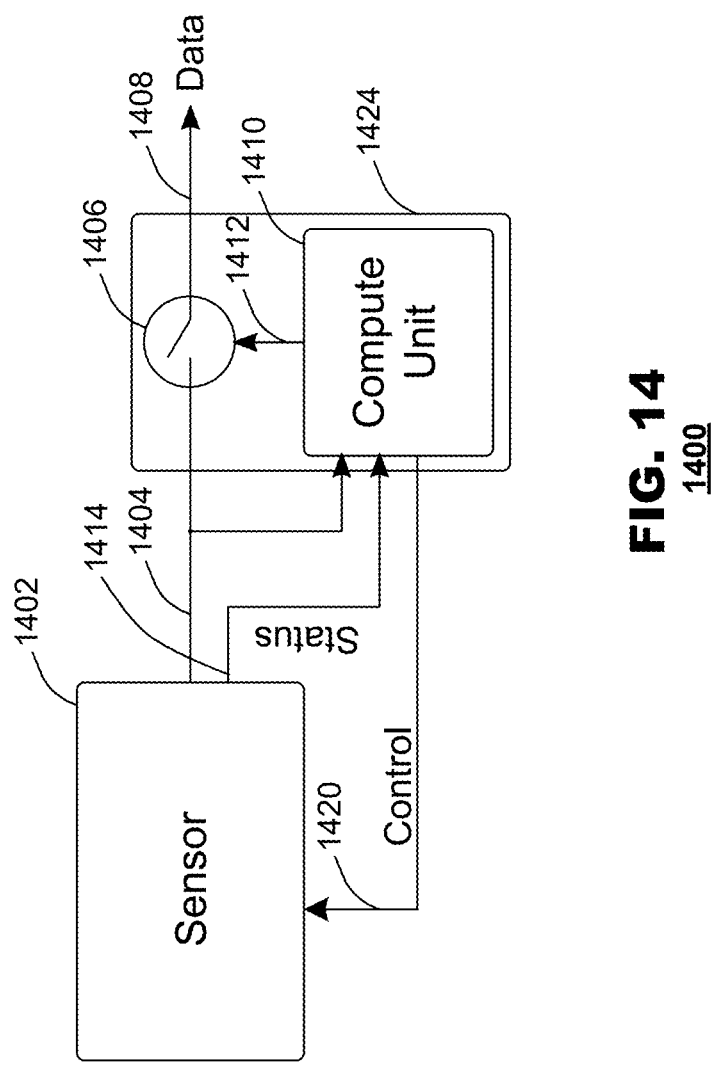
FIG. 14 illustrates a block diagram of some aspects of a smart sensor system with compute fabric and non-inline data bypass in accordance with some embodiments.

FIG. 14 illustrates a block diagram of some aspects of a smart sensor system 1400 with compute fabric hierarchy and non-inline data bypass, in accordance with some embodiments. In this embodiment, data 1404 from the sensor 1402, depending on the setting of switch 1406, may be sent off-package or off-system 1408, thereby bypassing the compute unit 1410, or sent to the compute unit 1410. The compute unit 1410 may provide an open/close signal 1412 to the switch 1406 based on a status signal 1414 from the sensor, which may in turn be controlled 1420 by the compute unit 1410, which may be on substrate package 1424.

Figure 15:
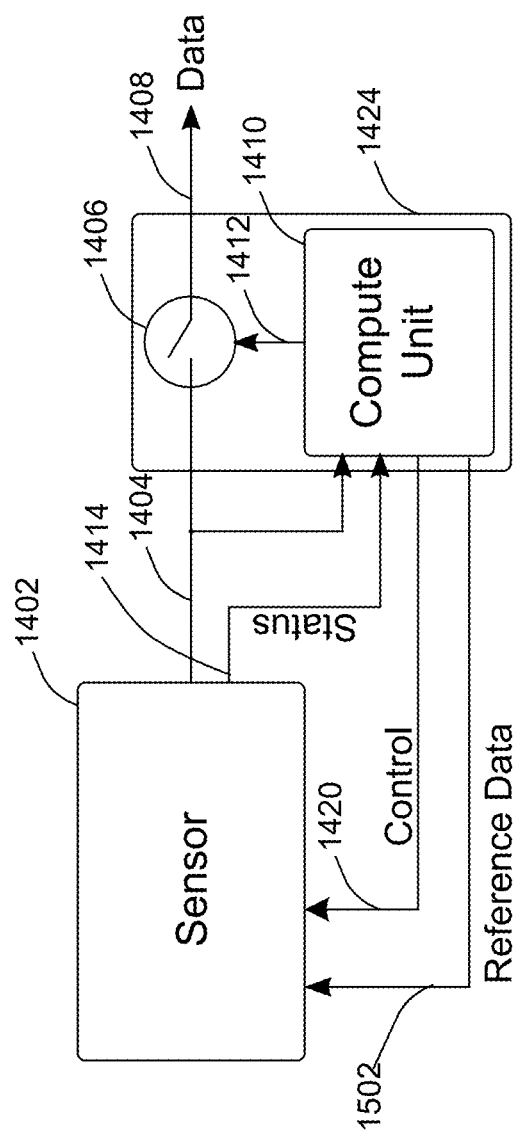
FIG. 15 illustrates a block diagram of some aspects of a smart sensor system with compute fabric hierarchy and inline data bypass in accordance with some embodiments.

FIG. 15 illustrates a block diagram of some aspects of a smart sensor system 1500 with compute fabric hierarchy and inline data bypass, in accordance with some embodiments. The elements of FIG. 15 are the same as FIG. 14 with the exception of the compute unit 1424 also providing the sensor with reference data 1502 in accordance with other descriptions herein.

Figure 16:
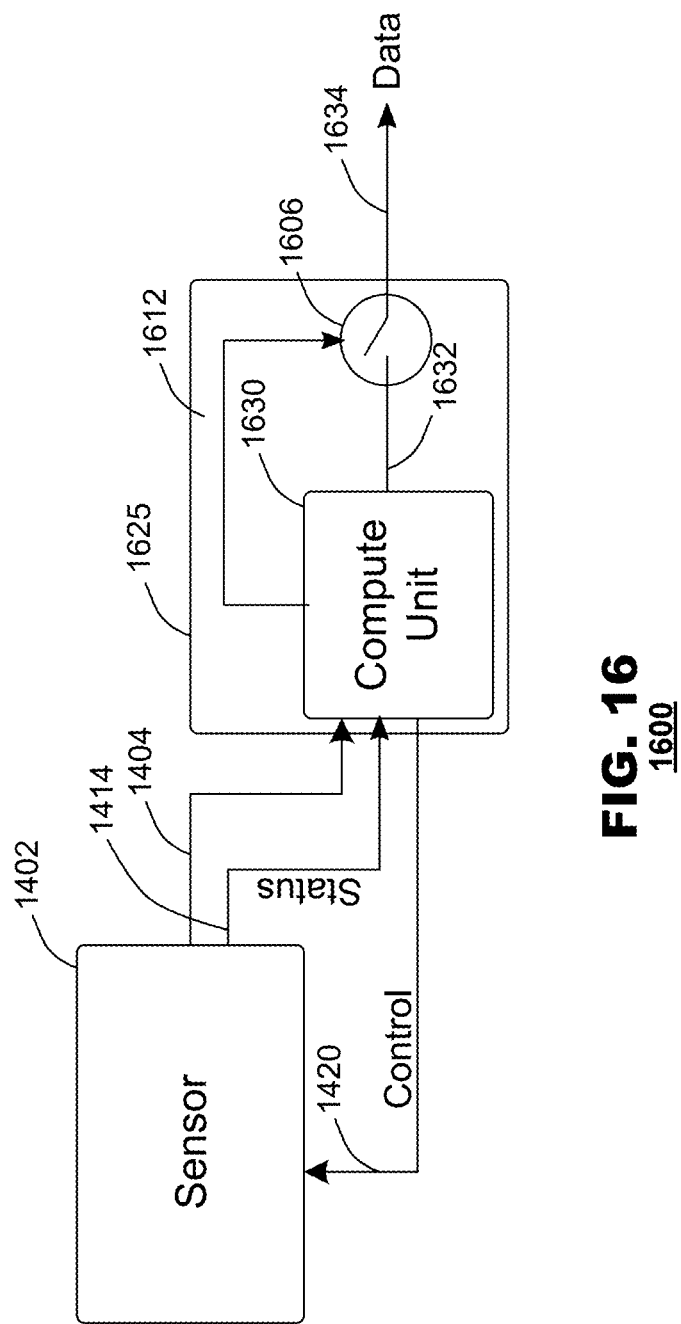
FIG. 16 illustrates a block diagram of some aspects of a smart sensor system with compute fabric hierarchy and threshold detection in accordance with some embodiments.

FIG. 16 illustrates a block diagram of some aspects of a smart sensor system 1600 with compute fabric hierarchy and threshold detection, in accordance with some embodiments. FIG. 16 is similar to FIG. 14, only the switch 1606 does not bypass the compute unit 1630. Rather, data from the sensor is sent to the compute unit 1630, which processes the data as described above to determine if a difference metric between the current data and reference data is above a threshold. The difference metric may be used to generate a control signal 1612 for controlling switch 1606. If the difference metric is above a threshold, the data 1632 is sent through switch 1606 and off-package 1634 for further processing. The data 1632 sent off package may be sensor data after processing by compute unit 1630. In an aspect, the processes sensor data sent off package 1634 may be inferences derived from the sensor data 1404.

Figure 17:
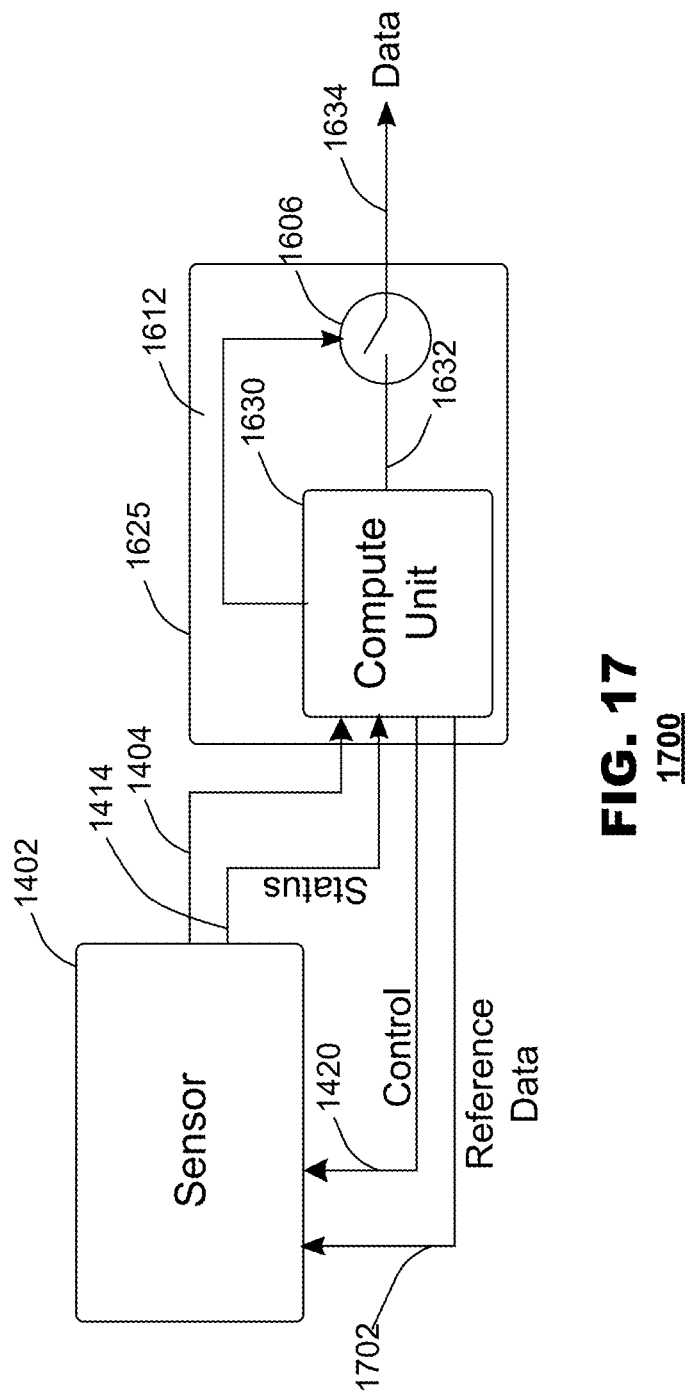
FIG. 17 illustrates a block diagram of some aspects of a smart sensor system with compute fabric hierarchy and inline data bypass in accordance with some embodiments.

FIG. 17 illustrates a block diagram of some aspects of a smart sensor system with compute fabric hierarchy and inline data bypass, in accordance with some embodiments. The elements of FIG. 17 are the same as FIG. 16 with the exception of the compute unit 1630 also providing the sensor with reference data 1702 in accordance with other descriptions herein.

Figure 18:
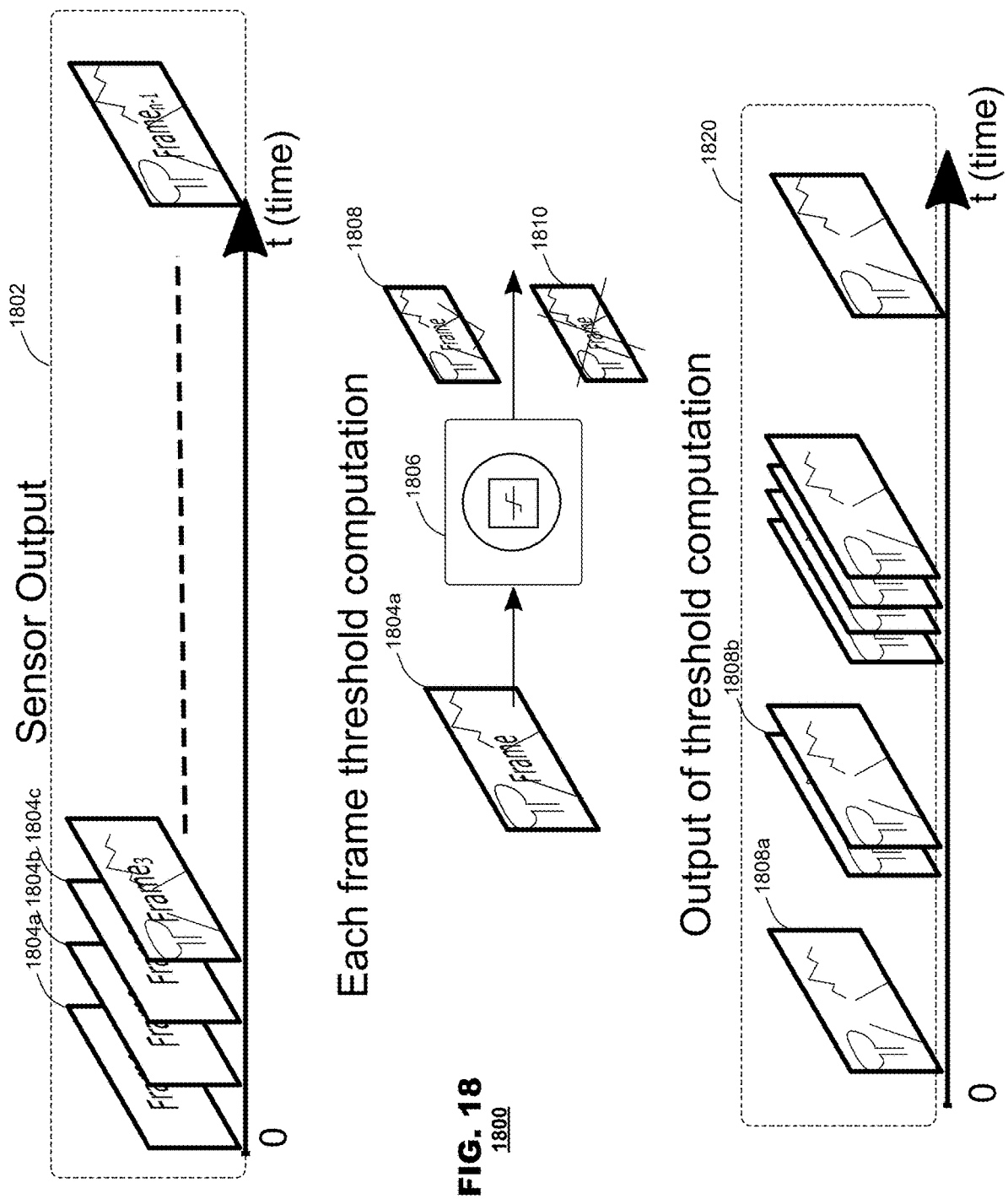
FIG. 18 illustrates an aspect of a smart sensor with threshold detection in accordance with some embodiments.

FIG. 18 illustrates an aspect 1800 of a smart sensor 1802 with threshold detection performed on a collection of the raw sensor data (such as a captured video image) captured over time and split into discrete portions, such as frames 1804a, 1804b and 1804c. Each frame, such as frame 1804a, may then be subject to a threshold computation by the compute unit 1806 to determine if the frame 1808 exceeds the threshold and should be output, such as frames 1808a and 1808b for continued processing 1820, or subsequent processing of the frame 1810 should be disabled and a prior inference may be retained as a current inference.

Figure 19:
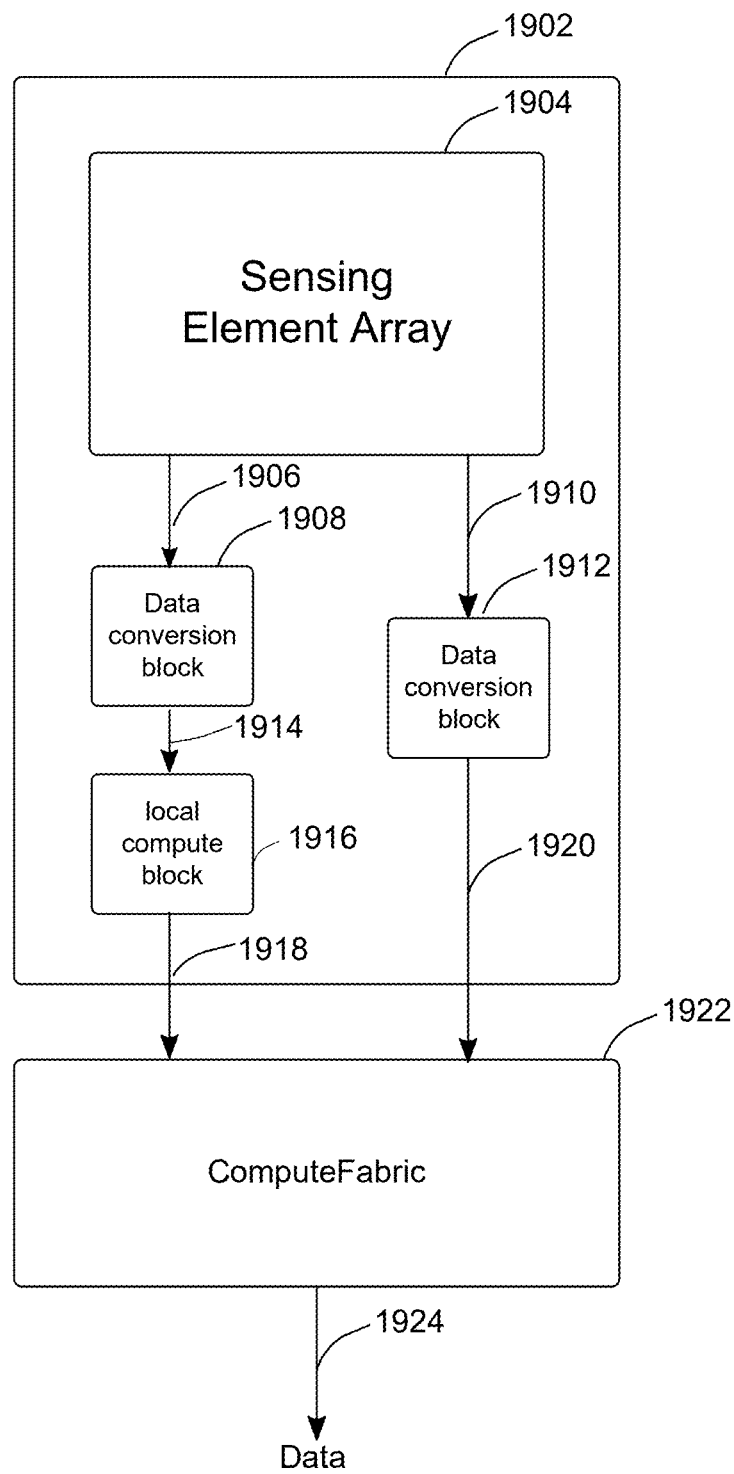
FIG. 19 illustrates a block diagram of some aspects of a smart sensor system with preprocessing plus a compute fabric hierarchy in accordance with some embodiments.

FIG. 19 illustrates a block diagram of some aspects of a smart sensor system 1900 with preprocessing plus a compute fabric hierarchy, in accordance with some embodiments. The sensing element array 1904 may be mounted on a package 1902 and configured to output first raw sensor data 1906 to a first data conversion block 1908 and second raw sensor data 1910 to a second data conversion block 1912. The first data conversion block 1908 may process the data in some manner, such as a resolution conversion of pixel data in some manner, and output that preprocessed data 1914 to a local compute block 1916, which may perform additional computations on the data and output that data 1918 to a compute fabric 1922. The second data conversion block may perform a different process, such as a reinterpretation of the nature of the data (say mask some portion of the data representation) or a different resolution conversion of the pixel data, and output that data 1920 directly to the compute fabric 1922, for further processing and output as data 1924. In another embodiment, the sensing element array 1904 and the local compute block 1916 are integrated together and produced by a single die.

Figure 20:
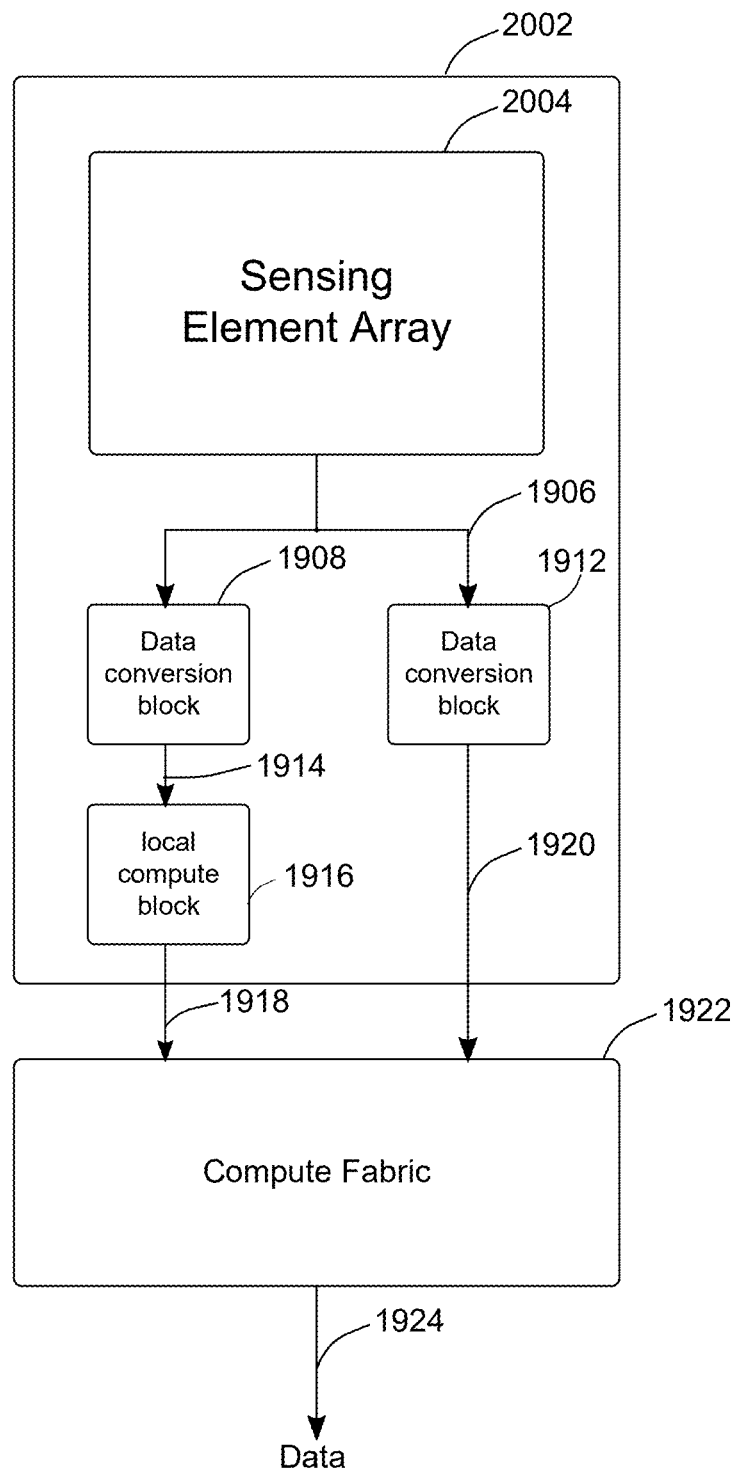
FIG. 20 illustrates a block diagram of some aspects of a smart sensor system with preprocessing plus a compute fabric hierarchy in accordance with some embodiments.

FIG. 20 illustrates a block diagram of some aspects of a smart sensor system 2000 with preprocessing plus a with compute fabric hierarchy, in accordance with some embodiments. FIG. 20 is essentially the same as FIG. 19, but only first raw sensor data 1906 is output to both the first data conversion block 1908 and the second data conversion block 1912.

Figure 21:
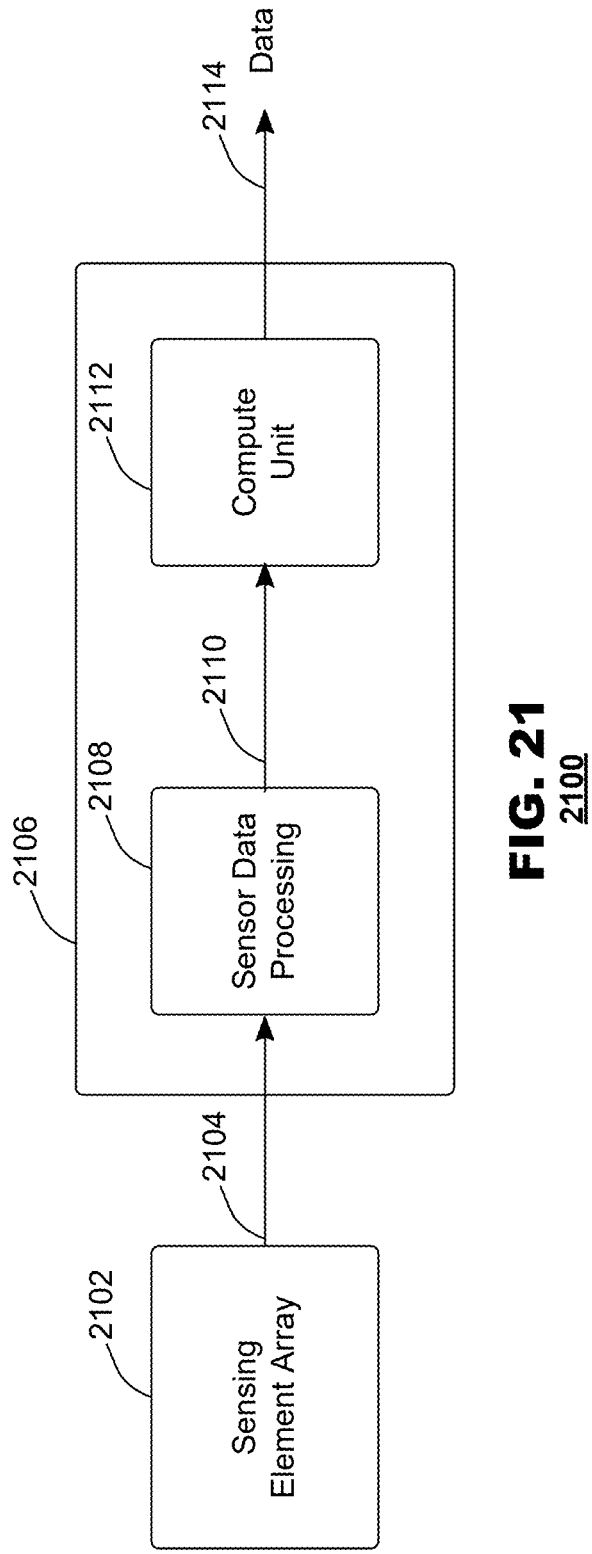
FIG. 21 illustrates a block diagram of some aspects of a smart sensor in accordance with some embodiments.

FIG. 21 illustrates a block diagram of some aspects of a smart sensor 2100. The sensing element array 2102 outputs raw sensor data 2104 to the compute fabric 2106, which includes sensor data processing 2108 and a compute unit 2112. The sensor data processing initially processes the raw data and outputs the processed data 2110 to the compute unit 2112. The compute unit further processes the data and outputs that data 2114.

Figure 22:
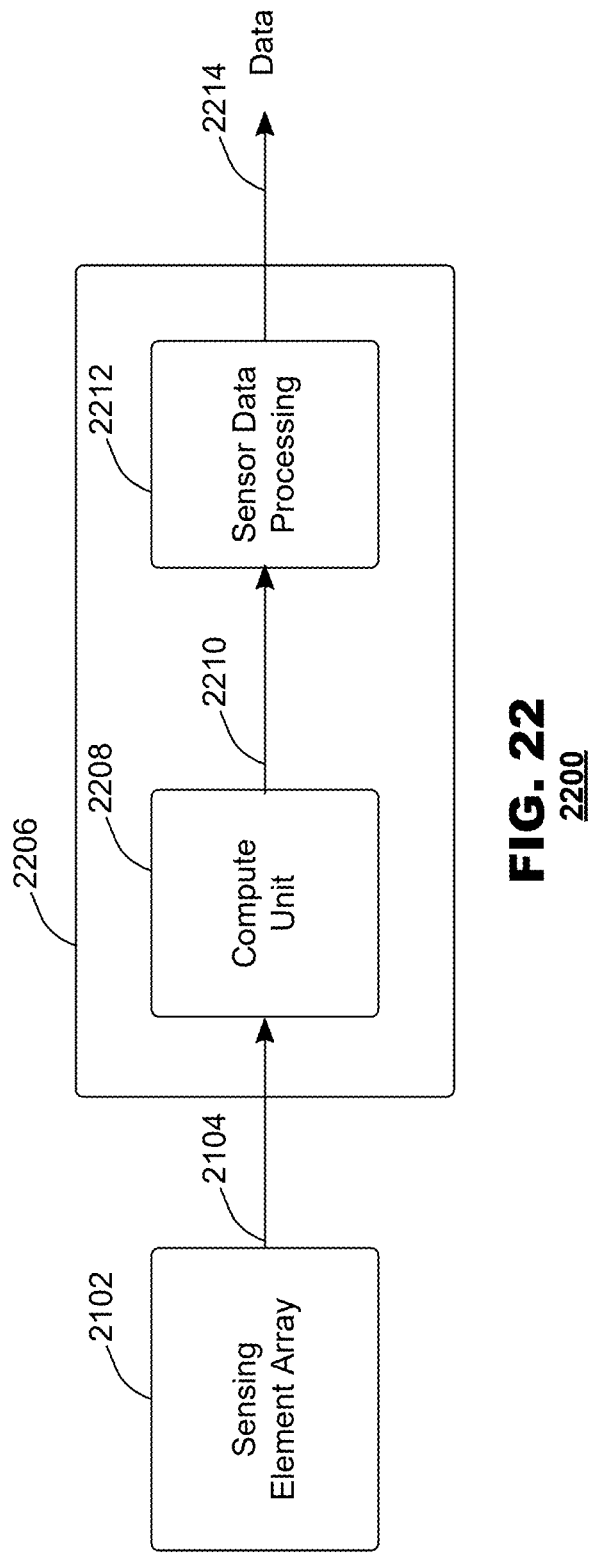
FIG. 22 illustrates a block diagram of some aspects of a smart sensor in accordance with some embodiments.

FIG. 22 illustrates a block diagram of some aspects of a smart sensor 2200. The smart sensor 2200 is similar to smart sensor 2100 only the arrangement of the compute unit and sensor data processing is reversed. The sensing element array 2102 outputs raw sensor data 2104 to the compute fabric 2206, which includes the compute unit 2208 and sensor data processing 2212. The compute unit 2208 performs the initial data processing and outputs processed data 2210 to the sensor data processing 2208 for further processing and output of the data 2214.

Figure 23:
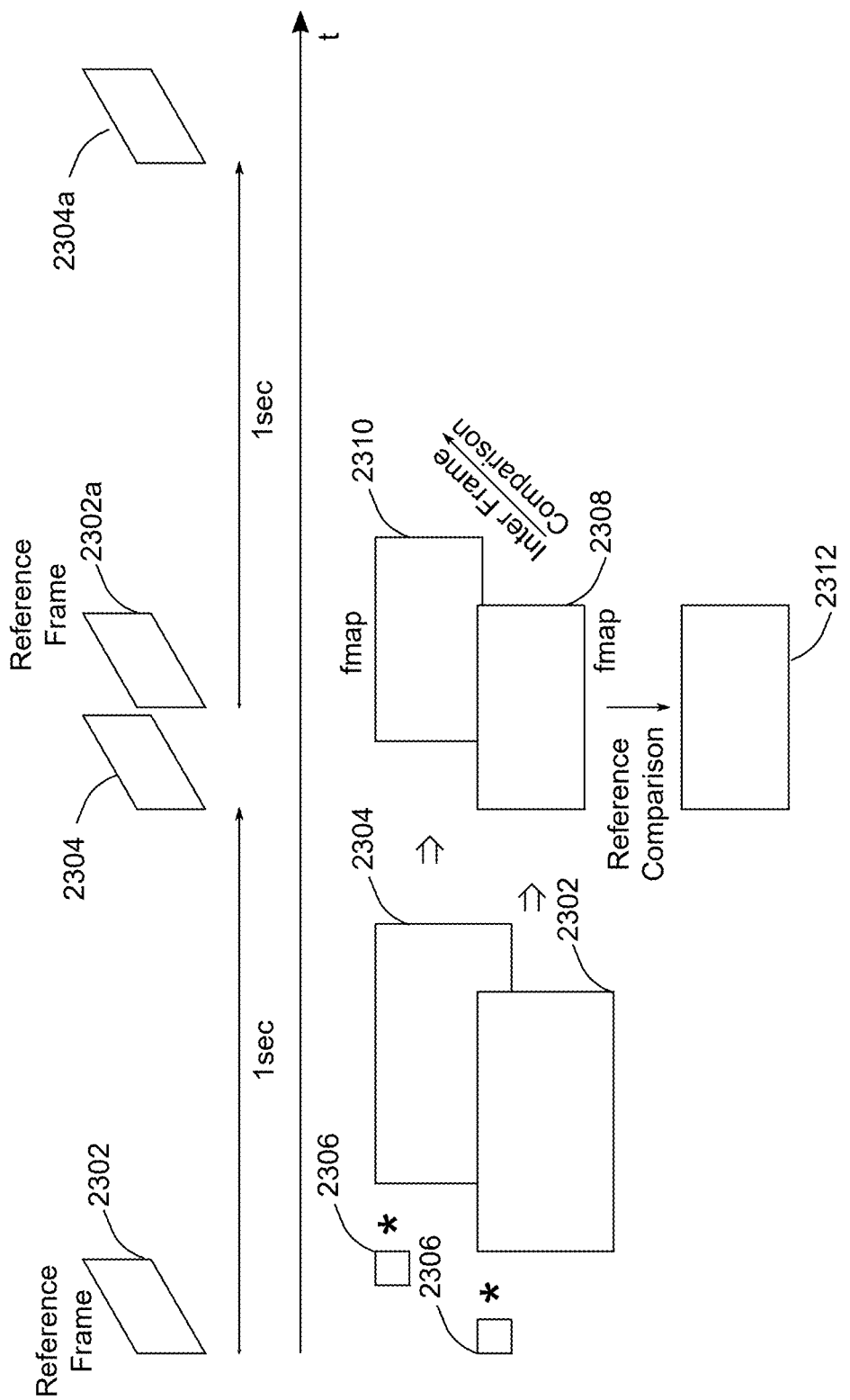
FIG. 23 illustrates threshold detection change processing in accordance with some embodiments.

FIG. 23 illustrates row—column compression for threshold detection change processing based on reference frames that are changeable based on a time value, such as one second. As illustrated, possible first reference frame 2302 and first current frame 2304 are sensed over a one second time period, and then second reference frame 2302a and second current frame 2304a are sensed over a different one second time period. Reference frames 2302, 2304 may be processed by a convolution operation with kernel 2306 to generate fmaps 2308, 2310, respectively. The feature maps (fmaps) 2308, 2310 may be processed to perform an inter frame comparison and result in the reference comparison 2312. In an aspect the reference comparison 2312 may be used to control further processing or transmission of sensor data. As shown above the timeline in FIG. 23, the reference frame 2302 may be replaced with a new reference frame 2302a over time. For example, a reference frame may be constrained to be always within one second of a current frame for the interframe comparison.

Figure 24A:
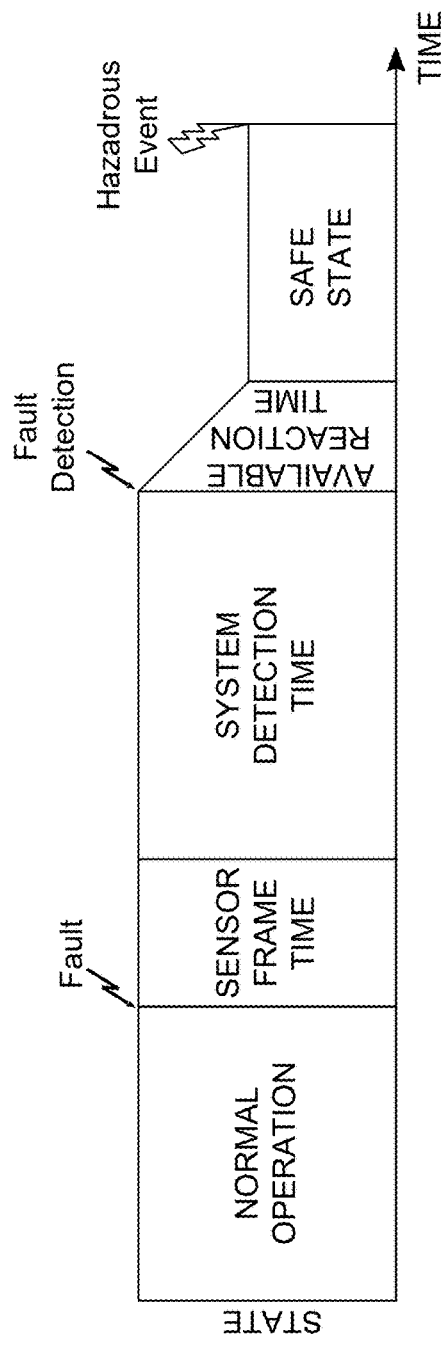
FIG. 24A illustrates a prior art example of a functional safety response in a typical sensor-based system.
Figure 24B:
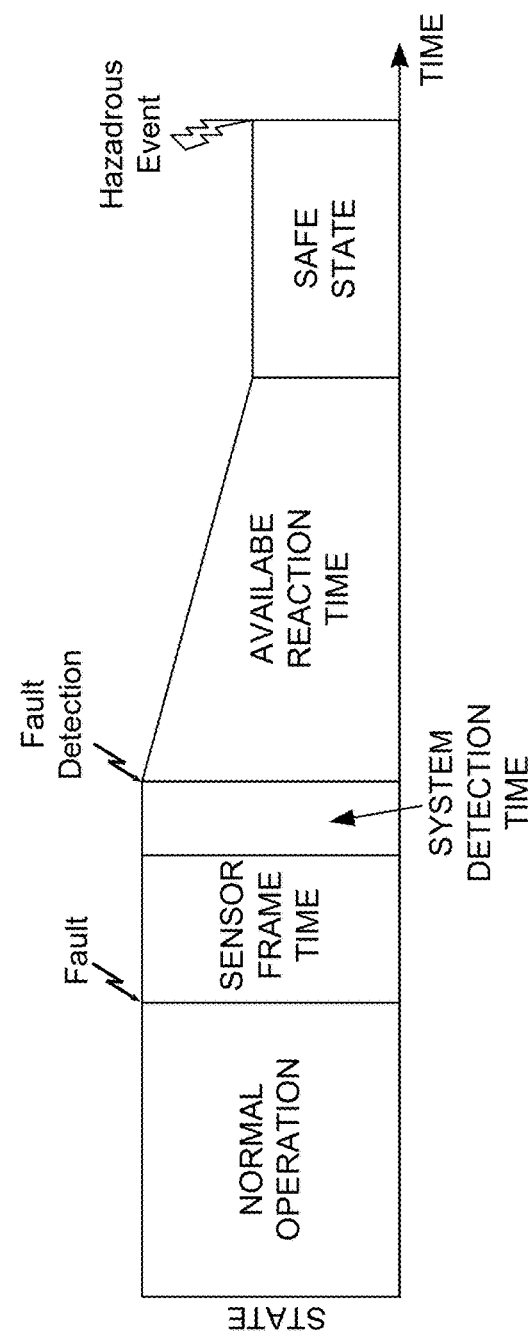
FIG. 24B illustrates some aspects of a safety response in a smart sensor-based system.

FIG. 24A illustrates a prior art example of a functional safety response 2400 in a typical sensor-based system. FIGS. 24A and 24B illustrate the substantial advantage in reaction time (to a hazardous event) that may be available to a safety critical system using various smart sensors (e.g. 1200, 1300 . . . 2100, etc.) described herein. FIG. 24A (prior art) does not use a smart sensor and so a fault captured by the acquiring sensor is transmitted no differently from other data that would indicate a normal system operation. Thus, a hazardous event propagates with normal priority till all data is processed and the hazard ultimately detected (at the end of the long system detection time period). Upon detection, the system has to be designed with sufficient capability to react within the constraints of the system's designated functional safety function and response time requirements. It should be apparent that such system complexity and cost is significantly reduced with a smart sensor-based system as illustrated in FIG. 24B. The smart sensor-based system highlights and prioritizes the hazardous event earlier in system operation with a shorter system detection time period which allows for a longer available reaction time period in FIG. 24B. Such detected event may then be quickly prioritized for transmission and processing to significantly reduce complexity and cost of overall system functional response.

Figure 25:
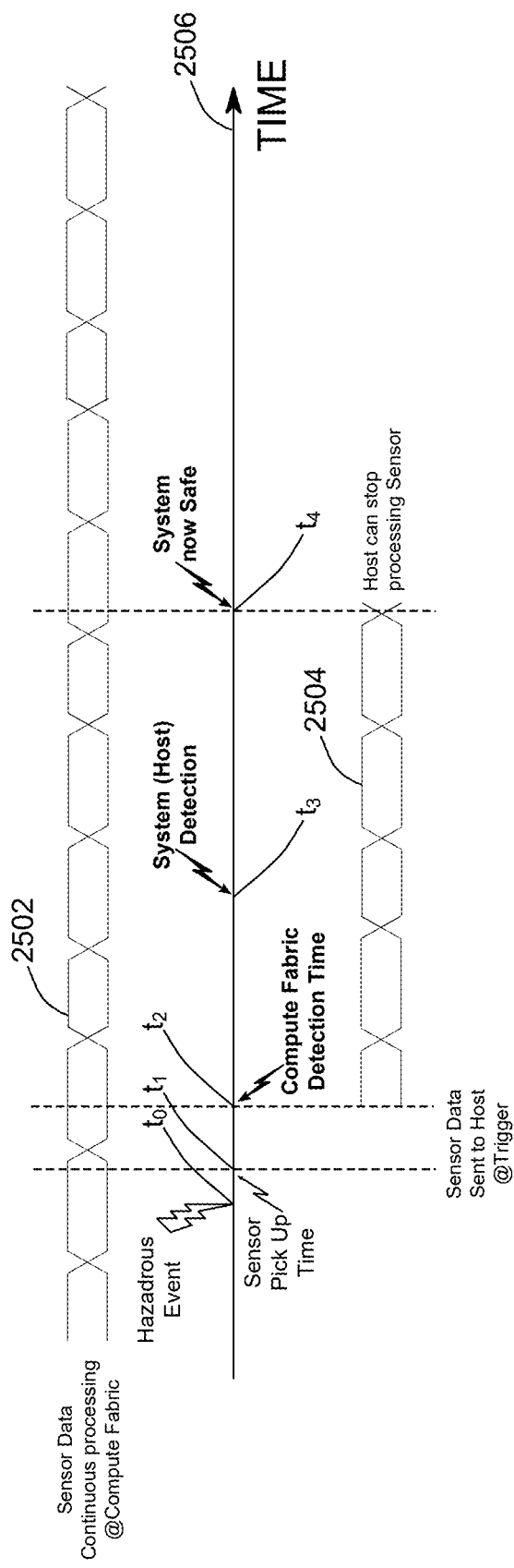
FIG. 25 illustrates data windowing in a system that includes a smart sensor with compute fabric in accordance with some embodiments.

FIG. 25 illustrates data windowing 2500 in a system that includes a smart sensor with compute fabric, in accordance with some embodiments. FIG. 25 illustrates data windowing and the advantages of continuous sensor data processing in a compute fabric. A sensor continuously generates data 2502 during operation. In a system without a smart sensor this data is continuously transmitted to the rest of the system for processing. In case of a system with a smart sensor, its compute fabric due to its proximity and location with respect to the sensor receives this constant stream of sensor data and is dedicated in processing it in an optimized manner (avoiding the detection latency, transmission time and transmission costs as illustrated in various studies) resulting in a curated sensor data stream 2504. 2504 is typically only generated when the original data stream 2502 contains a (previously registered) event of interest as indicated in the timeline 2506. 2506 illustrates an event of interest (at time $t_0$) generates a change in the sensor's data (at time $t_1$) which is detected by the compute fabric (at time $t_2$). The compute fabric now transmits a "window" of data around this event starting at a preamble (2501) and including multiple subsequent frames to provide sufficient context to the rest of the processing system for further processing and information extraction. This allows a host system coupled to the smart sensor to receive and act only upon sensor data containing events of interest, detecting the event at time $t_3$. The system is expected to be able to complete processing the event by a time $t_4$ and optionally provide feedback to the compute fabric that such event has been addressed. After this, the compute fabric reverts back it's normal operation and stops transmitting data allowing the host system to utilize its processing capabilities for some other purpose or allow the system the go to a lower powered state.

Figure 26:
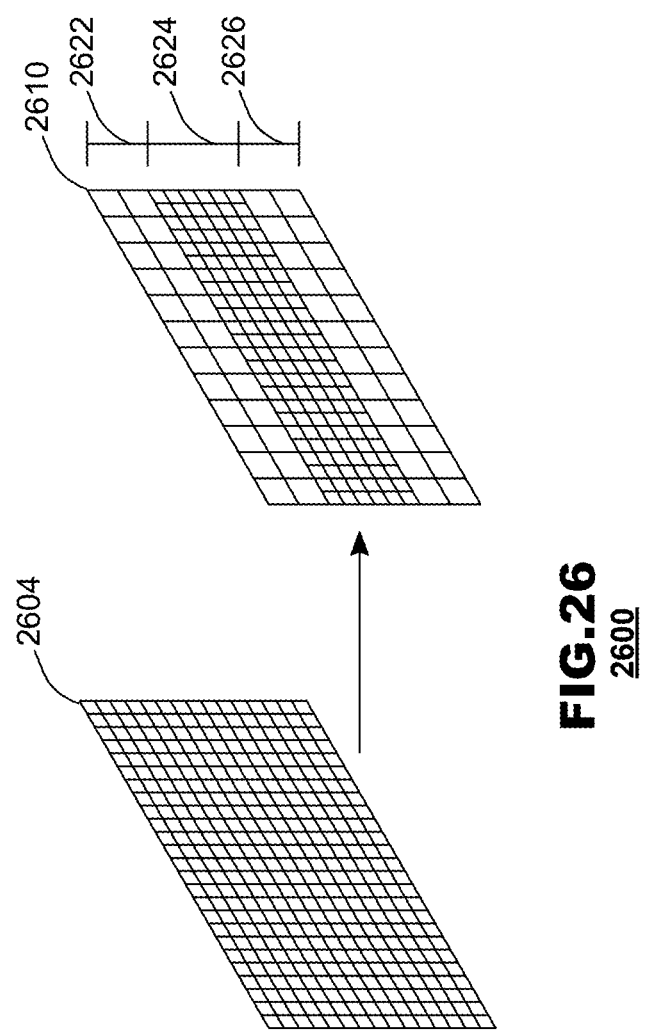
FIGS. 26-28 illustrate multiple different resolution processing in a smart sensor system in accordance with some embodiments.
Figure 27:
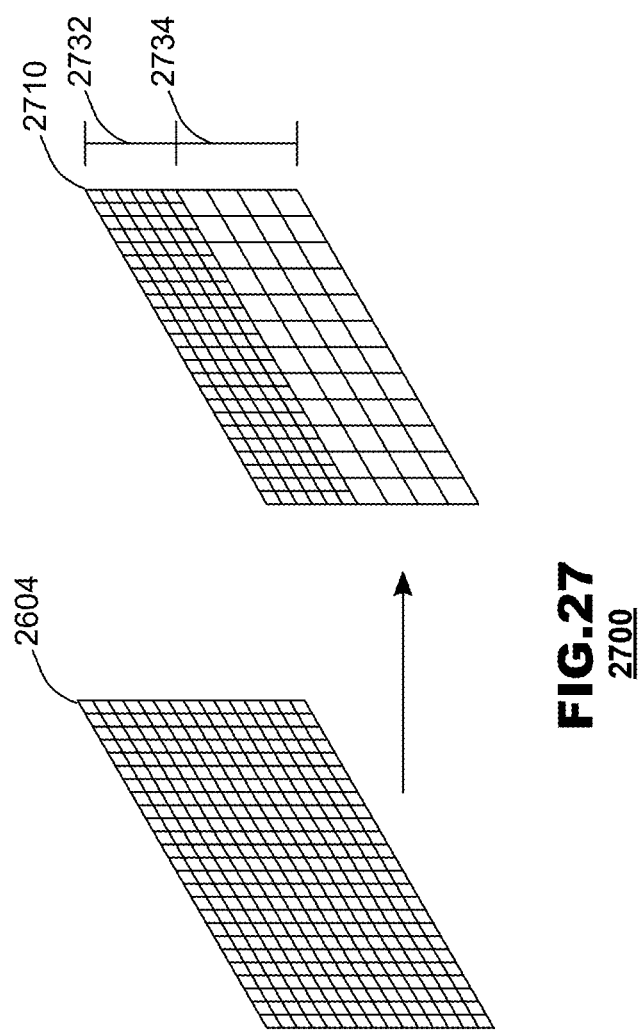
Figure 28:
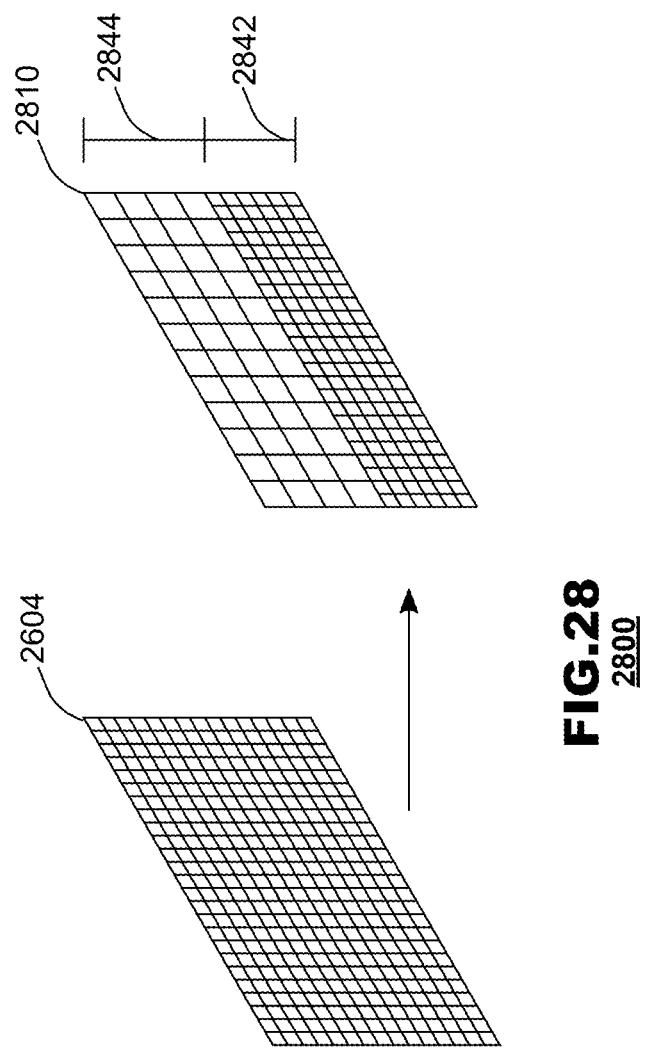

FIG. 26 illustrates multiple different resolution processing 2600 in a smart sensor system, such as described in reference to FIGS. 19-20, in accordance with some embodiments. Data from a sensor, such as pixel data from a frame 2604 may be processed to change the resolution of some of the pixel data in the frame 2610, but not other pixel data. For example, the resolution of the pixel data may be changed in the rows and columns of area 2622, but not in area 2624, and changed again in area 2626. In FIG. 27, the same frame 2604 may be changed to frame 2710, with the resolution maintained in area 2732 and changed in area 2734. In FIG. 28, the same frame 2604 may be changed to frame 2810, with the resolution changed in area 2844 and maintained in area 2842.

In an aspect, selection of which regions of sensor data are reduced in resolution may be based on prior processing that determined which regions would benefit from processing at a higher resolutions. For example, a context map (as described herein elsewhere) indicating priorities for regions of sensor data may be used to determine resolutions for corresponding regions. Higher priory regions may be processed at a higher resolution, while lower priority regions are processed at lower resolutions. In a first example, initial processing of an entire image at a low resolution may produce a sparse matrix or a context map indicating which regions are of higher priority interest, and then subsequent processing of those regions of interest may be performed at the higher resolutions. In a second example, initial processing of an entire image may be performed at lower resolution, and then subsequent processing only occurs at the higher resolution after a region is determined to be a higher priority. In a third example, resolution processing is at least partly fixed for a particular application such as autonomous driving. In an autonomous driving example with a sensor facing the direction a car is moving, image data of the horizon in the upper half of the image, as in FIG. 27, may have a default higher priority than image data from the lower half of the image (which may contain sensor data of the car's bumper, for example).

Figure 29:
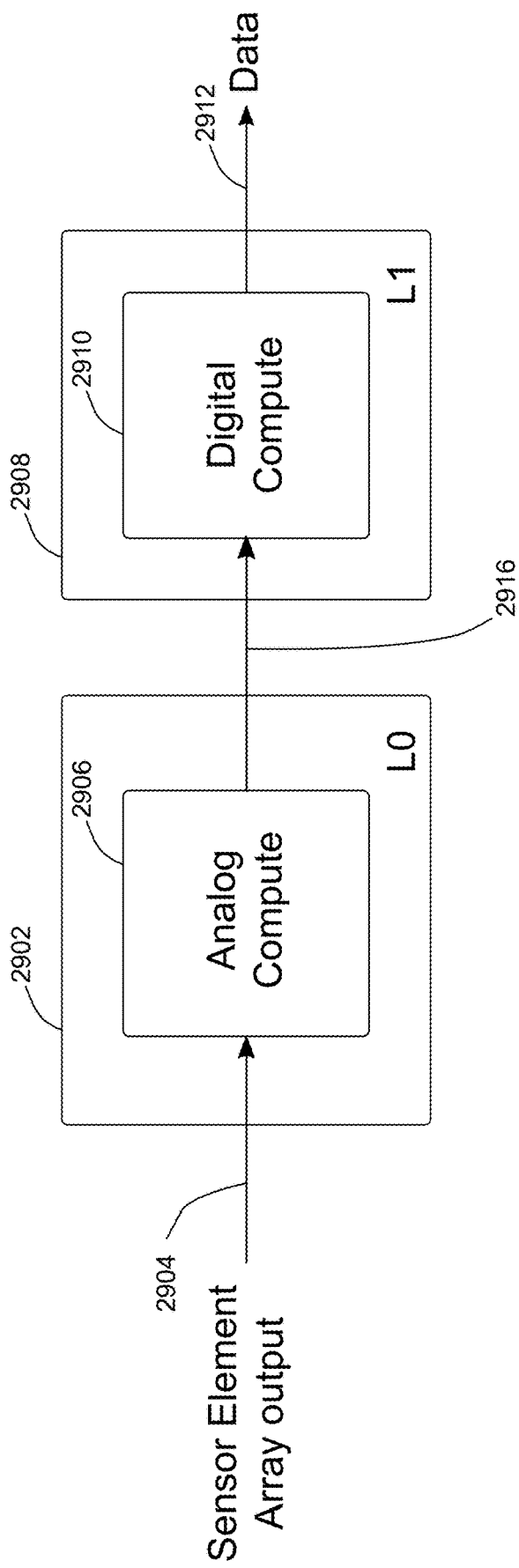
FIGS. 29-30 illustrates multiple modes of computing in a smart sensor system in accordance with some embodiments.
Figure 30:
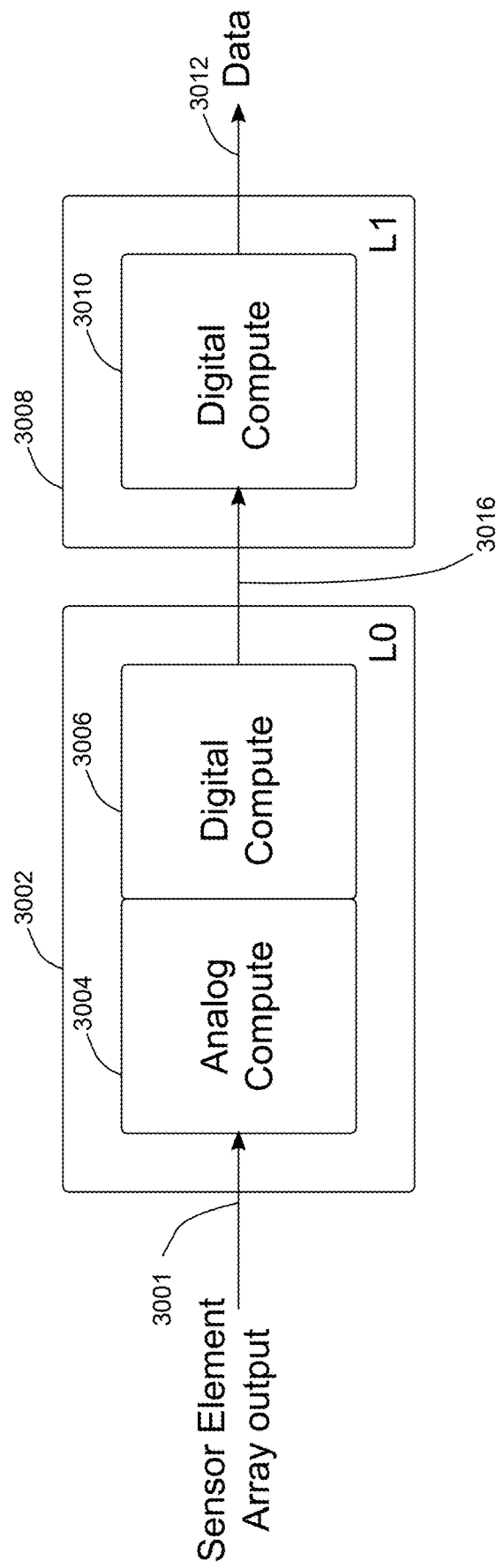

FIG. 29 illustrates multiple modes of computing in a smart sensor system 2900 with compute fabric hierarchy, in accordance with some embodiments. A local level component 2902 that includes an analog compute component 2906 may receive sensor element array output 2904. The analog compute component 2906 processes the raw data to output digital data 2916 to an on-package level component 2908, that includes a digital compute component 2910, which further processes the data to generate output 2912. The smart sensor system 3000 of FIG. 30 is similar to system 2900 of FIG. 29 in that a local level component 3002 receives the sensor element array output 3001 and performs an analog to digital conversion via analog compute component 3004. The output of the analog compute component 3004, however is sent to a local level digital compute component 3006 first before being sent to an on-package level component 3008, which includes a second digital compute component 3010, which takes the local level processed data 3016 and outputs data 3012.

Figure 31:
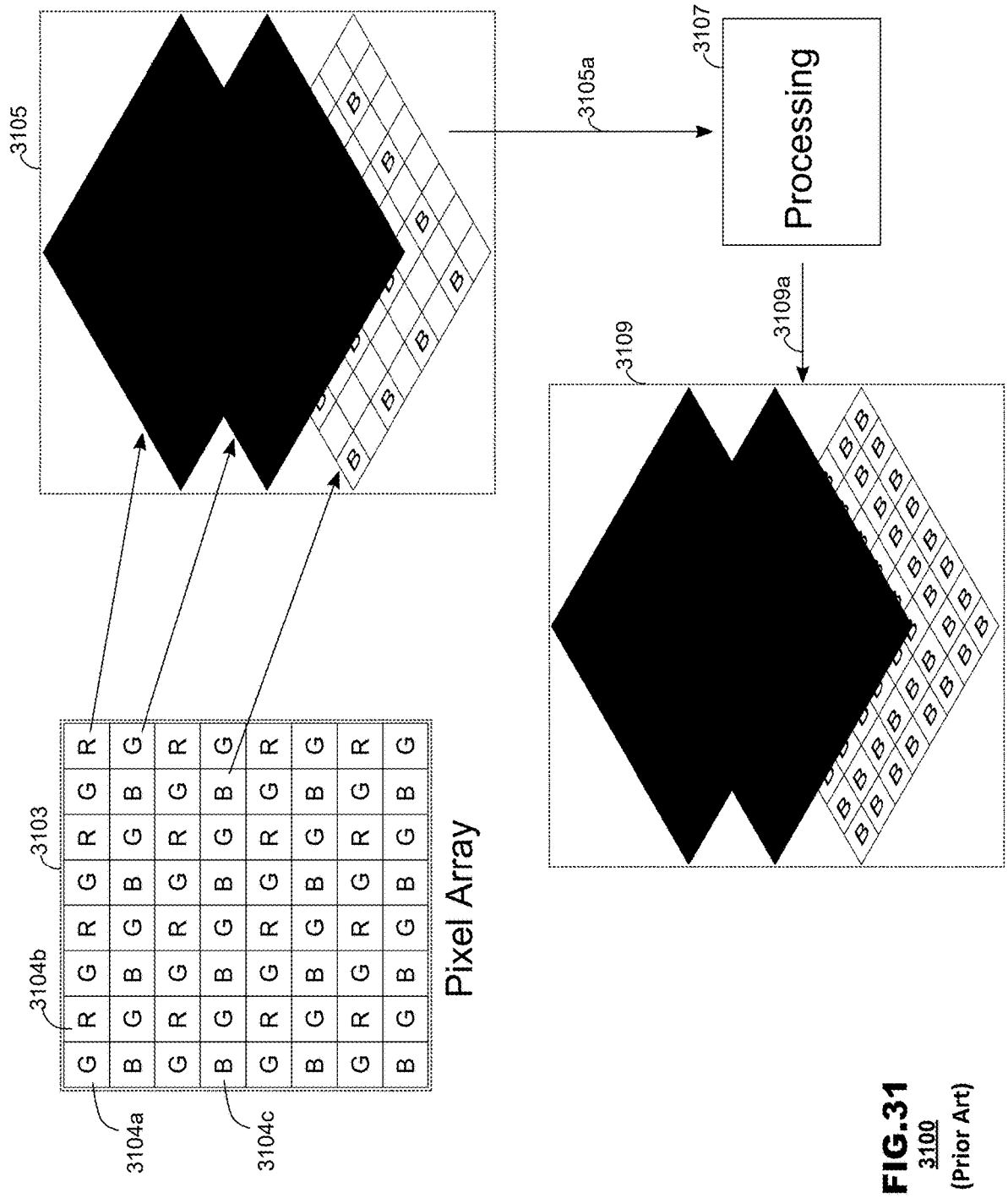
FIG. 31 illustrates a prior art example of some aspects of data processing in a CMOS pixel smart sensor in accordance with some embodiments.
Figure 32:
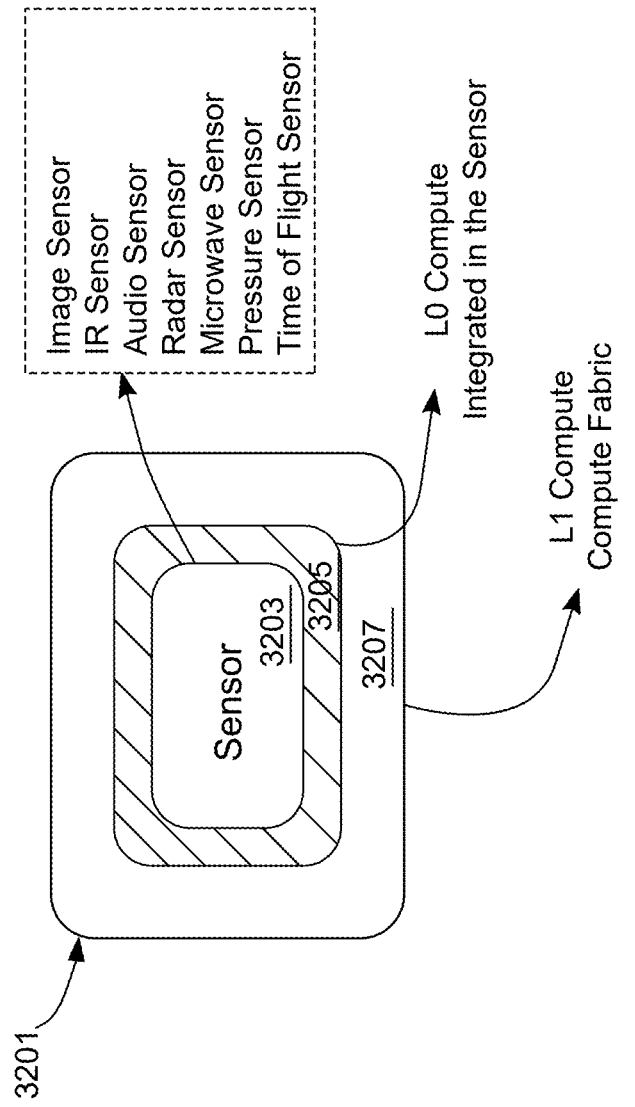
FIG. 32 illustrates a block diagram of some aspects of a smart sensor in accordance with some embodiments.

FIG. 31 illustrates some prior art aspects of data processing in a CMOS pixel smart sensor, in accordance with some embodiments. FIG. 31 illustrates a Bayer pattern CMOS color (RGB) image sensor pixel arrangement and read out value of red pixels, green pixels, and blue pixels are shown as separate layer which are combined through image signal processing (3107) to produce RGB value for each pixel of the image 3109. The values of red pixels, green pixels, and blue pixels are shown as separate layer with a significant difference compared to the raw CMOS color image sensor pixel output. Each pixel in the 3109 has a value for red, green, and blue unlike the input value 3105 which is the raw output of the CMOS image sensor pixel FIG. 32 illustrates a block diagram of some aspects of a smart sensor 3200, in accordance with some embodiments. The smart sensor may include a sensor 3203 that includes an integrated compute fabric 3205 at a local level (L0) and a second compute fabric at an on-package level (L1). The sensor 3203 may be any of an image sensor, an infrared sensor, an audio sensor, a radar sensor, a microwave sensor, a pressure sensor, a time of flight sensor, etc.

Figure 33:
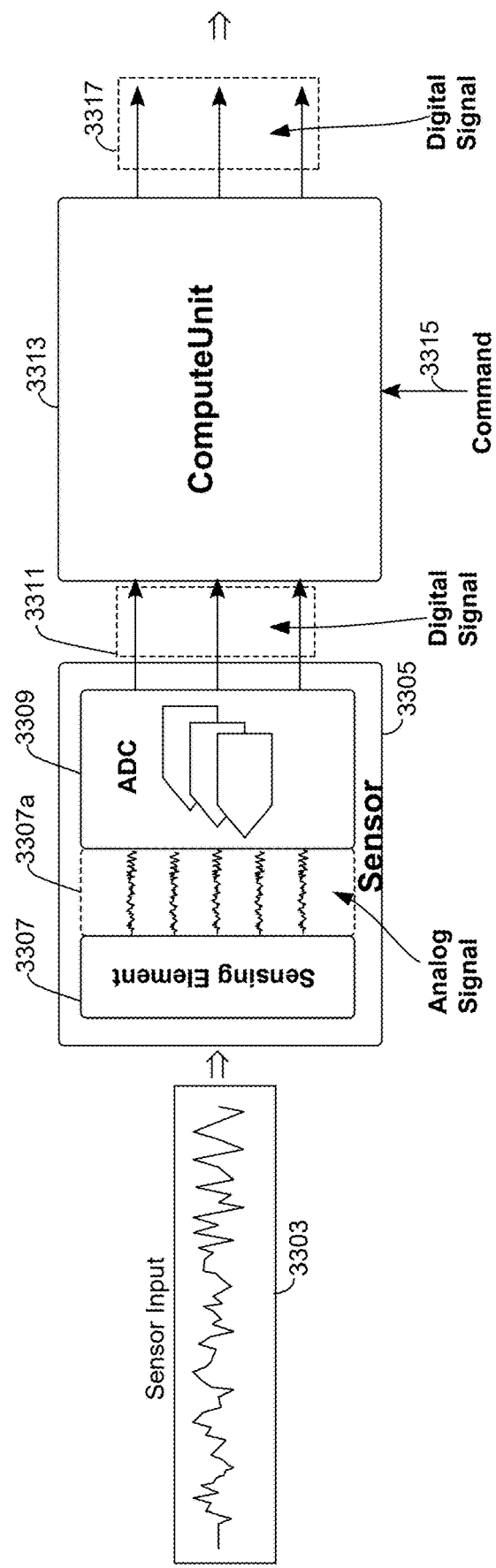
FIG. 33 is a block diagram of a smart sensor illustrating some aspects of data processing in accordance with some embodiments.

FIG. 33 is a block diagram of a smart sensor 3300 illustrating some aspects of data processing, in accordance with some embodiments. FIG. 33 further illustrates multiple modes of computing in the smart sensor system 3300, in accordance with some embodiments. Sensor input 3303, such as light, audio, radar, etc., may be received by a sensing element 3307 of a sensor 3305 and converted to analog signals 3307a. The analog signals are output to an analog compute component 3309, such as an analog-to-digital converter and output as digital signals 3311 to a digital compute unit 3313. The compute unit 3313 may then process the digital data based on commands 3315 received from another device in order to output processed data 3317 in a digital signal form.

Figure 34:
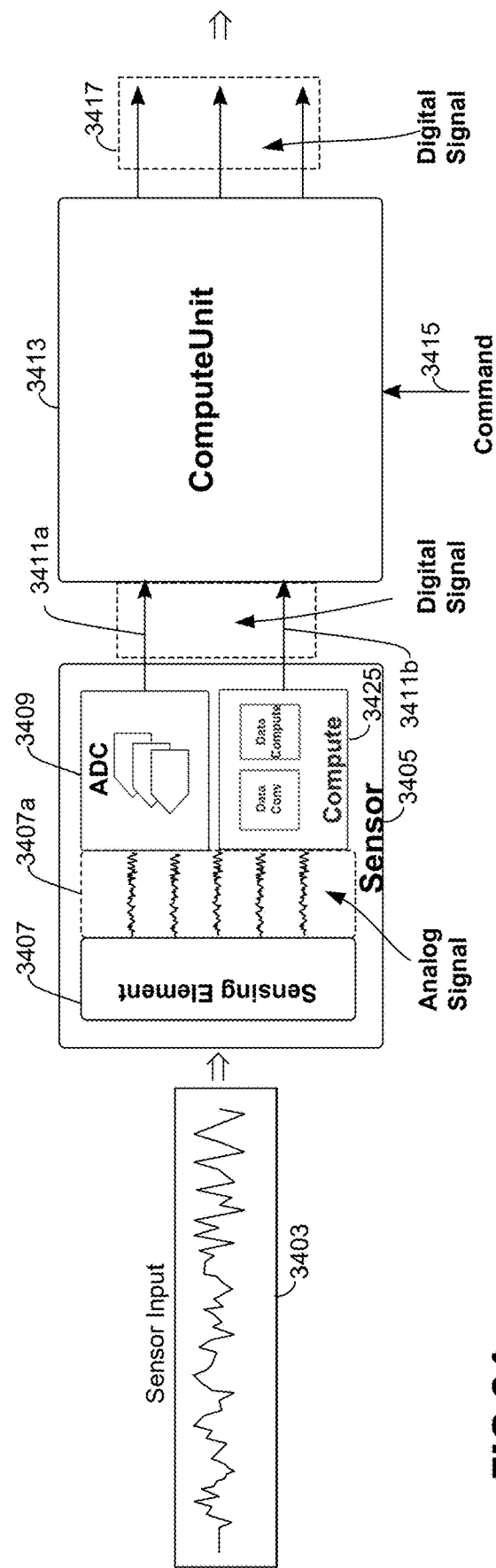
FIG. 34 is a block diagram of a smart sensor illustrating some aspects of data processing in accordance with some embodiments.

FIG. 34 is a block diagram of a smart sensor 3400 illustrating some aspects of data processing, in accordance with some embodiments. The smart sensor 3400 of FIG. 34 is similar in operation to the smart sensor 3300 of FIG. 33, except that it further integrates a digital compute unit within the sensor itself. Sensor input 3403, such as light, audio, radar, etc., may be received by a sensing element 3407 of a sensor 3405 and converted to analog signals 3407a. The analog signals are output to an analog compute component 3409, such as an analog-to-digital converter and output 3411a to a digital compute unit 3413. The analog signals 3407a may also be received by the digital compute unit 3425, converted to digital signals, processed and output 3411b to the digital computer unit 3413. Both sets of signals may be further processed based on commands 3415 received from another device in order to output processed data 3417 in a digital signal form.

Figure 35:
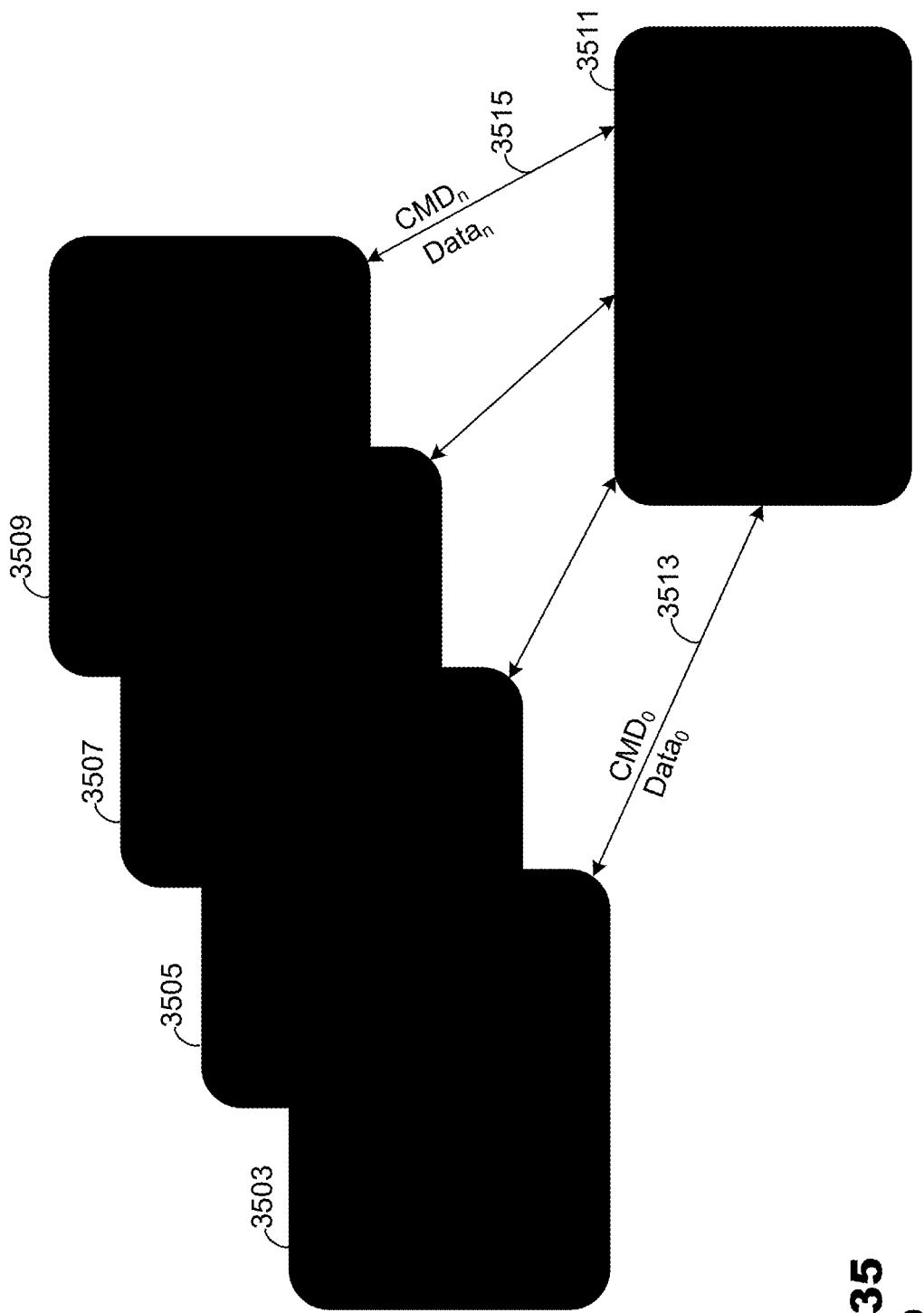
FIG. 35 is a block diagram of a system incorporating instances of a smart sensor, illustrating some interactions in accordance with some embodiments.

FIG. 35 is a block diagram of a system 3500 incorporating instances of a smart sensor, illustrating some interactions, in accordance with some embodiments. The sensors—3503, 3505, 3507, and 3509 may be multiple instances of the same type (e.g., sensor 3201 shown in FIG. 32) or sensors of different types. Each sensor communicates with the central compute 3511 bidirectionally such as 3513 and 3515, wherein the central compute 3511 sends instructions or commands ($CMD_0$, . . . $CMD_n$) and receives data ($Data_0$, $Data_n$).

Figure 36:
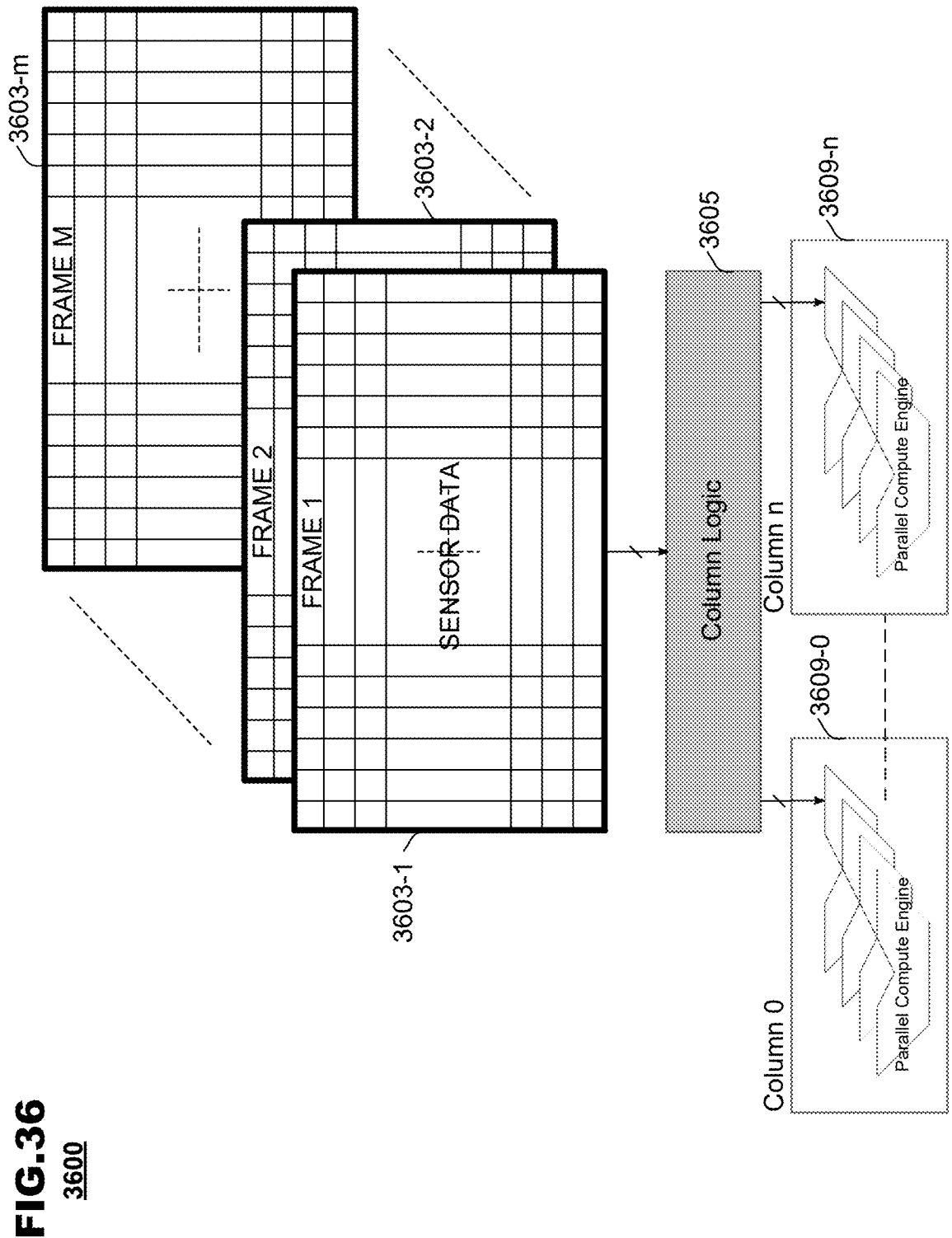
FIG. 36 is a block diagram of a smart sensor illustrating some aspects of data processing in accordance with some embodiments.

FIG. 36 is a block diagram of a smart sensor 3600 illustrating some aspects of data processing, in accordance with some embodiments. Frames 3603-1, 3603-2, . . . , 3603-$m$ are a set of m sensor data output frames which are processed by the column logic 3605 to convert the sensor data to digital data and the output of the column logic 3605 is coupled to parallel compute engines 3609-0 to 3609-$n$ to compute concurrently the column output data of the sensor data as it is being read out from the sensor.

FIG. 37 illustrates a timing diagram 3700 showing some aspects of processing data in a smart sensor in accordance with some embodiments. FIG. 37 illustrates reading out the sensor data in non-sequential order based on the priority inferred from the inference result. Out of order read of the sensor data to reduce the response latency in inferring the results.

Figure 38:
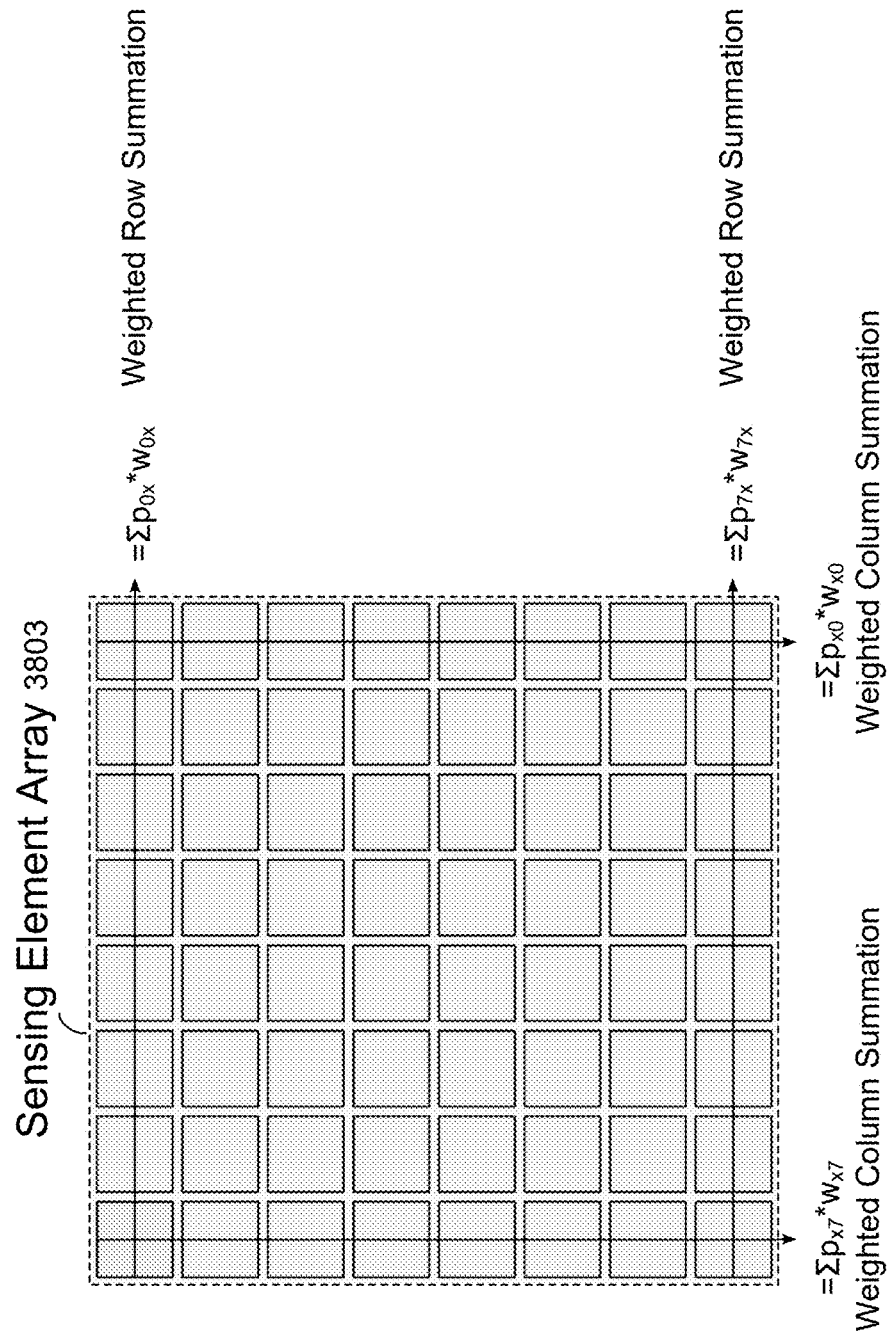
FIG. 38 illustrates some aspects of processing data in a smart sensor in accordance with some embodiments.

FIG. 38 illustrates some aspects of processing data in a smart sensor 3800, in accordance with some embodiments. FIG. 38 illustrates performing row column wise computation to produce weighted row wise summation operation for each row and weighted column wise operation for each column as the sensing element array 3803 is being read out. The array of sensing element output is converted into data and read out row by row. As each row is being read out, a multiplication operation of the weight corresponding the sensing element array index with the sensing element array data is performed. The result of the multiplication operation is summed in row wise and column wise summation. When the final row of the sensing element array is read out, the row column summation result obtained is used for further computation.

Figure 39:
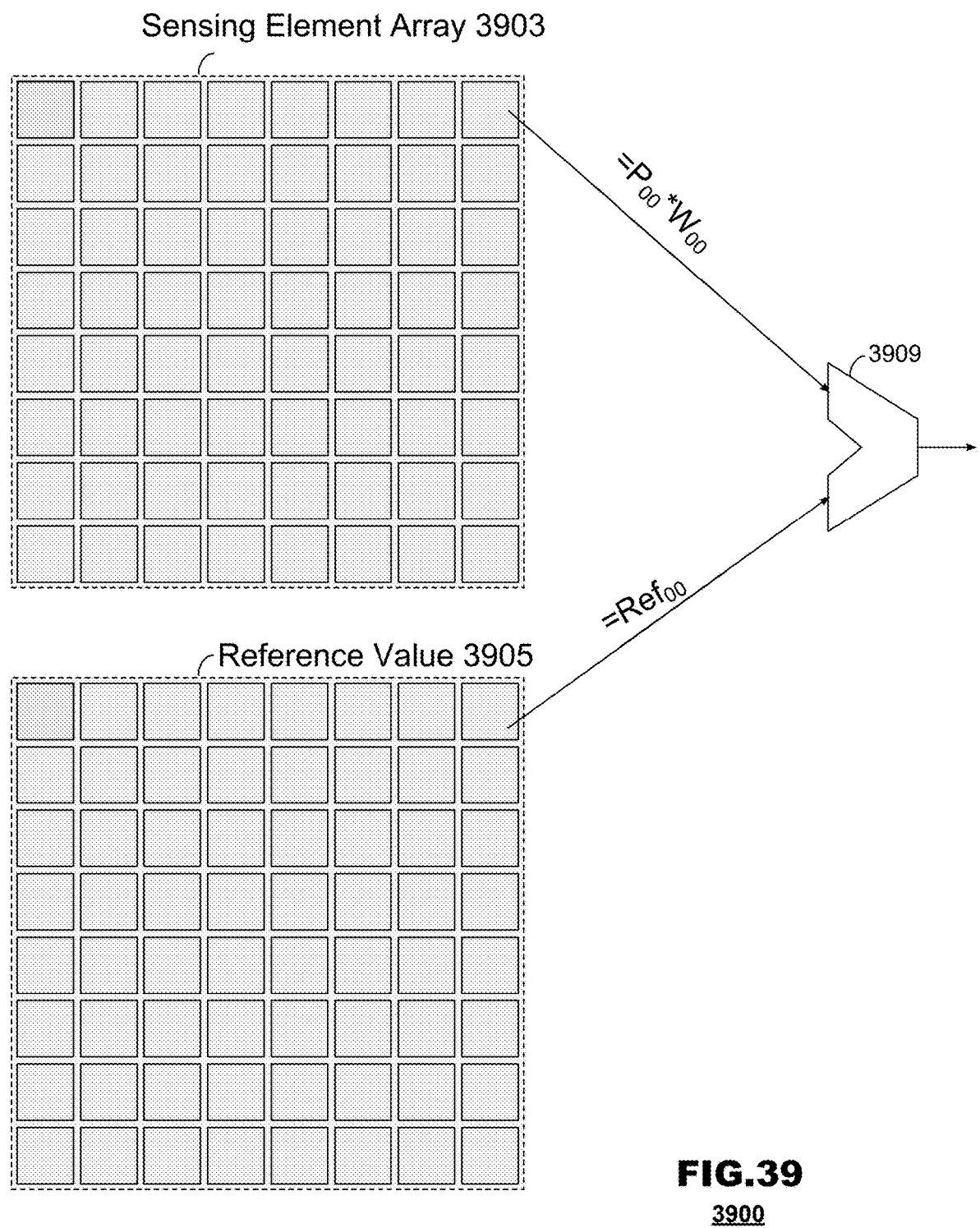
FIG. 39 illustrates some aspects of processing data in a smart sensor with simultaneous data in accordance with some embodiments.

FIG. 39 illustrates some aspects of processing data in a smart sensor 3900 with simultaneous data, in accordance with some embodiments. The weighted result of a sensing element array 3903 is compared with the corresponding reference value 3905 to produce a threshold value operation and in one embodiment it is a rectified linear unit. The weighted result, if greater than the reference value, is output from the processing unit 3909 to produce positive gradient value. The individual gradient value of the sensing element array is used in further computation.

Figure 40:
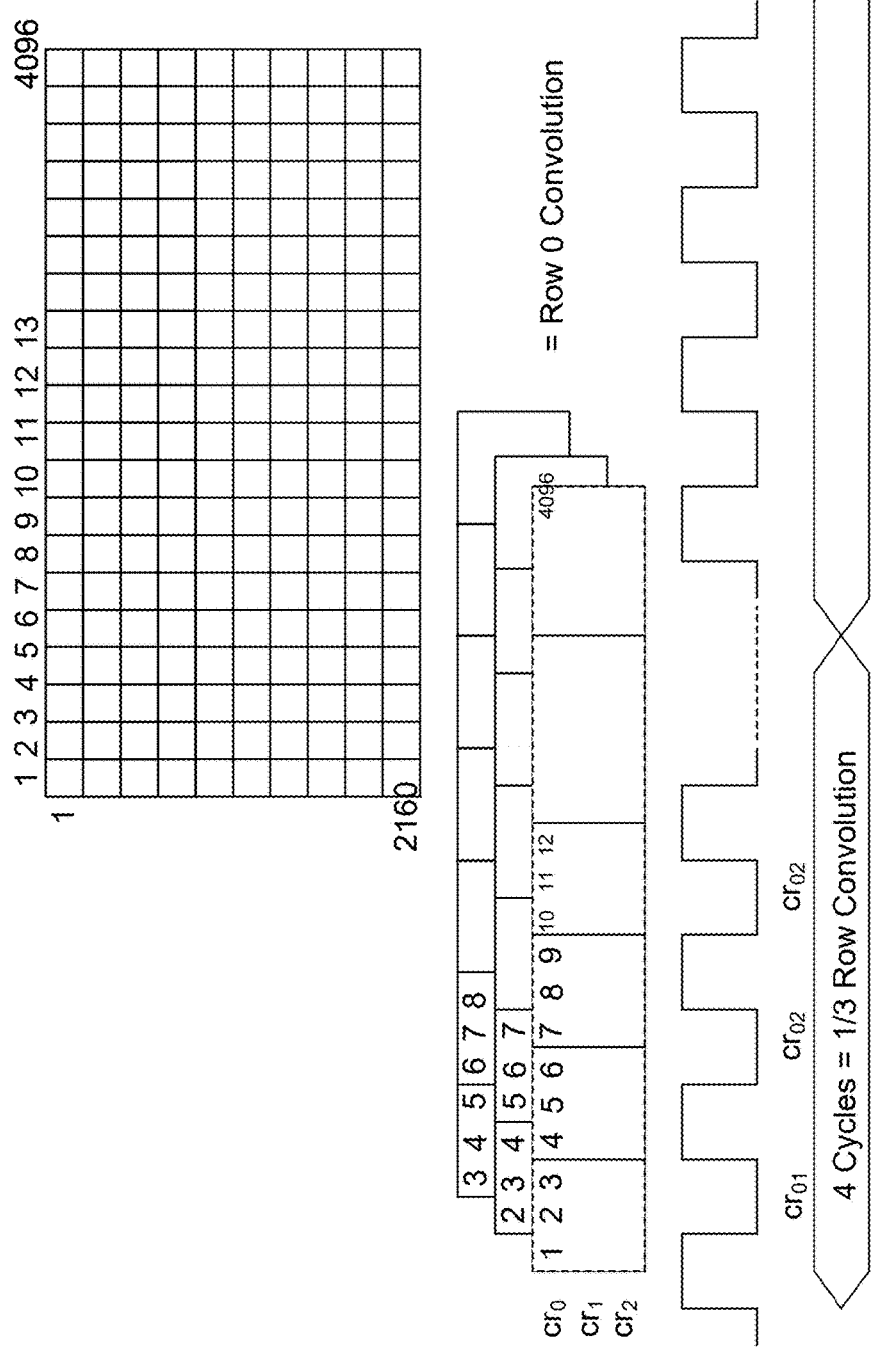
FIG. 40 illustrates a timing diagram showing some aspects of processing data, including a convolution operation in a smart sensor in accordance with some embodiments.

FIG. 40 illustrates a timing diagram 4000 showing some aspects of processing data, including a convolution operation in a smart sensor, in accordance with some embodiments. FIG. 40 illustrates performing convolution operation as the sensor row is being read out sequentially. In one embodiment the sensor is an image sensor and image sensor processing is a linear operation. By the principle of linear operations, the linear operators are interchangeable. The convolution operation that is performed post image sensor processing linear operations, is performed before the image sensor processing step by the principle of interchangeability of linear operations. As the raw data of the image sensor is being read out, convolution operation is performed and in the embodiment the convolution operation on 3 by 3 array. The timing diagram illustrates this convolution operation.

FIG. 41 illustrates some aspects of threshold-based processing of data in a smart sensor, in accordance with some embodiments. FIG. 41 illustrates the image sensor data embodiment and each image sensor output data sampled across over time t at some time interval is shown in 4100. The output of the image sensor is 4102-1, . . . 4102-$n$ over time at t. The output of image sensor after the first output compared with 4102-1 which is the baseline reference image and total change detected is based on the row column wise summation operation output compared with the corresponding baseline 4102-1 in one embodiment. Each pixel value may then be compared with the corresponding pixel value in the baseline 4102-1 to generate an absolute difference value. This difference value is further processed (one example being the row column wise summation of FIG. 38) to produce the total change. This total change is compared with the expected change over time t as show in 4121. If the change exceeds the trigger value $Tigger_0$, the current image sensor data is sent for further computation, and it is set as the new baseline reference value. The 4110 illustrates result of this threshold value based comparison operation. The image sensor data 4102-1, 4102-9 which exceeds the first trigger value $Trigger_0$, is sent for further computation and set as the new baseline reference value and similarly for other image sensor data value set as the new baseline reference value and sent for further computation. The further computation operation can be an inference operation for example and the inference operation is performed using a neural network model and its associated operations. It should also be noted that while in this illustration the sequence of operations started with 4102-1 as the baseline reference image, after a magnitude of time, a newer frame may instead be selected as baseline reference replacing 4102-1 for further operations as applicable.

Figure 42:
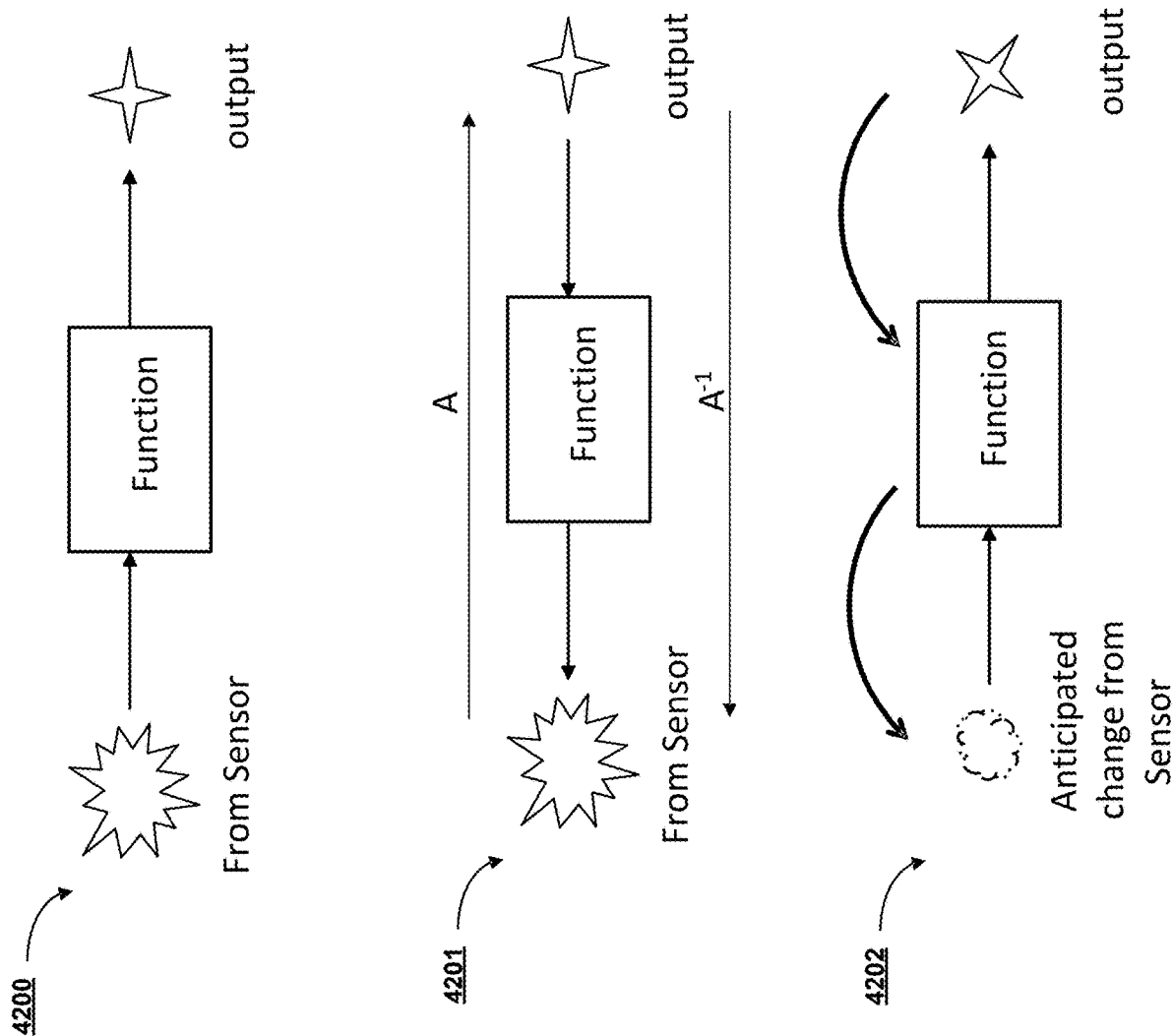
FIG. 42 illustrates some aspects of input output correlation in a smart sensor-based system in accordance with some embodiments.

FIG. 42 illustrates some aspects of input output correlation in a smart sensor-based system, in accordance with some embodiments. 4200 illustrates the linear function operation performed on data from the sensor to produce an output result. The 4201 illustrates the function operation as "A" from the sensor output data to the result and the function is a linear, the $A^{-1}$ inverse of the linear function A from the output of the function to the input of the function. This allows for anticipating changes in the sensor output as shown in 4202. The anticipated change can be compared with the sensor output to perform threshold value comparison operation to detect changes in the output of the sensor which may be significant for further computation.

System-in-package (SIP) and chiplet allow for integrating a sensor and the corresponding computation chip in a single package for an efficient data transmission for computation. Both also allow for each component to be in different process node allowing independent evolution of each component and thus a path for low cost and efficient processing. They also eliminate the power penalty seen with driving data through PCB (printed circuit board) level routing, thereby reducing power and energy required for computation.

Figure 43C:
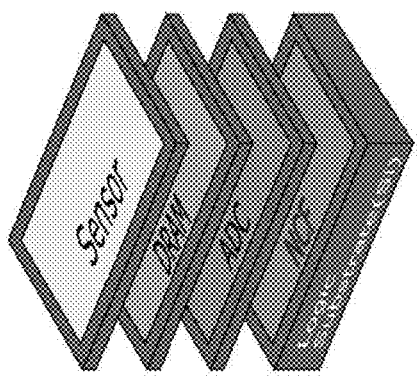
FIG. 43C depicts an example packaging option for a smart sensor.
Figure 43B:
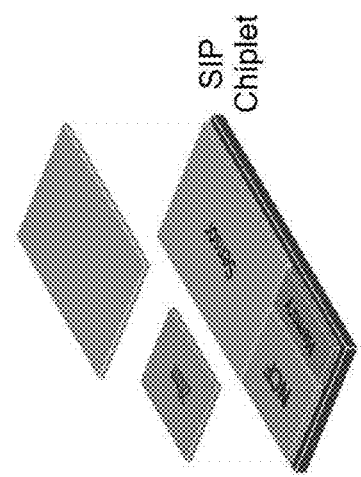
FIG. 43B depicts an example packaging option for a smart sensor.
Figure 43D:
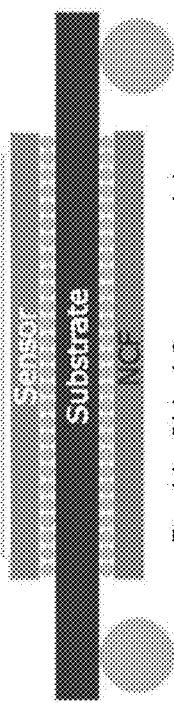
FIG. 43D depicts an example packaging option for a smart sensor.
Figure 43A:
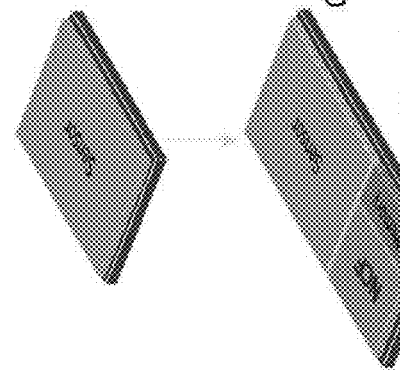
FIG. 43A depicts an example packaging option for a smart sensor.

FIGS. 43A-D depict some example packaging options for smart sensors. FIGS. 43A and 43B depict a first SIP chiplet configuration with a sensor, compute logic (labeled NCF), and memory arranged physically in one layer and next to each other on top of a substrate. In FIG. 43C, 4330 shows stacking a sensor (such as an image sensor), DRAM, ADC (data converter), and computation die all vertically stacked and connected through silicon via (TSV) to significantly improve the data transmission bandwidth and reduce the power required for data transmission. FIG. 43D illustrates a sensor and compute logic on opposite sides of a substrate.

Figure 44A:
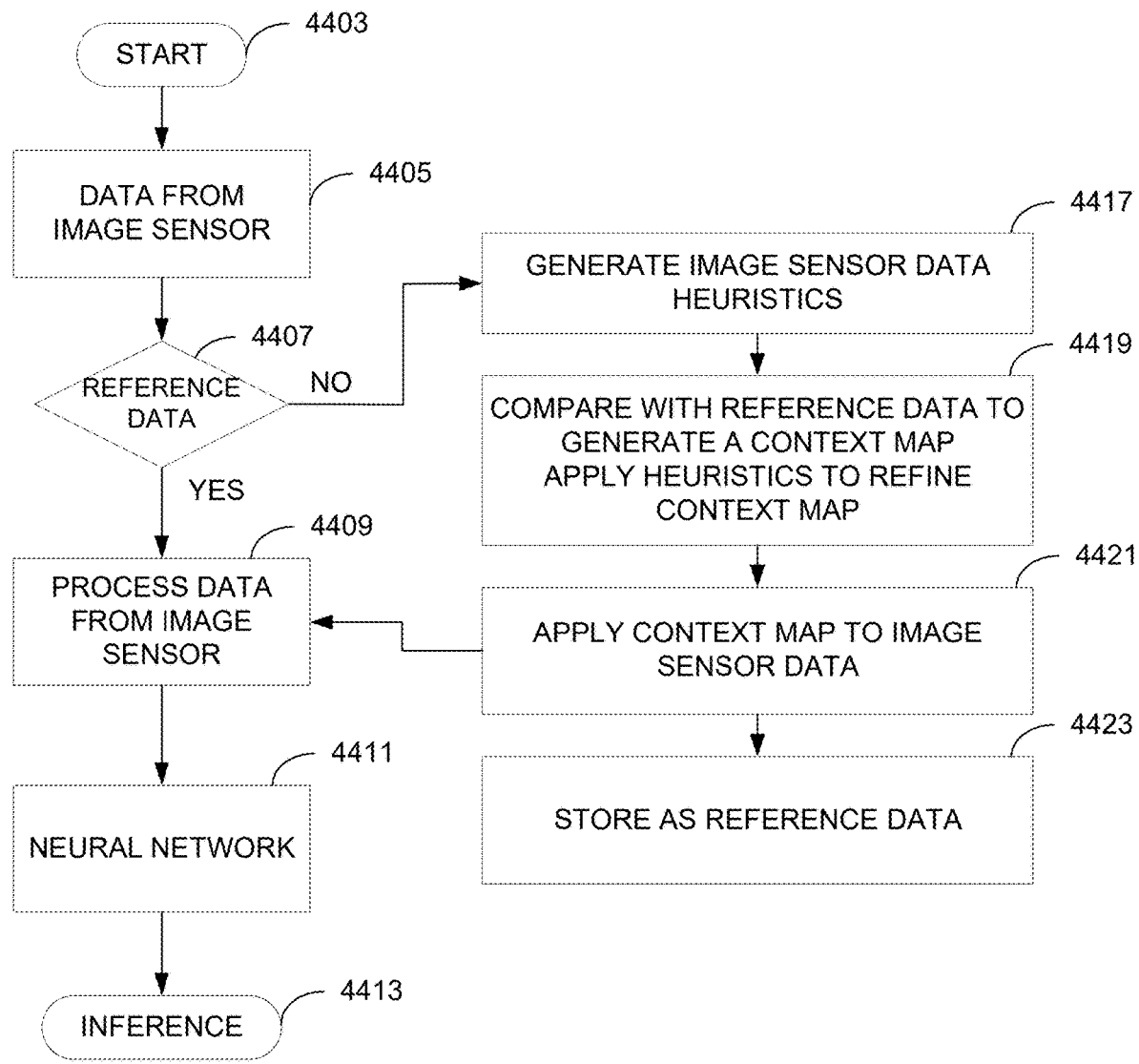
FIG. 44A is an example smart sensor method including processing control based on data heuristics and generated context maps from raw data.

FIG. 44A is an example smart sensor method 4400 including processing control based on data heuristics and generated context maps from raw data. In method 4400, current raw data is generated by a sensor (4405) and checked to determine if it is reference data (4407). If the raw sensor data is reference data (4407), then the processing may continue. If it is not, the raw sensor data is used to generate image heuristics (4417) and used to refine a context map generated by comparison of sensor data with reference data (4419). Context map applied sensor data (4421) is then used for subsequent processing (boxes 4409/4411) to generate an inference (4413). It is also stored as a future reference (4423). A non-exclusive example of heuristics is summation over row column data of an image or a difference image from a reference comparison and utilizing it to narrow down an area of interest. The process of using back annotated data to refine further processing as depicted in the method of FIG. 8A/8B—is another example of heuristics used herein.

Figure 44B:
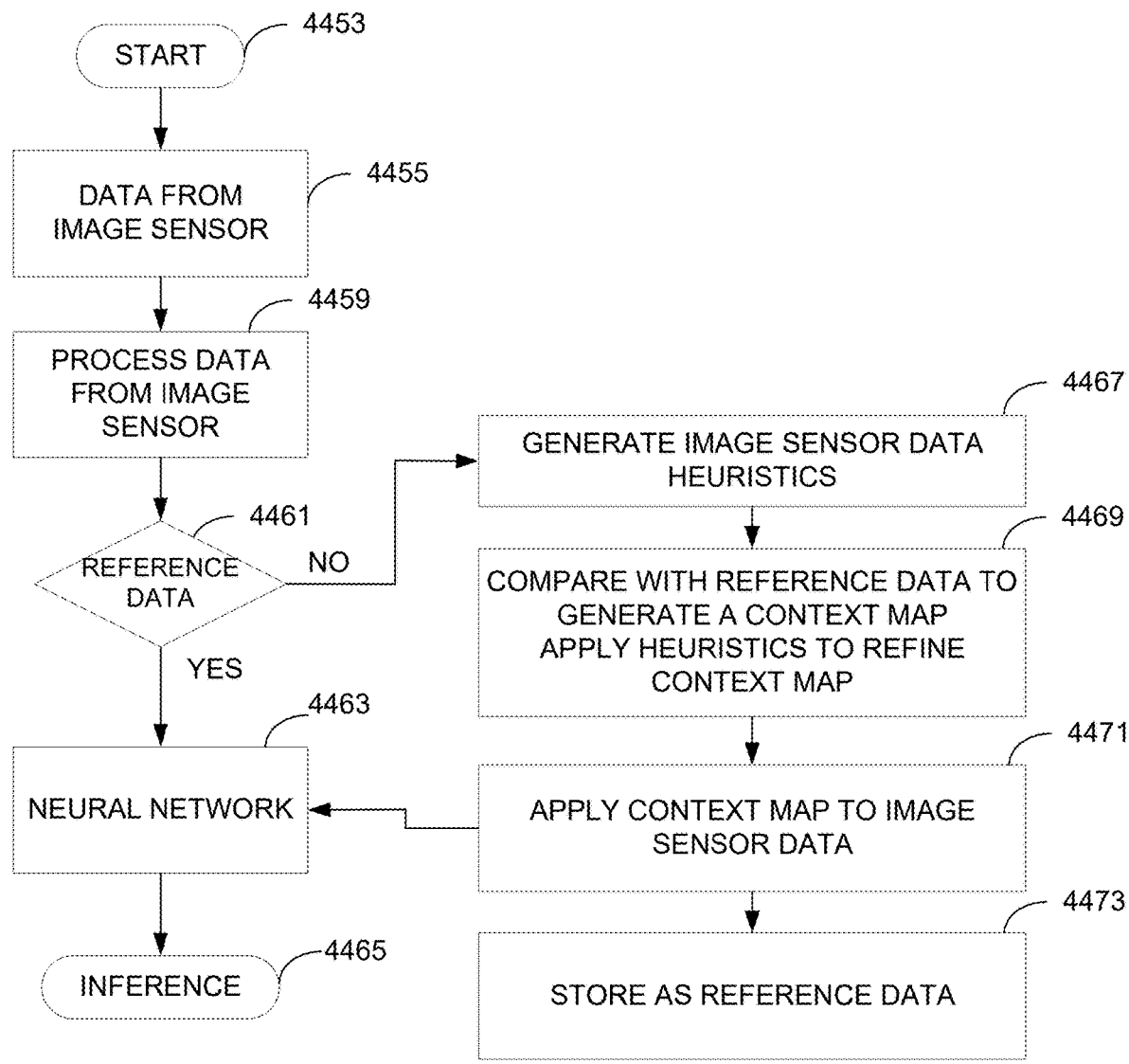
FIG. 44B is an example smart sensor method including processing control based on data heuristics and generated context maps from preprocessed data.

FIG. 44B is an example smart sensor method 4450 including processing control based on data heuristics and generated context maps from preprocessed data. In method 4450, raw data is generated by a sensor (4455), preprocessed (4459) and checked to determine if it is reference data (4461). If the raw sensor data is reference data (4461), then the processing may continue. If it is not, the preprocessed sensor data is used to generate image heuristics (4467) and used to refine a context map generated by comparison of preprocessed sensor data with reference data (4469). Context map applied sensor data (4471) is then used for subsequent processing (box 4463) to generate an inference (4465). It is also stored as a future reference (4473)

Figure 45:
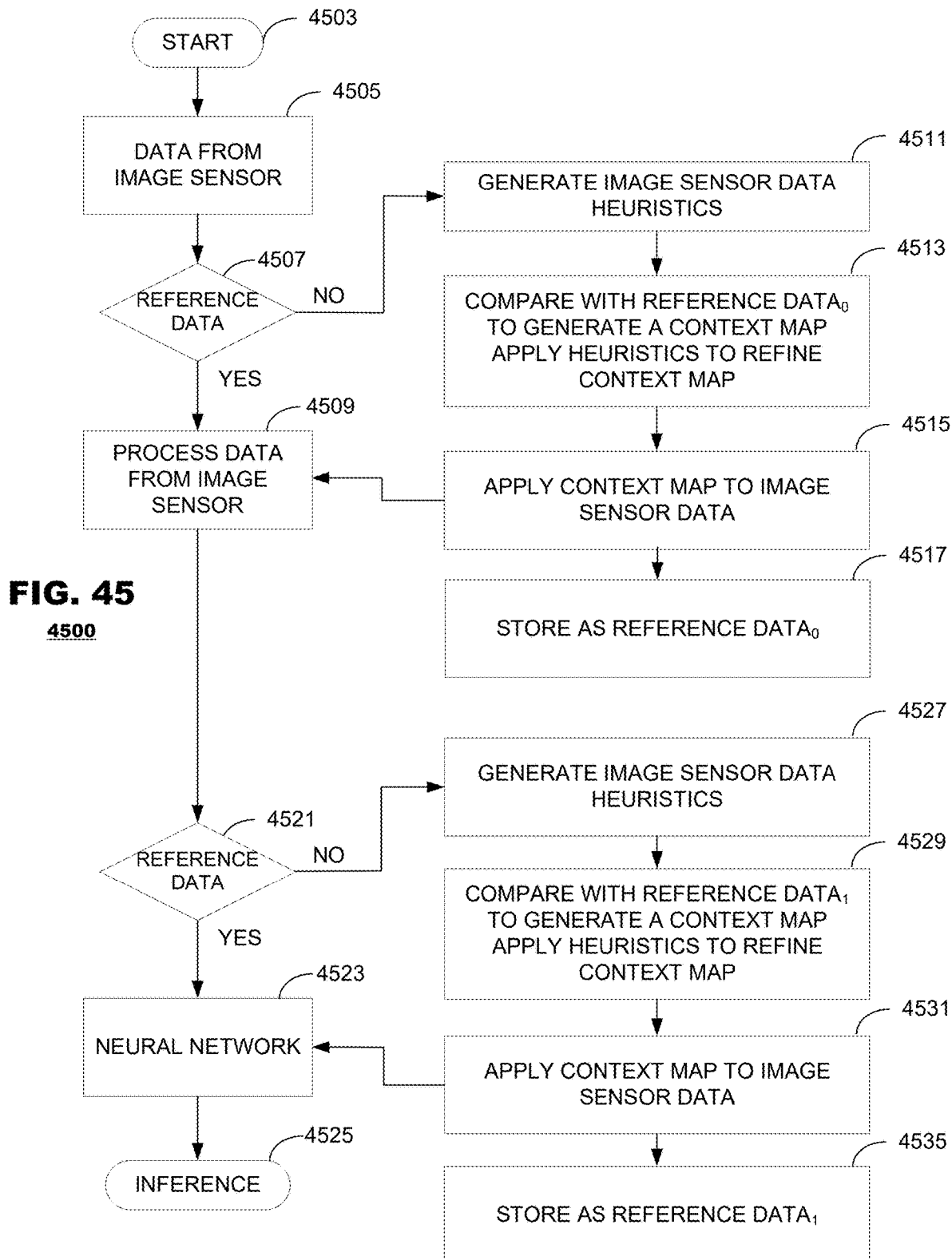
FIG. 45 is an example smart sensor method including processing control based on data heuristics and generated context maps from raw and preprocessed data.

FIG. 45 is an example smart sensor method 4500 including processing control based on data heuristics and generated context maps from raw and preprocessed data. In method 4500, current raw data is generated by a sensor (4505) and checked to determine if it is reference data (4407). If the raw sensor data is reference data (4507), then the processing may continue. If not, the raw sensor data is used to generate image heuristics (4511) and used to refine a context map generated by comparison of sensor data with reference data (4513). Context map applied raw sensor data (4515) is then used for subsequent preprocessing. It is also stored as a future reference (4517). The raw sensor data is processed (4509) and checked again to determine if it is reference data (4521), and if not, the preprocessed sensor data is used to generate image heuristics (4527) and used to refine a context map generated by comparison of preprocessed sensor data with reference data (4529). Context map applied sensor data (4531) is then used for subsequent processing (box 4523) to generate an inference (4525). It is also stored as a future reference (4535)

Figure 46A:
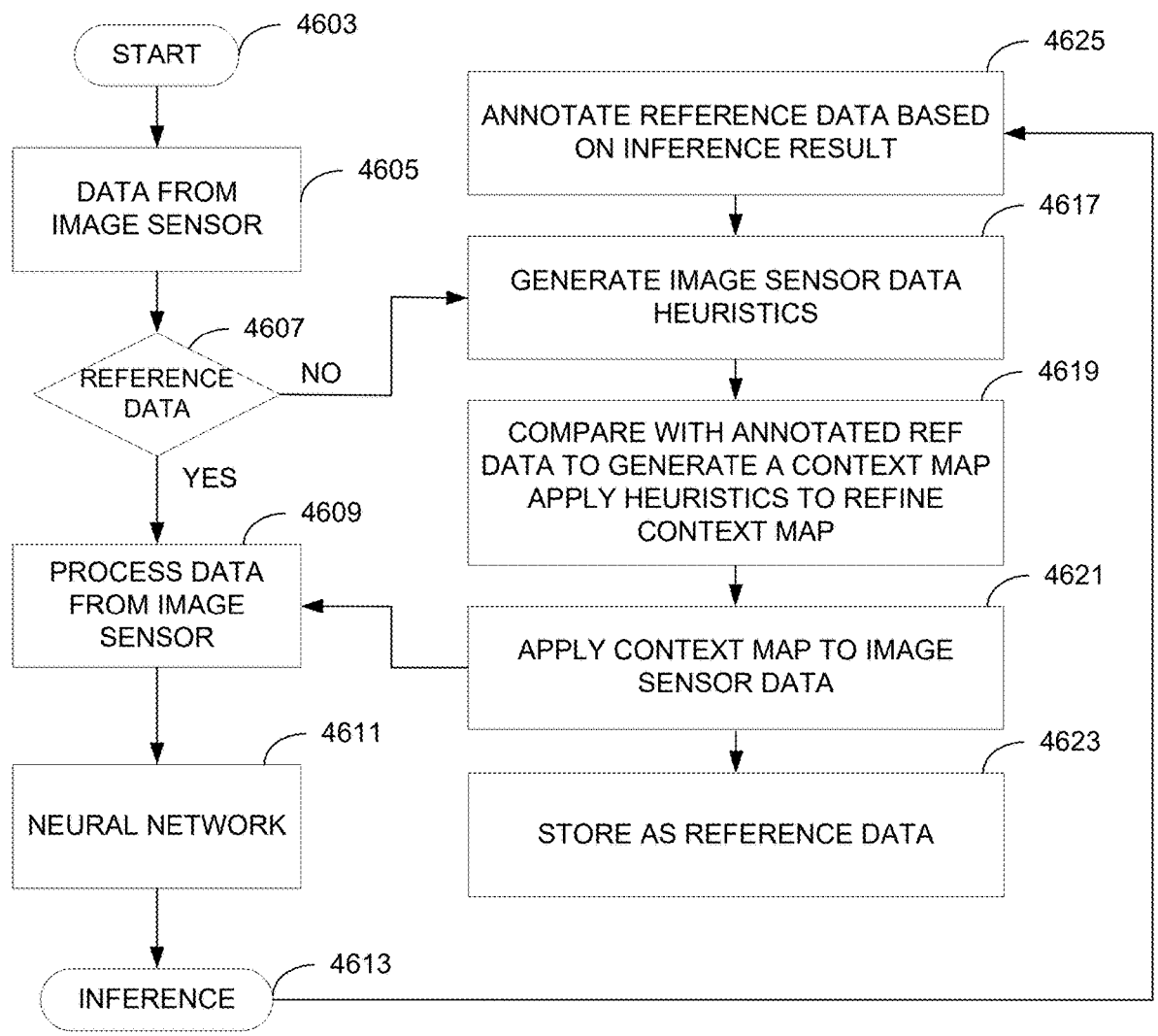
FIG. 46A is an example smart sensor method including processing control based on data heuristics, generated context maps from raw data and annotated reference data.

FIG. 46A is an example smart sensor method 4600 including processing control based on data heuristics, generated context maps from raw data and annotated reference data. In method 4600, raw data is generated by a sensor (4605) and checked to determine if it is reference data (4607). If the raw sensor data is reference data (4607), then the processing may continue. If it is not, the raw sensor data is used to generate image heuristics (4617) and used to refine a context map generated by comparison of sensor data with annotated reference data (4619). Context map applied sensor data (4621) is then used for subsequent processing (boxes 4609/4611) to generate an inference (4613). It is also stored as a future reference (4623). After the inference is generated, it may be used to annotate the raw reference data (4625)

Figure 46B:
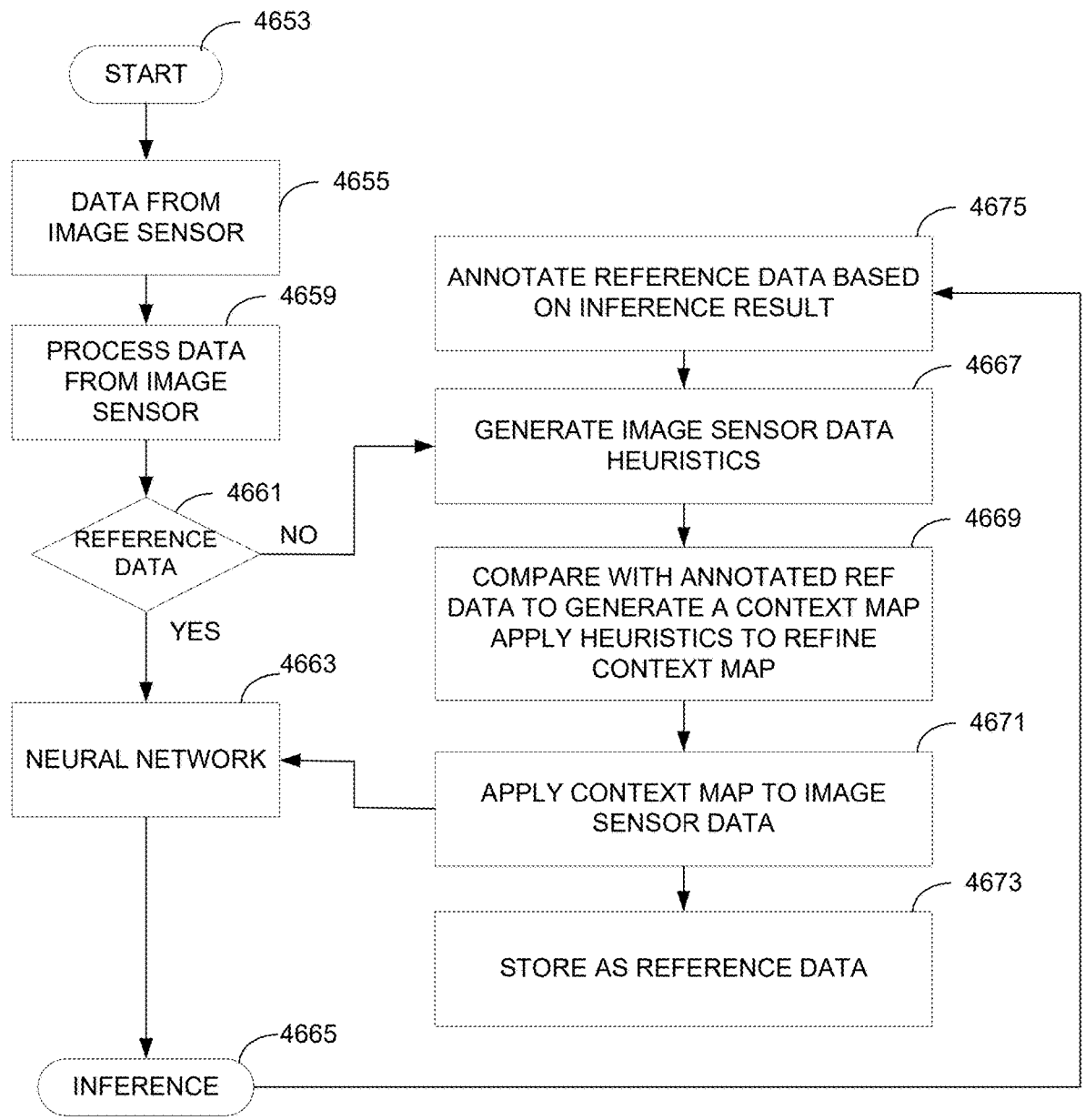
FIG. 46B is an example smart sensor method including processing control based on data heuristics, generated context maps from preprocessed data and annotated reference data.

FIG. 46B is an example smart sensor method 4650 including processing control based on data heuristics, generated context maps from preprocessed data and annotated reference data. In method 4650, raw data is generated by a sensor (4655), preprocessed (4659) and checked to determine if it is reference data (4661). If the raw sensor data is reference data (4661), then the processing may continue. If it is not, the preprocessed sensor data is used to generate image heuristics (4667) and used to refine a context map generated by comparison of preprocessed sensor data with annotated reference data (4669). Context map applied sensor data (4671) is then used for subsequent processing (box 4663) to generate an inference (4665). It is also stored as a future reference (4673). After the inference is generated, it may be used to annotate the raw reference data (4675)

Figure 47:
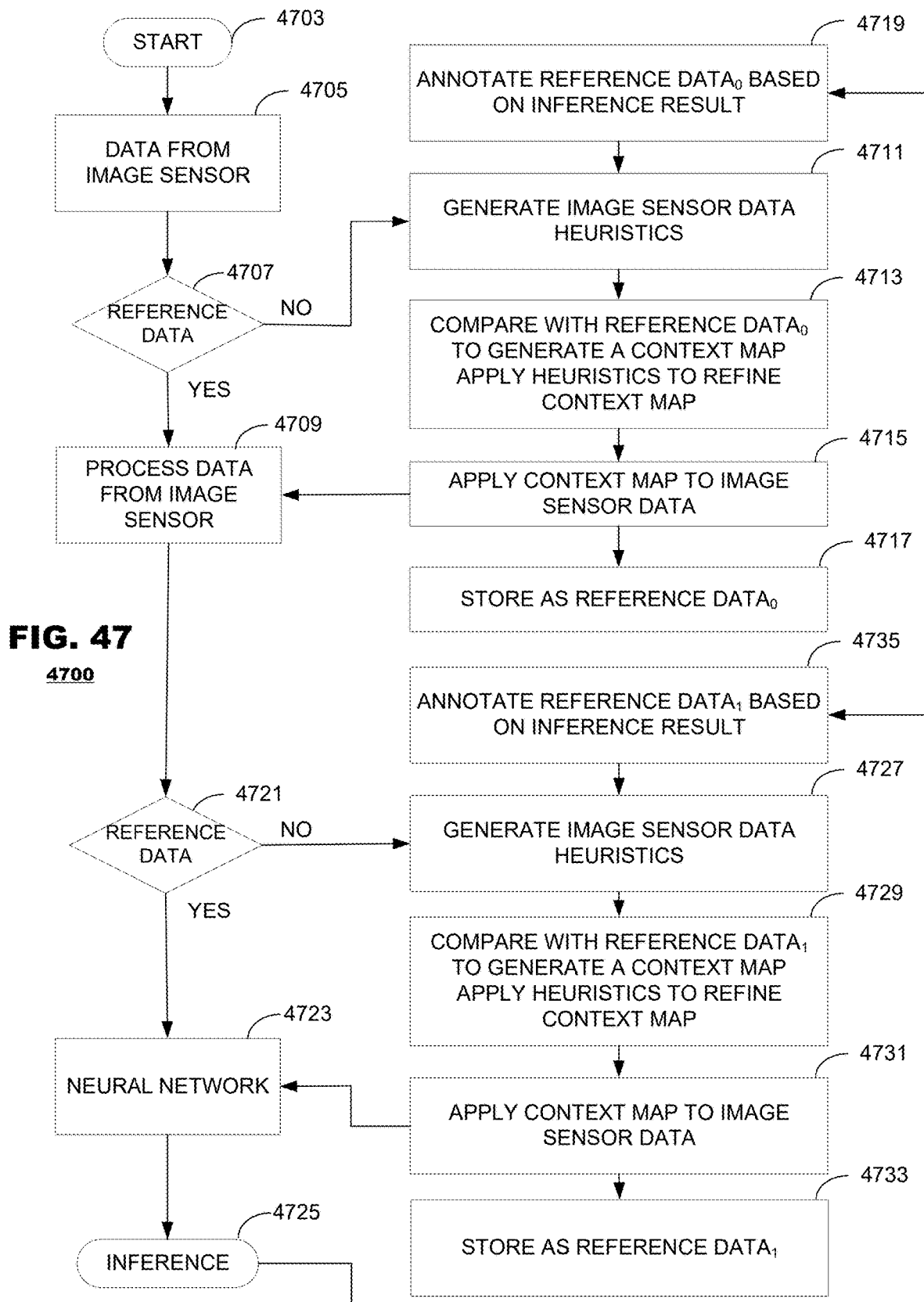
FIG. 47 is an example smart sensor method including processing control based on data heuristics, generated context maps from raw and preprocessed data and annotated reference data.

FIG. 47 is an example smart sensor method 4700 including processing control based on data heuristics, generated context maps from raw and preprocessed data and annotated reference data. In method 4700, current raw data is generated by a sensor (4705). If the raw sensor data is reference data (4707), then the processing may continue. If it is not, the raw sensor data is used to generate image heuristics (4711) and used to refine a context map generated by comparison of sensor data with annotated reference data (4713). Context map applied raw sensor data (4715) is then used for subsequent preprocessing. It is also stored as a future reference (4717). The raw sensor data is processed (4709) and checked again to determine if it is reference data (4721), and if not, the preprocessed sensor data is used to generate image heuristics (4727) and used to refine a context map generated by comparison of preprocessed sensor data with reference data (4729). Context map applied sensor data (4731) is then used for subsequent processing (box 4723) to generate an inference (4725). It is also stored as a future reference (4733). After the inference is generated, it may be used to annotate the raw reference data (4735)

Some embodiments may be implemented, for example, using a non-transitory computer-readable storage medium or memory which may store an instruction or a set of instructions that, when executed by a processor, may cause the processor to perform a method in accordance with the disclosed embodiments. The exemplary methods and computer program instructions may be embodied on a non-transitory machine-readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine-readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

What is claimed:

1. A method for processing sensor data, comprising:
   processing data output by a sensor element at time T by a first processing element based on an output from a second processing element, the second processing element processing data output by the sensor element at time T−1; and
   performing a threshold comparison such that when the processed data output at time T meets a threshold based on an absolute difference between the data output at time T and reference data from the sensor element taken at a different time, the first processing element updates to output the processed data output at time T as input to the second processing element, and when the processed data output at time T does not meet the threshold, the processed data output at time T is not output from the first processing element,
   wherein the threshold comparison is performed separately for discrete spatial regions of the sensor data, and a sparse matrix of control signals is generated to selectively enable or disable processing, by the second processing element, for each discrete spatial region based on the threshold comparison.

2. The method of claim 1, wherein when the second processing element is processing data output by the sensor element at time T−1, the second processing element is also processing reference data.

3. The method of claim 1, wherein outputting includes outputting reference data from the first processing element as input to the second processing element.

4. The method of claim 1, wherein outputting includes outputting a first reference data from the first processing element as input to the second processing element, wherein the second processing element is processing data output by the sensor element at time T−1, the second processing element is also processing a second reference data.

5. The method of claim 1, wherein the second processing element further receives an input from a source external to the first processing element.

6. The method of claim 1, wherein the processing data output by the sensor element at time T by the first processing element is further based on an output from a second sensor element.

7. The method of claim 6, wherein the first processing element further receives reference data and wherein the processing data output by the sensor element at time T by the first processing element is further based on the reference data.

8. The method of claim 7, wherein the data output by the sensor element at time T by the first processing element has a first format, the reference data has a second format, and the output from the second sensor element has a third format.

9. The method of claim 8, wherein the first format, the second format and the third format are a same format.

10. The method of claim 8, wherein one or more of first format, the second format and the third format are a different format.

11. The method of claim 7, wherein the reference data is updated based on one of the processed data output from the first processing element and the output from the second processing element.

12. The method of claim 1, wherein the processing data output by the sensor element at time T−1 by the second processing element is based on an output from a second sensor element.

13. The method of claim 12, wherein the second processing element further receives reference data and wherein the processing data output by the sensor element output at time T−1 by the second processing element is further based on the reference data.

14. The method of claim 1, wherein the first processing element further receives reference data and the processing data output by the sensor element at time T by the first processing element is further based on the reference data, and wherein the second processing element further receives an output from a second sensor element, and the processing data output by the sensor element at time T–1 by the second processing element is further based on the output from the second sensor element.

15. The method of claim 1, wherein the first processing element receives an output from a second sensor element and the processing of data output by the sensor element at time T by the first processing element is further based on the output from the second sensor element, and wherein the second processing element further receives reference data and the processing of data output by the sensor element at time T–1 by the second processing element is further based on the reference data.

16. The method of claim 1, wherein the first processing element further receives an output from a second sensor element and the processing data output by the sensor element at time T by the first processing element is further based on the output from the second sensor element, and wherein the second processing element further receives an output from a third sensor element and the processing data output by the sensor element at time T–1 by the second processing element is further based on the output from the third sensor element.

17. The method of claim 1, wherein the first processing element further receives a first output from a second sensor element and the processing data output by the sensor element at time T by the first processing element is further based on the first output from the second sensor element, and wherein the second processing element further receives a second output from the second sensor element and the processing data output by the sensor element at time T–1 by the second processing element is further based on the second output from the second sensor element.

18. The method of claim 1, wherein the first processing element is of a first type of processor and the second processing element is of a second type of processor.

19. The method of claim 18, wherein the first type of processor and the second type of processor are different types of processors.

20. The method of claim 18, wherein the first type of processor and the second type of processor are a same type of processor.

21. The method of claim 1, wherein aspects of the output of the second processing element are used by the first processing element to modify its processing.

\* \* \* \* \*